(12) United States Patent
Hamaguchi et al.

(10) Patent No.: US 9,602,037 B2
(45) Date of Patent: Mar. 21, 2017

(54) MOTOR DRIVE DEVICE AND MOTOR DRIVE SYSTEM

(71) Applicant: Kobe Steel, Ltd., Hyogo (JP)

(72) Inventors: Masashi Hamaguchi, Kobe (JP); Toshihiro Nogi, Kobe (JP); Kenichi Inoue, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 14/433,788

(22) PCT Filed: Nov. 15, 2013

(86) PCT No.: PCT/JP2013/006736
§ 371 (c)(1),
(2) Date: Apr. 6, 2015

(87) PCT Pub. No.: WO2014/083795
PCT Pub. Date: Jun. 5, 2014

(65) Prior Publication Data
US 2015/0381097 A1  Dec. 31, 2015

(30) Foreign Application Priority Data

Nov. 27, 2012  (JP) .................. 2012-258509
Oct. 2, 2013   (JP) .................. 2013-207068

(51) Int. Cl.
*H02P 25/092* (2016.01)
*H02P 25/08* (2016.01)

(52) U.S. Cl.
CPC .......... *H02P 25/085* (2013.01); *H02P 25/092* (2016.02)

(58) Field of Classification Search
CPC ................ H02P 25/085; H02P 25/08
See application file for complete search history.

(56) References Cited

U.S. PATENT DOCUMENTS 5,194,795 A * 3/1993 Bahn ................ G05B 19/231
                                                    318/400.2
6,137,256 A  10/2000 Morris
(Continued)

FOREIGN PATENT DOCUMENTS

| JP | 2010-206872 A | 9/2010 |
|---|---|---|
| JP | 2011-259571 A | 12/2011 |
| WO | 20041034562 A1 | 4/2004 |

OTHER PUBLICATIONS

New Converter Configurations for Switched Reluctance Motors Wherein Some Winding Operate on Recovered Energy; Vijay V. Deshpande, Member, IEEE, and Jun Young Lim.*

(Continued)

*Primary Examiner* — Shawki S Ismail
*Assistant Examiner* — Muhammad S Islam
(74) *Attorney, Agent, or Firm* — Studebaker & Brackett PC

(57) ABSTRACT

A motor drive device and motor drive system according to the present invention comprise: a power source terminal; a charging and discharging unit connected in series with the power source terminal; connection terminals to be connected to each of primary and secondary excitation coils for an anti-symmetric two phase motor; and a drive control unit which has a plurality of switching elements and respectively forms first and second paths by turning these switching elements on and off. The first path is used for independently supplying power to the respective primary and secondary excitation coils from the power source terminal via the connection terminals, and the second path is used for independent regeneration of each residual energy remaining in the primary and secondary excitation coils from the respective primary and secondary excitation coils into the charging and discharging unit via the connection terminals.

16 Claims, 21 Drawing Sheets

(56) References Cited

U.S. PATENT DOCUMENTS

| | | | | |
|---|---|---|---|---|
| 6,469,468 B1* | 10/2002 | Hatsuda | ............... | H02P 25/092 |
| | | | | 318/254.2 |
| 7,545,122 B2 | 6/2009 | Sasaki | | |
| 2006/0049809 A1 | 3/2006 | Sasaki | | |
| 2009/0200980 A1* | 8/2009 | Ramu | ................... | H02P 25/092 |
| | | | | 318/701 |
| 2011/0148333 A1* | 6/2011 | Umemori | ................. | B60L 7/10 |
| | | | | 318/376 |

OTHER PUBLICATIONS

International Search Report; PCT/JP2013/006736; Feb. 18, 2014.
Written Opinion of the International Searching Authority; PCT/JP2013/006736; Feb. 18, 2014.
C. Pollock et al., "A Unipolar Converter for a Switched Reluctance Motor"; IEEE Transactions on Industry Applications; vol. 26, No. 2; Mar.-Apr. 1990; pp. 222-228.
S.N. Vukosavic et al.; "SRM Inverter Topologies: A Comparative Evaluation"; The 1990 IEEE Industry Applications Society 25th Annual Meeting; Seattle, Washington, Part II, Conference Record of IAS '90, Oct. 7-12, 1990; pp. 946-958.

\* cited by examiner

MOTOR DRIVE DEVICE AND MOTOR DRIVE SYSTEM

TECHNICAL FIELD

The present invention relates to a motor drive device for driving a motor, and a motor drive system having the motor drive device.

BACKGROUND ART

Various types of motors (electric motors) are known, and various drive methods are known according to each. For example, motors are generally classified into radial gap motors and axial gap motors, from the perspective of the positional relationship of a stator and a rotor. Radial gap motors are of a structure where the stator and rotor are displaced with space therebetween in the radial direction, while axial gap motors are of a structure where the stator and rotor are displaced with space therebetween in the axial direction. Axial gap motors are advantageous in that a greater torque can be obtained with a smaller diameter, as compared to radial gap motors. Motors are also generally classified into direct current motors (DC motors) that are driven by DC power (DC voltage, DC power), and alternating current motors that are driven by AC power (AC voltage, AC current), from the perspective of supplied power. DC motors are advantageous in that speed and output can be controlled relatively easily. On the other hand, alternating current motors (AC motors) are advantageous in that the structure is relatively simple and sturdy. While AC motors have conventionally been said to be difficult to control speed and control output in comparison with DC motors, this point has been solved in recent years by the advance to control technology using power electronics, and AC motors have come to be used in various usages.

One such motor is a switched reluctance motor (hereinafter abbreviated to "SR motor"). The SR motor has a salient pole structure along with the stator and rotor, and exhibits rotational motion by magnetic attractive force generated by supplying current to stator coils based on positional information of the rotor.

More specifically, in a case where the rotator is rotating, the inductance of the coil changes depending on the degree of overlapping of the stator salient pole and rotor salient pole. Supplying current to the coil while the inductance of the coil has increased along with the rotation of the rotor causes torque to act in the rotational direction of the rotor so as to increase the degree of the overlapping to reduce the magnetic resistance, and accordingly the SR motor accelerates. Once the salient pole of the stator and the salient pole of the rotor completely overlap, the magnetic resistance (reluctance) of the magnetic circuit through the state and the rotor is the smallest, and no torque is generated since the magnetic attraction is only in the radial direction. Supplying current to the coil while the inductance of the coil has decreased along with the rotation of the rotor causes torque to act in the opposite direction of the rotational direction of the rotor so as to prevent reduction in the degree of the overlapping to reduce the magnetic resistance, and accordingly the SR motor decelerates. Accordingly, stopping supply of current to the coil when the salient pole of the rotor completely overlaps the salient pole of the stator, and resuming supply of current to the coil when the salient pole of the rotor nears the next salient pole in the rotational direction at the stator enables the rotor to continuously rotate.

The SR motor does not need permanent magnets or wound coils on the rotor since it operates in this way, and accordingly has the advantages of the rotor being free from heat emission problems, and the structure is relatively simple and mechanically robust. Particularly, the SR motor can be driven at high temperatures, since there is no problem of demagnetization of permanent magnets at high temperature.

There are known a Shared switch converter disclosed in NPL 1 and a Voltage boosting converter disclosed in NPL 2 as drive devices to drive such an SR motor.

FIG. 23 is a diagram illustrating the configuration and operations of the SR motor drive device disclosed in NPL 1. FIG. 23A illustrates the configuration, and FIG. 23B through 23D illustrate the operations. FIG. 24 is a diagram illustrating the configuration of the SR motor drive device disclosed in NPL 2.

In FIG. 23A, an SR motor drive device DRd1 disclosed in NPL 1 includes a transistor Tr11 and a diode D11 which are connected in series, a transistor Tr12 and a diode D12 which are connected in series, and a transistor Tr13 and a diode 13 which are connected in series. One terminal (source terminal) of the transistor Tr11, the cathode terminal of the diode D12, and one terminal (source terminal) of the transistor Tr13, are connected to a power source line connected to a power source Vs, while the anode terminal of the diode D11, the other terminal (drain terminal) of the transistor Tr12 and the anode terminal of the diode 13 are connected to the ground line. Thus, these serial circuits are connected in parallel. A first phase coil of the SR motor is connected between a first contact point connecting the transistor Tr11 and the diode D11 and a second contact point connecting the diode D12 and the transistor Tr12. A second phase coil of the SR motor is connected between the second contact point and a third contact point connecting the diode D13 and the transistor Tr13.

In this SR motor drive device DRd1, when the transistor Tr11 and transistor Tr12 are turned on and the transistor Tr13 is turned off as illustrated in FIG. 23B, current flows from the power source Vs to the first phase coil, whereby excitation of the first phase coil occurs. When the transistor Tr12 is turned on and the transistor Tr11 and transistor Tr13 are turned off as illustrated in FIG. 23C, the current circulates (reflux) at the first phase coil, in a so-called freewheeling state. When all transistors Tr11 through Tr13 are turned off, voltage is applied from the power source Vs to the first phase coil from the opposite direction, demagnetizing the first phase coil. The operations of excitation, freewheeling state, and demagnetization can be realized in the same way at the second phase coil as well, by turning the transistors Tr11 through Tr13 on and off as appropriate.

This SR motor drive device DRd1 is advantageous in that two phase coils can be controlled with a single power source Vs, in that both soft switching and hard switching can be handled, and in that the coil to be excited can be selected according to the rotor phase angle.

On the other hand, an SR motor drive device DRd2 disclosed in NPL 2 includes two diodes D25 and D28 that are connected in series, two diodes D26 and D29 that are connected in series, two diodes D27 and D30 that are connected in series, an inductor L21, two capacitors C21 and C22 that are connected in series, a diode D21 and a transistor Tr21 that are connected in series, a diode D22 and a transistor Tr22 that are connected in series, a diode D23 and a transistor Tr23 that are connected in series, a transistor Tr24 and a diode D24 that are connected in series, and an inductor L22. The source terminals of the diodes D25, 26, and 27 are connected to each other, and one end of the inductor L21 is connected thereto. The anode terminals of the diodes D28, 29, and 30 are connected to each other, and one end of the inductor L22 is connected thereto. Thus, these serial circuits are connected in parallel. A three-phase power source is connected to each of a first contact point connecting the diode D25 and diode D28, a second contact point connecting the diode D26 and diode D29, and a third contact point connecting the diode D27 and diode D30. Connected to the one end of the inductor L21 are the cathode terminals of the diodes D21, D22, D23, and one terminal (source terminal) of the transistor Tr24. Connected to the other end of the capacitor C21 is one end of the inductor L22 and one end of the capacitor C22. Connected to the other end of the inductor L22 are the other end (Drain terminal) of the switching device T24 and cathode terminal of the diode D24. Connected to the other end (drain terminal) of the capacitor C22 are the other ends of the transistors Tr21, Tr22, and Tr23, and the anode terminal of the diode D24. A first phase coil LPH1 of the SR motor is connected between a fourth contact point connecting the capacitor C21 and capacitor C22, and a fifth contact point connecting the anode terminal of the diode D21 and one end (source terminal) of the transistor Tr21. A second phase coil LPH2 of the SR motor is connected between the fourth contact point and a sixth contact point connecting the anode terminal of the diode D22 and one end (source terminal) of the transistor Tr22. A third phase coil LPH3 of the SR motor is connected between the fourth contact point and a seventh contact point connecting the anode terminal of the diode D23 and one end (source terminal) of the transistor Tr23.

This SR motor drive device DRd2 can excite and demagnetize the phase coils LPH1, LPH2, and LPH3, by turning the transistors Tr21, Tr22, and Tr23 on and off. The capacitors C21 and C22 of the SR motor drive device DRd1 stores charges, whereby voltage higher than the power source voltage supplied to the SR motor drive device DRd1 can be applied to the phase coils LPH1, LPH2, and LPH3.

Now, the SR motor drive device DRd1 disclosed in the NPL 1 above has the above-described advantages. However, in the SR motor drive device DRd1, once acceleration control by one coil ends, the electric energy from acceleration control remains at the other coil. The residual electric energy at the other coil is consumed in a freewheeling state as Joule heat by conductor resistance of the coil, internal resistance of the diodes, and internal resistance of the switching devices, and does not contribute to motor torque. Also, excitation of the one coil due to the circulating current in the freewheeling state in this coil acts to cancel out acceleration at the time of excitation for acceleration control of the other coil. Consequently, torque decreases.

On the other hand, the SR motor drive device DRd2 disclosed in the NPL 2 has the above-described advantages. However, the circuit of the SR motor drive device DRd2 is complicated, and timing control for charge and discharge of the capacitors C21 and C22 is troublesome.

CITATION LIST

Non Patent Literature

NPL 1: Pollock C. and Williams B. W., "A unipolar converter for a switched reluctance motor", IEEE Transactions on industry Applications, Vol. 26, Issue 2, pp. 222-228, March-April 1990

NPL 2: Vukosavic S. N. and Stefanovic V. R., "SRM inverter topologies: a comparative evaluation", The 1990 IEEE industry Applications Society 25th Annual Meeting, Seattle, Wash., USA, Part II, Conference Record of IAS '90, pp. 946-958, 7-12 Oct. 1990

SUMMARY OF INVENTION

The present invention has been made in light of the above-described present situation, and accordingly it is an object thereof to provide a motor drive device, and a motor drive system including a motor and the motor drive device, in which electric energy remaining in one coil can be regenerated and the regenerative electric energy used at the other coil, thereby improving electric efficiency.

A motor drive device and a motor drive system according to the present invention include a power source terminal, a charging and discharging unit connected in series with the power source terminal, connecting terminals to be connected to each of primary and secondary excitation coils of an anti-symmetric two phase motor, and a drive control unit that has a plurality of switching elements, and that forms first and second paths by turning the plurality of switching elements on and off. The first path is for independently supplying power to each of the primary and secondary excitation coils from the power source terminal via the connecting terminals. The second path is for independent regeneration of each residual energy remaining in the primary and secondary excitation coils from the respective primary and secondary excitation coils into the charging and discharging unit via the connecting terminals. Accordingly, in the motor drive device and a motor drive system according to the present invention, electric energy remaining at one coil can be regenerated, and the regenerated electric energy used at the other coil, thereby improving electric power efficiency.

The above and other objects, features, and advantages of the present invention will be come apparent from the following detailed description and the attached drawings.

DESCRIPTION OF EMBODIMENTS

Figure 1:
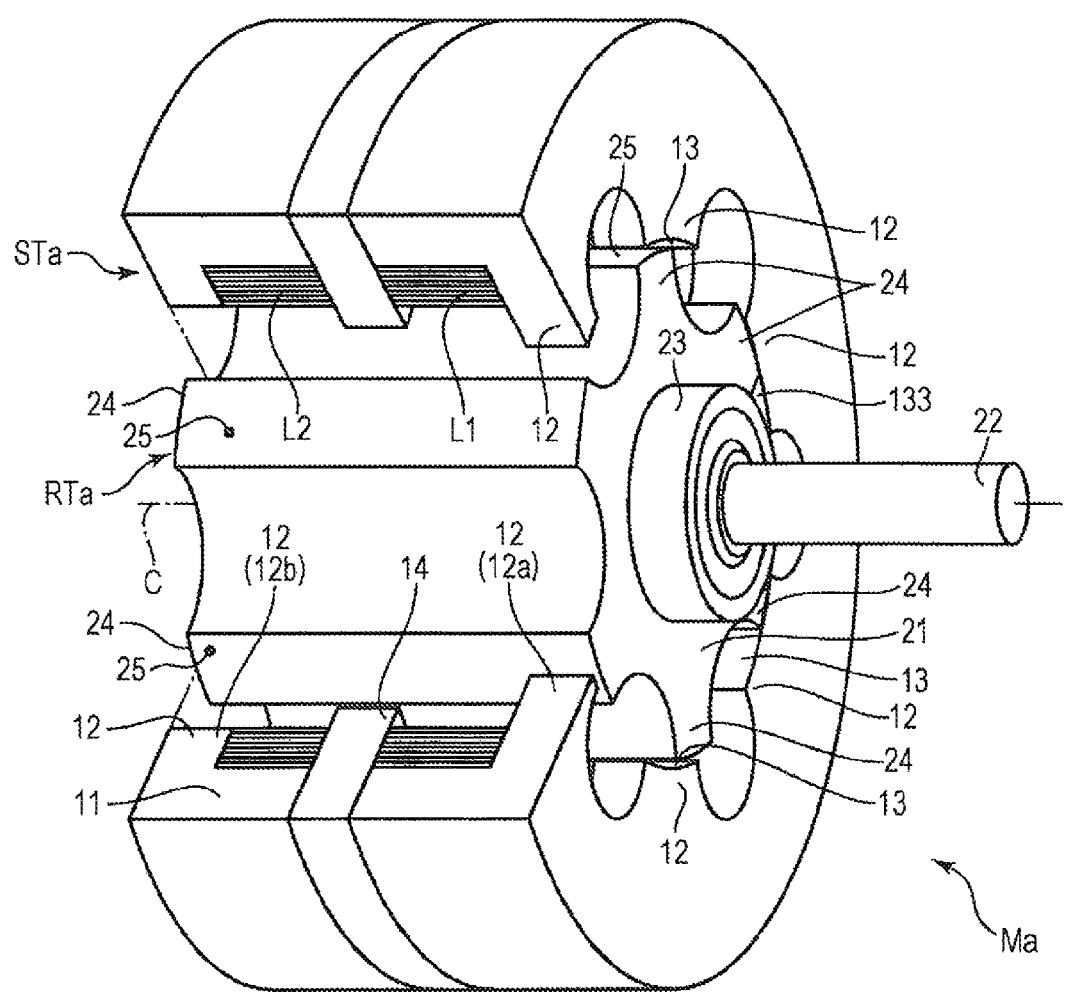
FIG. 1 is a cross-sectional perspective view illustrating the configuration of a radial gap SR motor driven by a motor drive device according to an embodiment.

An embodiment of the present invention will be described by way of the drawings. Note that configurations which are denoted by the same reference numerals in the drawings the same configurations, so description thereof will be omitted as appropriate. Also note that in the present Specification, collective references will be indicated by reference numerals from which suffixes have been omitted, and cases of referencing individual configurations will be indicated by reference numerals including suffixes.

(Description of Motor)

The motor drive device according to the first and second embodiments is applicable to various types of motors (electric motors) as long as an anti-symmetric two phase motor, such as an AC permanent-magnet motor (AC-PM motor), a DC brushless motor, an induction motor, or the like, for example. An anti-symmetric two phase motor has a primary excitation coil of a first phase and a secondary excitation coil of second phase, and is a motor where the difference between the phase of cyclic change of inductance due the primary excitation coil as to rotational angle of a rotor RT, and the phase of cyclic change of inductance due the secondary excitation coil as to the rotational angle of the rotor RT, is 180 degrees. That is to say, in an anti-symmetric two phase motor, while the inductance due to the primary excitation coil of the first phase increases and reaches the peak at the greatest value, the inductance due to the secondary excitation coil of the second phase decreases and reaches the peak at the smallest value, along with rotations of the rotor RT. Further, in accordance with rotations of the rotor RT, the inductance due to the primary excitation coil of the first phase decreases from the peak at the greatest value and reaches the peak at the smallest value, while the inductance due to the secondary excitation coil of the second phase increases from the peak at the smallest value and reaches the peak at the greatest value. A case will be described below here regard to a particular case of applying the motor drive device according to the first or second embodiment is applied to a switched reluctance motor (hereinafter abbreviated to "SR motor"), which is suitably used. As described above, motors are classified into radial gap motors and axial gap motors from the perspective of structure, so the SR motor to which the motor drive device is applied will be described in the first and second embodiments as a radial gap SR motor and an axial gap SR motor.

Figure 2:
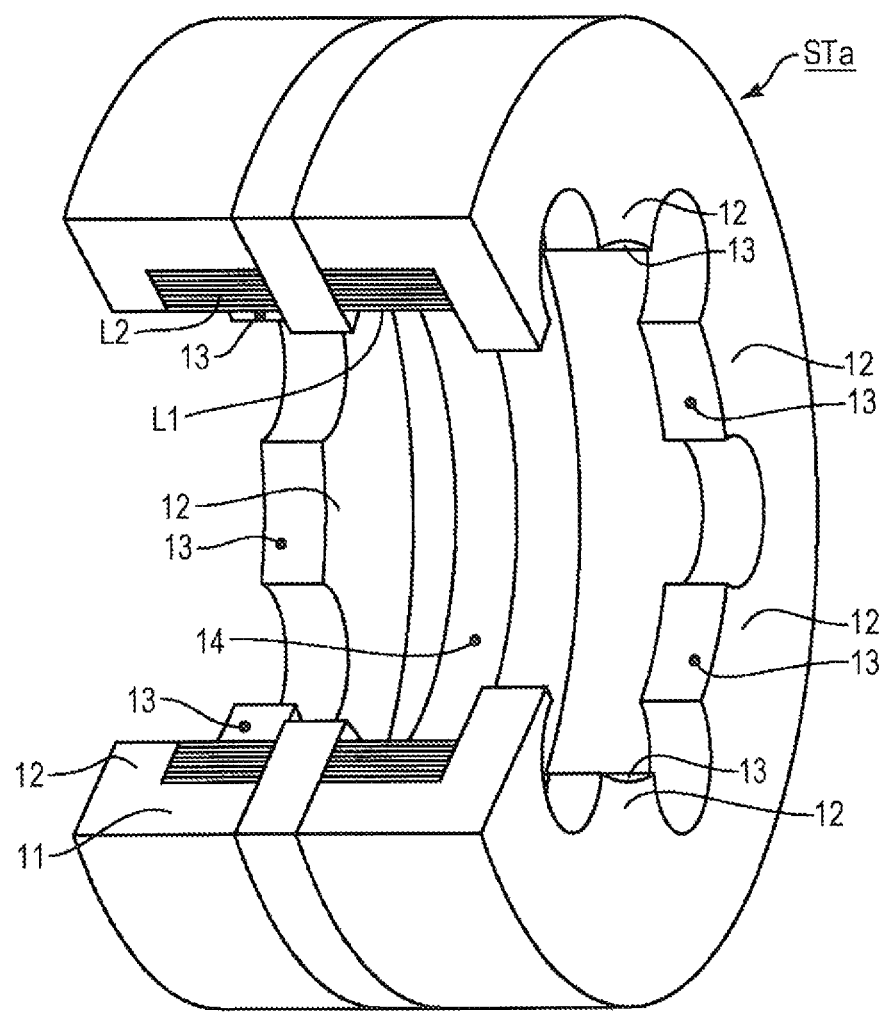
FIG. 2 is a cross-sectional perspective view illustrating the configuration of a stator in the radial gap SR motor.
Figure 3:
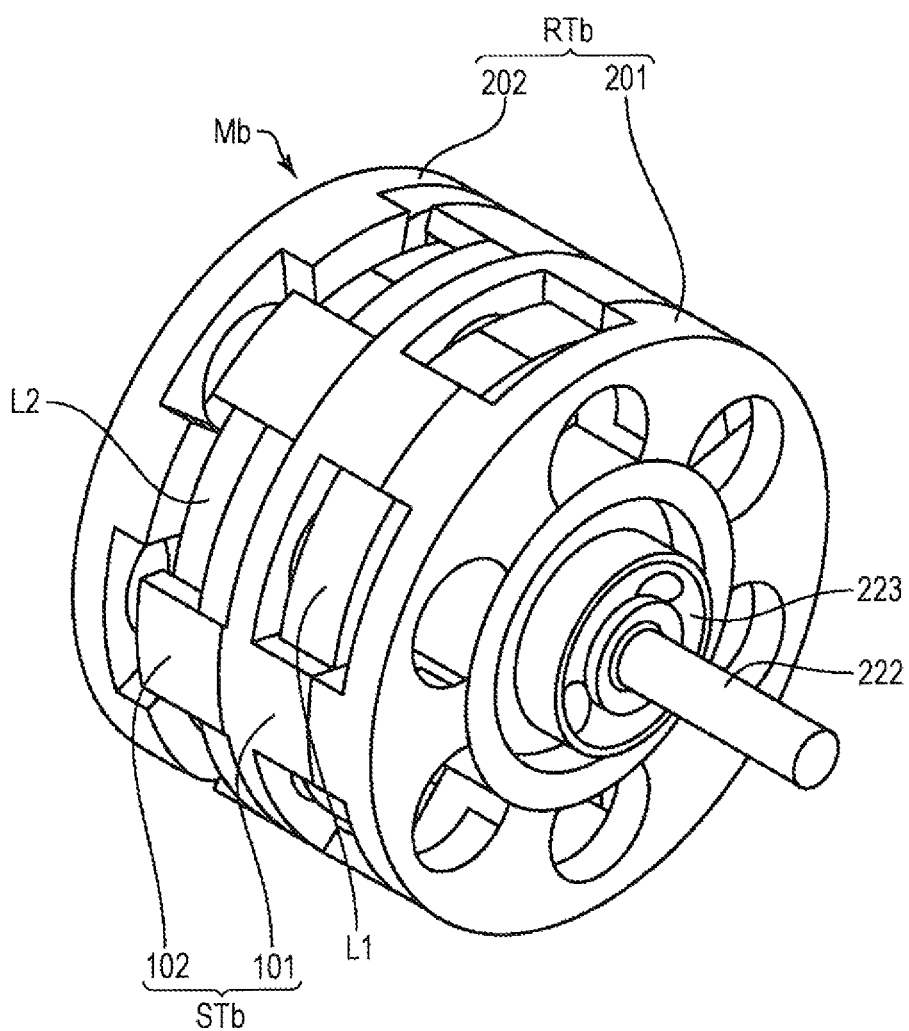
FIG. 3 is a cross-sectional perspective view illustrating the configuration of an axial gap SR motor driven by a motor drive device according to an embodiment.
Figure 4:
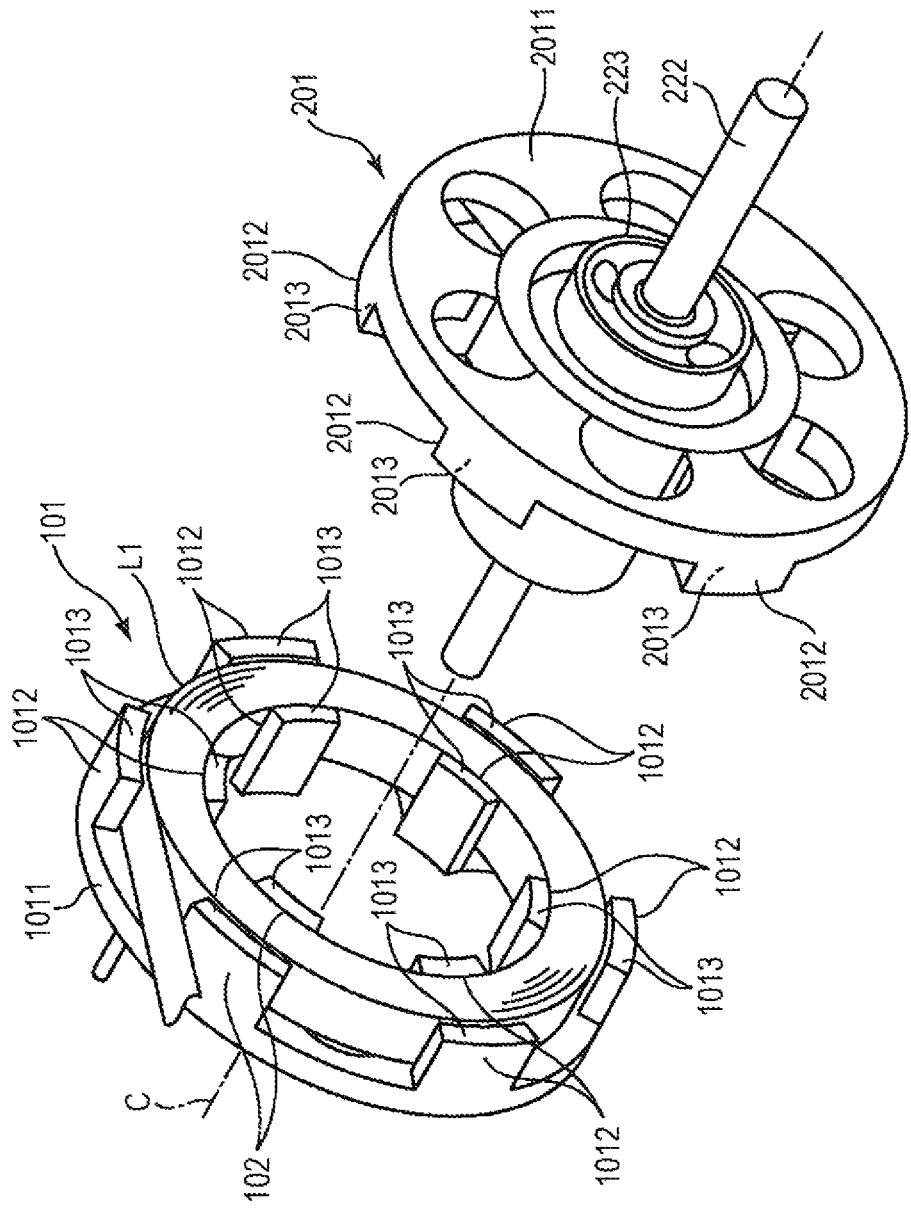
FIG. 4 is a cross-sectional perspective view illustrating the configuration of one layer of stator and rotor in the axial gap SR motor.
Figure 5:
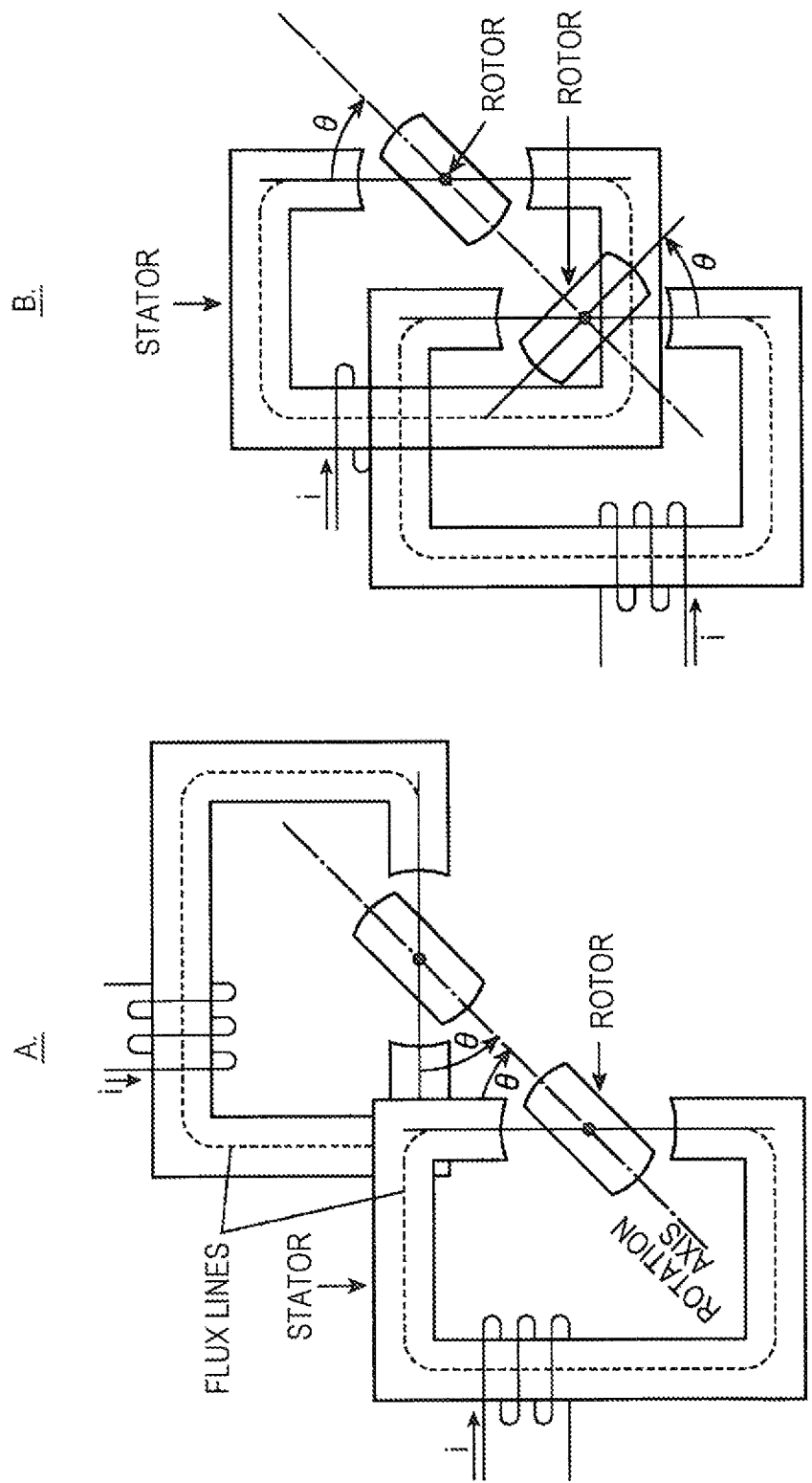
FIG. 5 is a diagram illustrating a magnetic equivalent circuit of a brushless motor driven by a motor drive device according to an embodiment.

FIG. 1 is a cross-sectional perspective view illustrating the configuration of a radial gap SR motor driven by a motor drive device according to an embodiment. FIG. 2 is a cross-sectional perspective view illustrating the configuration of a stator in the radial gap SR motor. FIG. 3 is a cross-sectional perspective view illustrating the configuration of an axial gap SR motor driven by a motor drive device according to an embodiment. FIG. 4 is a cross-sectional perspective view illustrating the configuration of one layer of stator and rotor in the axial gap SR motor. FIG. 5 is a diagram illustrating a magnetic equivalent circuit of a brushless motor driven by a motor drive device according to an embodiment. FIG. 5A illustrates a magnetic equivalent circuit in a case where the stator is anti-symmetrical, and FIG. 5B illustrates a magnetic equivalent circuit in a case where the rotor is anti-symmetrical.

First, the radial gap SR motor will be described. A radial gap SR motor (hereinafter abbreviated to "RG-SR motor") Ma is provided with a stator STa which is a non-rotational portion, and a rotor RTa which is a rotational portion that rotates relative to the stator STa, in FIG. 1. The stator STa and rotor RTa are disposed across a predetermined gap in the radial direction.

The rotor RTa has a rotor main body 21 and multiple rotor-side magnetic poles 24. In the example illustrated in FIG. 1, the rotor RTa further includes an output shaft 22 and a bearing member 23.

The output shaft 22 is a rotational shaft (output shaft, shaft) attached to the rotor main body 21 in order to externally extract rotational force (rotational torque) of the rotor RTa. The output shaft 22 is a rod member formed as a cylindrical rod for example, and is fixed to the rotor main body 21 such that the axis of the rotor main body 21 and the axis of the output shaft match.

The bearing member 23 is attached to a casing, omitted from illustration, that surrounds the stator STa and rotor RTa except for the output shaft 22, and is a member such as a bearing or the like, for example, which rotatably supports the output shaft 22 as to the casing.

The rotor main body 21 is a disc-shaped or cylindrical member which rotates on an axis C along with the output shaft 22, due to magnetic interaction between the rotor-side magnetic poles 24 and later-described stator-side magnetic poles 12 that are provided on the stator STa. The rotor main body 21 is formed of a magnetic material.

The rotor-side magnetic poles 24 are shaped such that increase and decrease of magnetic resistance is repeated between the stator-side magnetic poles 12 and the rotor-side magnetic poles 24 when the rotor main body 21 is rotated in a state where later-described excitation coils L1 and L2 provided to the stator ST are excited. The rotor-side magnetic poles 24 are formed of a magnetic material. The rotor-side magnetic poles 24 are shaped as protrusions which extend along the axis C direction and also protrude outwards in the radial direction. The multiple rotor-side magnetic poles 24 are provided arrayed at predetermined intervals in the circumferential direction (rotational direction) of the outer periphery of the rotor main body 21. Six of these rotor-side magnetic poles 24 are arrayed at predetermined intervals in the circumferential direction in the example illustrated in FIG. 1. Each rotor-side magnetic pole 24 has at the tip thereof a magnetic pole face (rotor-side magnetic pole face) 25 which protrudes outwards in the radial direction, shaped as an arc corresponding to (parallel to) magnetic pole faces 13 of the stator-side magnetic poles 12 as viewed in the axis C direction. That is to say, the rotor-side magnetic pole faces 25 are protruding curved faces protruding outwards in the radial direction, as viewed in the radial direction. The magnetic pole faces 25 of the rotor-side magnetic poles 24 are situated on a common (the same) circumference that is concentric with the output shaft 22 as viewed in the axis C direction.

The stator STa is provided with a stator main body 11, the stator-side magnetic poles 12, and two primary and secondary excitation coils L (L1, L2) corresponding to the two phases.

The stator main body 11 is a member tubular in form, for example, to hold each of the ring-shaped excitation coils L1 and L2. The stator main body 11 is formed of a magnetic material. The stator main body 11 surrounds the rotor RTa in the rotational direction thereof, and accommodates the excitation coils L1 and L2 on the inner side (axis C side) thereof.

The excitation coils L are wound coils that generate a magnetic field by receiving a supply of electric power. Two excitation coils L are disposed on the stator main body 11, so as to be arrayed in the axis C direction of the output shaft 22. The excitation coils L1 and L2 are ring-shaped, disposed such that the rotor RTa passes through the core portion thereof and so that the axes of the excitation coils L1 and L2 and the axis of the rotor RTa match. These excitation coils L1 and L2 generate rotational force at the rotor RTa by switched reluctance, based on magnetic resistance between the stator STa and rotor RTa in a case where electric current is supplied thereto and excitation occurs to drive the RG-SR motor Ma. The excitation coils L1 and L2 are so-called pancake-type coils, formed by winding band-shaped electroconductive wire in a coil form while insulating, so that the thickness direction faces the radial direction of the coil 22 (i.e., flat-wise).

The excitation coil L1 is an example of a primary excitation coil of a first phase, and while one is used in the present embodiment, multiple excitation coils connected in series may be used. In the same way, the excitation coil L2 is an example of a secondary excitation coil of a second phase, and while one is used in the present embodiment, multiple excitation coils connected in series may be used.

The stator-side magnetic poles 12 are shaped such that increase and decrease of magnetic resistance is repeated between the stator-side magnetic poles 12 and the rotor-side magnetic poles 24 when the rotor main body 21 is rotated in a state where the excitation coils L1 and L2 are excited. The stator-side magnetic poles 12 are formed of a magnetic material. The stator-side magnetic poles 12 are shaped as protruding pieces protruding from the inner periphery face of the cylindrical stator main body 11 toward the axis C side (inwards in the radial direction). The multiple stator-side magnetic poles 12 are provided arrayed at predetermined intervals in the circumferential direction (rotational direction) of the inner periphery face of the stator main body 11. Six of these stator-side magnetic poles 12 are arrayed at predetermined intervals in the circumferential direction in the example illustrated in FIG. 1. Each stator-side magnetic pole 12 has at the tip thereof a magnetic pole face (stator-side magnetic pole face) 13 which is recessed outwards in the radial direction, shaped as an arc following the rotor RTa as viewed in the axis C direction. That is to say, the stator-side magnetic pole faces 13 are recessed curved faces recessed outwards in the radial direction, as viewed in the radial direction. The magnetic pole faces 13 of the stator-side magnetic poles 12 are situated on a common (the same) circumference that is concentric with the output shaft 22 as viewed in the axis C direction.

The stator-side magnetic poles 12 are provided in two stages in the direction of the axis C, corresponding to the two excitation coils L1 and L2 (two-phase). More specifically, in the example illustrated in FIG. 1 the number of stator-side magnetic poles 12 is twelve, since there are two stages (2 pieces) on either side in the axis C direction of the tubular stator main body 11 of the six stator-side magnetic poles 12 along the circumferential direction of the inner periphery face (=6 pieces×2 stages). Note that the stator-side magnetic poles 12 provided to the right side end in FIG. 1 may also be referred to as first-stage stator-side magnetic poles 12a, and the stator-side magnetic poles 12 provided to the left side end as second-stage stator-side magnetic poles 12b. The number of stator-side magnetic poles 12a and 12b provided to each stage are the same as each other. The number of stator-side magnetic poles 12a and 12b at each stage is the same as the number of the rotor-side magnetic poles 24 of the rotor RTa, which is six in the present embodiment.

The stator main body 11 is provided with a ring-shaped protruding portion 14 that protrudes from the inner periphery face of the stator main body 11 toward the axis C side at approximately the same length as the stator-side magnetic poles 12. That is to say, the length from the inner periphery face of the stator main body 11 to the magnetic pole faces 13 of the stator-side magnetic poles 12, and the length from the inner periphery face of the stator main body 11 to the tip face of the protruding portion 14, are approximately the same. From the perspective of reducing magnetic resistance, the smaller the distance between the magnetic pole faces 13 of the stator-side magnetic poles 12 and the magnetic pole faces 25 of the rotor-side magnetic poles 24 is, the better, and the smaller the distance between the tip face of the protruding portion 14 and the magnetic pole faces 25 of the rotor-side magnetic poles 24 is, the better.

The primary excitation coil L1 is disposed at a position between the first-stage stator-side magnetic poles 12a and the protruding portion 14, and the secondary excitation coil L2 is disposed at a position between the second-stage stator-side magnetic poles 12b and the protruding portion 14.

The positions of the first-stage stator-side magnetic poles 12a and 12b are shifted in the rotational direction (circumferential direction), so that the difference in phase between cyclic change of the inductances due to the primary and secondary excitation coils L1 and L2 as to the rotational angle to the rotor RTa is 180 degrees. Accordingly, the stator STa makes the RG-SR motor Ma anti-symmetrical, as illustrated in FIG. 2. More specifically, in a case where a line connecting a middle position of the stator-side magnetic poles 12 (middle position in the circumferential direction) and the axis is a reference line Ya, a reference line of the first-stage stator-side magnetic poles 12a is Ya1, and a reference line of the second-stage stator-side magnetic poles 12b is Ya2, the reference lines Ya1 of the first-stage stator-side magnetic poles 12a are situated so as to be at the middle between the reference lines Ya2 and Ya2 of two second-stage stator-side magnetic poles 12b adjacent in the circumferential direction. In other words, the reference lines Ya2 of the second-stage stator-side magnetic poles 12b are situated so as to be at the middle between the reference lines Ya1 and Ya1 of two first-stage stator-side magnetic poles 12a adjacent in the circumferential direction. There are six each of the each stage stator-side magnetic poles 12a and 12b in the example illustrated in FIG. 1, and accordingly these are arrayed at 60-degree intervals in the circumferential direction. Accordingly, the first-stage stator-side magnetic poles 12a are disposed at each position where the reference lines Ya1 thereof are shifted 30 degrees (=60 degrees/2) as to each of the reference lines Ya2 of the second-stage stator-side magnetic pole 12b in the counter-clockwise direction (or clockwise direction). In other words, the second-stage stator-side magnetic poles 12b are disposed at each position where the reference lines Ya2 thereof are shifted 30 degrees (=60 degrees/2) as to each of the reference lines Ya1 of the first-stage stator-side magnetic pole 12a in the counter-clockwise direction (or clockwise direction).

Due to the first-stage stator-side magnetic poles 12a and the second-stage stator-side magnetic poles 12b being shifted by the above-described angle, the magnetic equivalent circuit of the RG-SR motor Ma is a circuit illustrated in FIG. 5A. That is to say, in this magnetic equivalent circuit, first flux lines due to the excitation coil L1 of the first phase and second flux lines due to the excitation coil L2 of the second phase intersect the same magnetic pole face 25 of the rotor RTa with an offset of 90 degrees. In other words, the positions of the rotor-side magnetic poles 24 of the first phase and the rotor-side magnetic poles 24 of the second phase are the same. An angle θ formed between a line segment connecting the middle position of the rotor-side magnetic poles 24 (middle position in the circumferential direction) and the axis and the magnetic force lines generated by the excitation coil L1 of the first phase (first stage), and an angle θ formed between a line segment connecting the middle position of the rotor-side magnetic poles 24 and the axis and the magnetic force lines generated by the excitation coil L2 of the second phase (second stage), are in a relationship of being vertically opposite angles, and are offset by 180 degrees. The magnetic circuit due to the excitation coil L1 of the first phase and the magnetic circuit due to the excitation coil L2 of the second phase are independent from each other. To say that a magnetic circuit is independent means that the mutual inductance between the magnetic circuits is of a magnitude that is essentially negligible when driving the SR motor. These magnetic equivalent circuits give the anti-symmetric two phase motor two magnetic circuits which are independent from each other, so as to have the rotor RTa and stator STa in which the cyclic change in the magnetic resistances of the magnetic circuits as to the rotational angle of the rotor RTa are mutually anti-symmetrical.

The above stator main body 11, protruding portion 14, and stator-side magnetic poles 12, and rotor main body 21 and rotor-side magnetic poles 24, are each formed of a magnetic material as described above, so as to have predetermined isotropic magnetic properties (magnetic permeability). The stator main body 11 and stator-side magnetic poles 12, and the rotor main body 21 and rotor-side magnetic poles 24, are formed of a soft magnetic powder covered by an electrically insulating film. More specifically, the stator main body 11, protruding portion 14, and stator-side magnetic poles 12, are integrally formed, by compacting a soft magnetic powder covered by an electrically insulating film under pressure. The rotor main body 21 and rotor-side magnetic poles 24 are integrally formed by compacting a soft magnetic powder covered by an electrically insulating film under pressure. These are formed of iron powder upon which surface an electrically insulating film such as a phosphate chemical film has been formed. The soft magnetic powder is ferromagnetic metal powder, specific examples of which include pure iron powder, iron-based alloy powder (Fe—Al alloy, Fe—Si alloy, Sendust, permalloy, etc.), and amorphous powder and so forth. These soft magnetic powders can be manufactured by known means, such as a method of forming microparticles by atomization or the like, a method of finely pulverizing iron oxide or the like and then reducing, or the like, for example. Generally, if the magnetic permeability is the same, the saturation magnetic flux density is great, so the soft magnetic power is particularly preferably a metal material such as the aforementioned pure iron powder, iron-based alloy powder, and amorphous powder and so forth, for example.

The stator main body 11, protruding portion 14, and stator-side magnetic poles 12, formed of such a soft magnetic powder, is formed by known common techniques, such as powder compacting, for example. The rotor main body 21 and rotor-side magnetic pole 24 formed of such a soft magnetic powder, is formed by known common techniques, such as powder compacting, for example.

The stator main body 11, protruding portion 14, and stator-side magnetic poles 12, and rotor main body 21 and rotor-side magnetic poles 24, may be formed by compacting a mixture of a soft magnetic powder and a non-magnetic powder under pressure. In this case, the mixture ratio of the soft magnetic powder and non-magnetic powder can be adjusted relatively easily, so desired magnetic properties can be easily realized by appropriately adjusting the mixture ratio. The stator main body 11, protruding portion 14, and stator-side magnetic poles 12, and rotor main body 21 and rotor-side magnetic poles 24, may by formed by cast molding soft magnetic powder covered with an electrically insulating film along with a binding medium (e.g., a liquid or powder or the like of an epoxy resin or the like).

Next, the axial gap SR motor will be described. An axial gap SR motor (hereinafter abbreviated to "AG-SR motor") Mb is provided with a stator STb which is a non-rotational portion, and a rotor RTb which is a rotational portion that rotates relative to the stator STb, in FIG. 3. The stator STa and rotor RTb are disposed across a predetermined gap in the axial direction. The rotor RTb rotates on the axis C in a state of facing excitation coils L1 and L2 held by the stator STb, thus rotating relative to the stator STb.

The stator STb is provided with a pair of stator main bodies 101 and 102, multiple stator-side magnetic poles 1012, and two primary and secondary excitation coils L (L1, L2) corresponding to the two phases. The pair of rotor RTb is provided with a pair of rotor main bodies 201 and 202, multiple rotor-side magnetic poles 2012, and in the example illustrated in FIG. 3, further includes an output shaft 222 and bearing member 223.

The pair of stator main bodies 101 and 102 are the same in shape and only differ with regard to the point that the stator main body 101 holds the ring-shaped primary excitation coil L1 while the stator main body 102 holds the ring-shaped secondary excitation coil L2. The pair of rotor main bodies 201 and 202 are the same in shape. One phase worth of the stator main body 101 and stator main body 102 will be described below with reference to FIG. 4, primarily regarding the structure thereof.

The stator main body 101 is a member in the form of a plate in a ring shape (a disc with a through hole formed at the middle), with the rotor RTb holding the ring-shaped excitation coil L1 by passing through the core thereof. The stator main body 101 is formed of a magnetic material. The excitation coil L1 as well as the excitation coil L2 are the same as the excitation coils L1 and L2 in the RG-SR motor Ma.

The excitation coil L1 is an example of a primary excitation coil of a first phase, and while one is used in the present embodiment, multiple excitation coils connected in series may be used. In the same way, the excitation coil L2 is an example of a secondary excitation coil of a second phase, and while one is used in the present embodiment, multiple excitation coils connected in series may be used.

The stator-side magnetic poles 1012 are shaped such that increase and decrease of magnetic resistance is repeated between the stator-side magnetic poles 1012 and later-described rotor-side magnetic poles 2012 when the rotor main body 201 is rotated in a state where the excitation coil L1 is excited. The stator-side magnetic poles 1012 are formed of a magnetic material. The stator-side magnetic poles 1012 are shaped as protruding pieces erected from a face of the ring-shaped plate stator main body 101 facing the rotor main body 201, following each of the outer periphery face and inner periphery face of the excitation coil L1. The multiple stator-side magnetic poles 1012 are provided arrayed at predetermined intervals in the circumferential direction of the excitation coil L1. Six of these stator-side magnetic poles 12 are arrayed at predetermined intervals in the circumferential direction in the example illustrated in FIGS. 3 and 4. In other words, the stator-side magnetic poles 1012 are each provided to the stator main body 101 so that the excitation coil L1 fits into a recess, heading from the rotor RTb toward the stator STb, that is formed by the stator main body 101 and pairs of stator-side magnetic poles 1012 following each of the outer periphery face and inner periphery face of the stator main body 101.

The rotor main body 201 is a cylindrical member which rotates on the axis C along with the output shaft 222 due to magnetic interaction between the rotor-side magnetic poles 2012 and the stator-side magnetic poles 1012. The rotor main body 201 is formed of a magnetic material.

The rotor-side magnetic poles 2012 are shaped such that increase and decrease of magnetic resistance is repeated between the stator-side magnetic poles 1012 when the rotor main body 201 is rotated in a state where the excitation coil L1 provided to the stator STb is excited. The rotor-side magnetic poles 2012 are formed of a magnetic material. The rotor-side magnetic poles 2012 are shaped as protrusions which protrude outwards in the radial direction from the outer periphery face of the cylindrical rotor main body 201. The multiple rotor-side magnetic poles 2012 are provided arrayed at predetermined intervals in the circumferential direction (rotational direction) of the outer periphery of the rotor main body 201. Six of these rotor-side magnetic poles 2012 are arrayed at predetermined intervals in the circumferential direction in the example illustrated in FIGS. 3 and 4. More specifically, the rotor-side magnetic poles 2012 are shaped to surround the four sides of the excitation coil L1 in collaboration with the pairs of stator-side magnetic poles 1012 corresponding to the rotor-side magnetic poles 2012, and the stator main body 101. More specifically, each rotor-side magnetic pole 2012 extends outwards in the radial direction from the outer periphery face of the rotor main body 201 such that a face 2013 facing the stator STb (rotor-side magnetic pole face) is in a state with a predetermined gap between the face 2013 and a tip face 1013 of the stator-side magnetic pole 1012 (stator-side magnetic pole face) and excitation coil L1. That is to say, a predetermined gap in the axis C direction is formed between the stator-side magnetic pole face 1013 and rotor-side magnetic pole face 2013 of the rotor-side magnetic pole 2012, and also is formed between the end of the excitation coil L1 at the rotor RTb side and the rotor-side magnetic pole face 2013. The rotor-side magnetic poles 2012 are mutually connected to circumferentially adjacent rotor-side magnetic poles 2012 by the edge portions thereof partially extending in the circumferential direction in the example illustrated in FIGS. 3 and 4. The smaller the distance between the magnetic pole face 1013 of the stator-side magnetic pole 1012 and the magnetic pole face 2013 of the rotor-side magnetic pole 2012 is, the more preferable.

The output shaft 222 is a rotational shaft (output shaft, shaft) attached to the rotor main body 201 in order to externally extract rotational force (rotational torque) of the rotor RTb, in the same way as with the output shaft 22 of the RG-SR motor Ma. The output shaft 222 is a rod member formed as a cylindrical rod for example, and is fixed to the rotor main body 201 such that the axis of the rotor main body 201 and the axis of the output shaft match. The bearing member 223 is attached to a casing, omitted from illustration, that surrounds the stator STb and rotor RTb except for the output shaft 222, in the same way as the bearing member 23 of the RG-SR motor Ma, and is a member such as a bearing or the like, for example, which rotatably supports the output shaft 222 as to the casing.

The one phase worth of stator main body 101 and rotor main body 201, and one phase worth of stator main body 102 and rotor main body 202, are assembled as follows. The stator main body 101 and stator main body 102 are bought into contact and fixed at faces where the stator-side magnetic poles 1012 are not erected on each other, and the rotor main body 201 and rotor main body 202 are fixed with the stator main body 101 and stator main body 102 sandwiched therebetween. Accordingly, the excitation coil L1 of the stator main body 101 and the excitation coil L2 of the stator main body 102 are disposed so as to be arrayed in the axis C direction of the output shaft 222. When fixing these phases to each other, the stator main body 101 and stator main body 102 are fixed such that the position where the stator-side magnetic poles 1012 of the stator main body 101 are situated and the position where the stator-side magnetic poles 1012 of the stator main body 102 are situated match, and the rotor main body 201 and the rotor main body 202 are fixed so that the position where the rotor-side magnetic poles 2012 of the rotor main body 201 are situated the position where the rotor-side magnetic poles 2012 of the rotor main body 202 are situated are offset in the rotational direction (circumferential direction), so that the rotor RTb makes the AG-SR motor Mb anti-symmetrical. That is to say, the position where the rotor-side magnetic poles 2012 of the rotor main body 201 are situated the position where the rotor-side magnetic poles 2012 of the rotor main body 202 are situated are shifted in the rotational direction (circumferential direction), so that the difference between the phase in cyclic change of the inductance due to the primary excitation coil L1 as to the rotational angle of the rotor RTb and the phase in cyclic change of the inductance due to the secondary excitation coil L2 as to the rotational angle of the rotor RTb is 180 degrees. More specifically, in a case where a line connecting a middle position of the rotor-side magnetic poles 2012 (middle position in the circumferential direction) of the rotor main body 201 and the axis is a reference line Yb1, and a line connecting a middle position of the rotor-side magnetic pole 2012 (middle position in the circumferential direction) of the rotor main body 202 and the axis is a reference line Yb2, the rotor-side magnetic poles 2012 of the rotor main body 201 are situated so that the reference lines Yb1 thereof are at the middle between the reference lines Yb2 and Yb2 of two rotor-side magnetic poles 2012 of the rotor main body 202 adjacent in the circumferential direction. There are six each of the rotor-side magnetic pole 2012 and 2012 of each phase in the example illustrated in FIG. 4, and accordingly these are arrayed at 60-degree intervals in the circumferential direction. Accordingly, the rotor-side magnetic poles 2012 of the rotor main body 201 are disposed at each position where the reference lines Yb1 thereof are shifted 30 degrees (=60 degrees/2) as to each of the reference lines Yb2 of the rotor-side magnetic poles 2012 of the rotor main body 202 in the counter-clockwise direction (or clockwise direction).

Due to the rotor-side magnetic poles 2012 of the rotor main body 201 of the first phase and the rotor-side magnetic poles 2012 of the rotor main body 202 of the second phase being shifted by the above-described angle, the magnetic equivalent circuit of the AG-SR motor Mb is a circuit illustrated in FIG. 5B. That is to say, in this magnetic equivalent circuit, first flux lines due to the excitation coil L1 of the first phase and second flux lines due to the excitation coil L2 of the second phase are parallel, and the magnetic pole face 2013 of the first phase and the magnetic pole face 2013 of the second phase on the rotor RTb intersect the mutually parallel first flux lines and second flux lines with an offset of 90 degrees. In other words, the positions of the stator-side magnetic pole 1012 of the first phase and the stator-side magnetic pole 1012 of the second phase are the same. An angle θ formed between a line segment connecting the middle position of the rotor-side magnetic pole 2012 of the first phase (middle position in the circumferential direction) and the axis and the magnetic force lines generated by the excitation coil L1 of the first phase, and an angle θ formed between a line segment connecting the middle position of the rotor-side magnetic pole 2012 of the second phase and the axis and the magnetic force lines generated by the excitation coil L2 of the second phase (excitation coil L1 of the first phase), are in a relationship of being vertically opposite angles, and are offset by 180 degrees. The magnetic circuit due to the excitation coil L1 of the first phase and the magnetic circuit due to the excitation coil L2 of the second phase are independent from each other. These magnetic equivalent circuits give the anti-symmetric two phase motor two magnetic circuits which are independent from each other as described above, so as to have the rotor RTb and stator STb in which the cyclic change in the magnetic resistances of the magnetic circuits as to the rotational angle of the rotor RTb are mutually anti-symmetrical.

The above stator main body 101 and stator-side magnetic poles 1012, stator main body 102 and stator-side magnetic poles 1012, rotor main body 201 and rotor-side magnetic poles 2012, and rotor main body 202 and rotor-side magnetic poles 2012, are each formed integrally of a magnetic material in the same way as with the RG-SR motor Ma, so as to have predetermined isotropic magnetic properties (magnetic permeability).

(Motor Drive Device According to First Embodiment)

Figure 6:
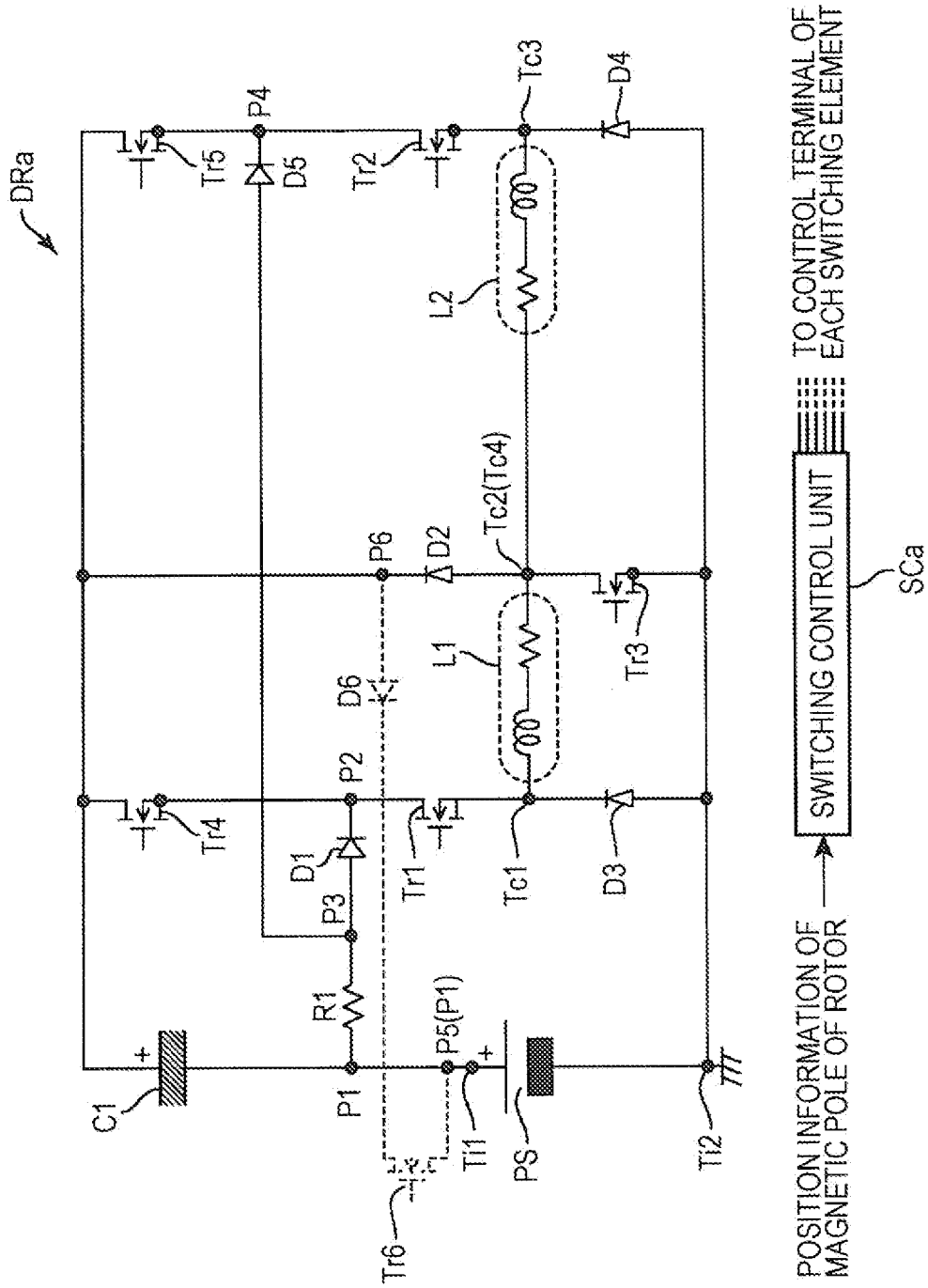
FIG. 6 is a circuit diagram illustrating the configuration of a motor drive device according to a first embodiment.

Next, a motor drive device according to a first embodiment to drive such an anti-symmetric two phase motor M will be described. First, the configuration of a motor drive device DRa according to the first embodiment will be described. FIG. 6 is a circuit diagram illustrating the configuration of the motor drive device according to the first embodiment.

The motor drive device DRa according to the first embodiment includes: a power source terminal for connecting to a power source; a charging and discharging unit that performs charging and discharging, connected in series with the power source terminal; connecting terminals to be connected to each of primary and secondary excitation coils of an anti-symmetric two phase motor, in which difference between phases of cyclic change of inductance as to a rotational angle, due to the primary excitation coil of a first phase and the secondary excitation coil of a second phase, is 180 degrees; and a drive control unit that has a plurality of switching elements, and that forms a first path for independently supplying power to each of the primary and secondary excitation coils from the power source terminal via the connecting terminals, by turning these switching elements on and off, and further forms a second path for independent regeneration of each residual energy remaining in the primary and secondary excitation coils from the respective primary and secondary excitation coils into the charging and discharging unit via the connecting terminals by turning these switching elements on and off. The motor drive device DRa can supply electric power to each of the primary and secondary excitation coils independently, at two respective potential levels. The two potential levels are a potential level of the power source connected via the power source terminal, and the potential level of the serially-connected power source and charging and discharging unit, and the primary and secondary excitation coils can be driven independently. The motor drive device DRa can also independently perform regeneration from each of the primary and secondary excitation coils to the charging and discharging unit.

More specifically, the motor drive device DRa according to the first embodiment includes, as illustrated in FIG. 6 for example, a pair of power source terminals Ti1 and Ti2 to connect a power source PS, a pair of connecting terminals Tc1 and Tc2 to connect the primary excitation coil L1 of the first phase in the anti-symmetrical two phase motor M, a pair of connecting terminal Tc3 and Tc4 to connect the secondary excitation coil L2 of the second phase in the anti-symmetrical two phase motor M, a charging and discharging element C1, rectifying elements D1 through D6, switching elements Tr1 through Tr6, a shunt resistor element R1 which has a predetermined resistance value, used for measuring current, and a switching control unit SCa. The primary excitation coil L1 is an excitation current of the first phase made up of one or multiple coils connected in series, and the secondary excitation coil L2 is an excitation current of the second phase made up of one or multiple coils connected in series.

The rectifying elements D1 through D6, switching elements Tr1 through Tr6, and resistor element R1 are a switch unit forming a predetermined path for current by switching the switching elements Tr1 through Tr6 on and off. This switch unit and the switching control unit SCa are an example of the drive control unit.

Note that in the example of the anti-symmetric two phase SR motor M illustrated in FIG. 6, the other connecting terminal Tc2 for connecting the primary excitation coil L1 of the first phase in the anti-symmetrical two phase SR motor and the other connecting terminal Tc4 for connecting the secondary excitation coil L2 of the second phase use a common connecting terminal. The sixth rectifying element D6 and the sixth switching element Tr6 are illustrated by dashed lines to facilitate visual recognition in FIG. 6. The primary and secondary excitation coils L1 and L2 are illustrated as a series circuit of the inductor component and resistor component in FIG. 6. The power source PS is, for example, a secondary battery which can be charged and discharged.

The charging and discharging element C1 is an element which can store (charge) electric charge (electric power), and discharge the stored electric charge (electric power). The charging and discharging element C1 is, for example, a secondary battery, an electric double-layer capacitor, an electrolytic capacitor, or the like. The charging and discharging element C1 is an electric double-layer capacitor C1 in the present embodiment, since a relatively large capacity can be rapidly charged. The charging and discharging element C1 is connected to the power source terminals Ti1 and Ti2 in series. In a case where the other power source terminal Ti2 is to be grounded for example, the negative terminal of the charging and discharging element C1 is connected to the one power source terminal Ti1.

The rectifying elements D1 through D6 are elements which primarily pass current in one direction, an example of which is a diode, or the like. The switching elements Tr1 through Tr6 are elements which turn current on and off, an example of which is a transistor, or the like. The switching elements Tr1 through Tr6 in the present embodiment each are a power transistor such as an IGBT (Insulated gate bipolar transistor) or the like, for example. The switching elements Tr1 through Tr6 each have a control terminal for input of a control signal Sig which controls turning on and off thereof. The control terminal is, for example, a gate terminal in a case where the switching element Tr is a field effect transistor, and is a base terminal in a case where the switching element Tr is a bipolar transistor.

The switching control unit SCa is a circuit which is connected to each control terminal of the switching elements Tr1 through Tr6 to output the control signal Sig to the witching elements Tr1 through Tr6, in order to control the turning on and off of each switching element Tr1 through Tr6. The switching control unit SCa controls on and off each of the switching elements Tr1 through Tr6 to form predetermined paths of the current in accordance with the positions of the rotor-side magnetic poles 24 or 2012 as to the stator-side magnetic poles 12 or 1202 in the SR motor M, so as to drive the SR motor M (Ma, Mb) by acceleration control or deceleration control. Position information relating to the position of the rotor-side magnetic poles 24 and 2012 in the SR motor M is input to the switching control unit SCa, from a magnetic pole member detecting unit such as a rotary encoder or the like for example, omitted from illustration, that detects the position of the rotor-side magnetic poles 24 or 2012 in the SR motor M. The position of the rotor-side magnetic poles 24 or 2012 in the SR motor M corresponds to the rotational angle (phase) of the rotors RTa and RTb as to the stators STa and STb. The rotational angle (phase) of the rotors RTa and RTb is measured with a reference position set for the stators STa and STb beforehand as zero.

The fourth switching element Tr4, first switching element Tr1, and third rectifying element D3 are connected in series in this order. The second rectifying element D2 and third switching element Tr3 are connected in series in this order. The fifth switching element Tr5, second switching element Tr2, and fourth rectifying element D4 are connected in series in this order. These three serial circuits are connected in parallel to the charging and discharging element C1 and power source terminals Ti1 and Ti2 connected in series.

The shunt resistor element R1 and the first rectifying element D1 are connected in series in this order, between a first contact point P1 of the one power source terminal Ti1 and the charging and discharging element C1, and a second contract point P2 of the fourth switching element Tr4 and the first switching element Tr1. A fifth rectifying element D5 is connected between a third contact point P3 of the shunt resistor element R1 and the first rectifying element D1 and a fourth contact point P4 of the fifth switching element Tr5 and second switching element Tr2, so that current flows from the third contact point P3 toward the fourth contact point P4. The sixth switching element Tr6 and the sixth rectifying element D6 are connected in series in this order, between a fifth contact point P5 of the one power source terminal Ti1 and the charging and discharging element C1 (i.e., the first contact point P1) and a sixth contact point P6 of the charging and discharging element C1 and the second rectifying element D2.

The contact point of the first switching element and the third rectifying element D3 is the connecting terminal Tc1, the contact point of the second rectifying element D2 and the third switching element Tr3 is the connecting terminal Tc2 (Tc4), and the contact point of the second switching element Tr2 and fourth rectifying element D4 is the connecting terminal Tc3.

The first rectifying element D1 is connected so as to enable current to flow from the first contact point (third contact point) P1 (P3) toward the second contact point P2. The second rectifying element D2 is connected so as to enable current to flow from the connecting terminal Tc2 (Tc4) toward the sixth contact point P6. The third rectifying element D3 is connected so as to enable current to flow from the ground toward the connecting terminal Tc1. The fourth rectifying element D4 connected so as to enable current to flow from the ground toward the connecting terminal Tc3. The fifth rectifying element D5 is connected so as to enable current to flow from the third contact point P3 toward the fourth contact point P4. The sixth rectifying element D6 is connected so as to enable current to flow from the sixth contact point P6 toward the sixth switching element Tr6.

As one example described in further detail, the negative terminal of the electric double-layer capacitor C1 is connected to the positive power source terminal Ti1, one terminal of the resistor element R1, and the drain terminal of the sixth transistor Tr6. The positive terminal of the electric double-layer capacitor C1 is connected to the source terminal of the fourth transistor Tr4, cathode terminal of the second diode D2, anode terminal of the sixth diode D6, and source terminal of the fifth transistor Tr5. The source terminal of the sixth transistor Tr6 is connected to the cathode terminal of the sixth diode terminal D6. The other terminal of the resistor element R1 is connected to the anode terminal of the first diode D1 and the anode terminal of the fifth diode D5. The cathode terminal of the first diode D1 is connected to the drain terminal of the fourth transistor Tr4 and the source terminal of the first transistor Tr1. The cathode terminal of the fifth diode D5 is connected to the drain terminal of the fifth transistor Tr5 and the source terminal of the second transistor Tr2.

The drain terminal of the first transistor Tr1 is connected to the cathode terminal of the third diode D3, and the anode terminal of the third diode D3 is grounded. The anode terminal of the second diode D2 is connected to the source terminal of the third transistor Tr3, and the drain terminal of the third transistor Tr3 is grounded. The drain terminal of the second transistor Tr2 is connected to the cathode terminal of the fourth diode D4, and the anode terminal of the fourth diode D4 is grounded.

Figure 7:
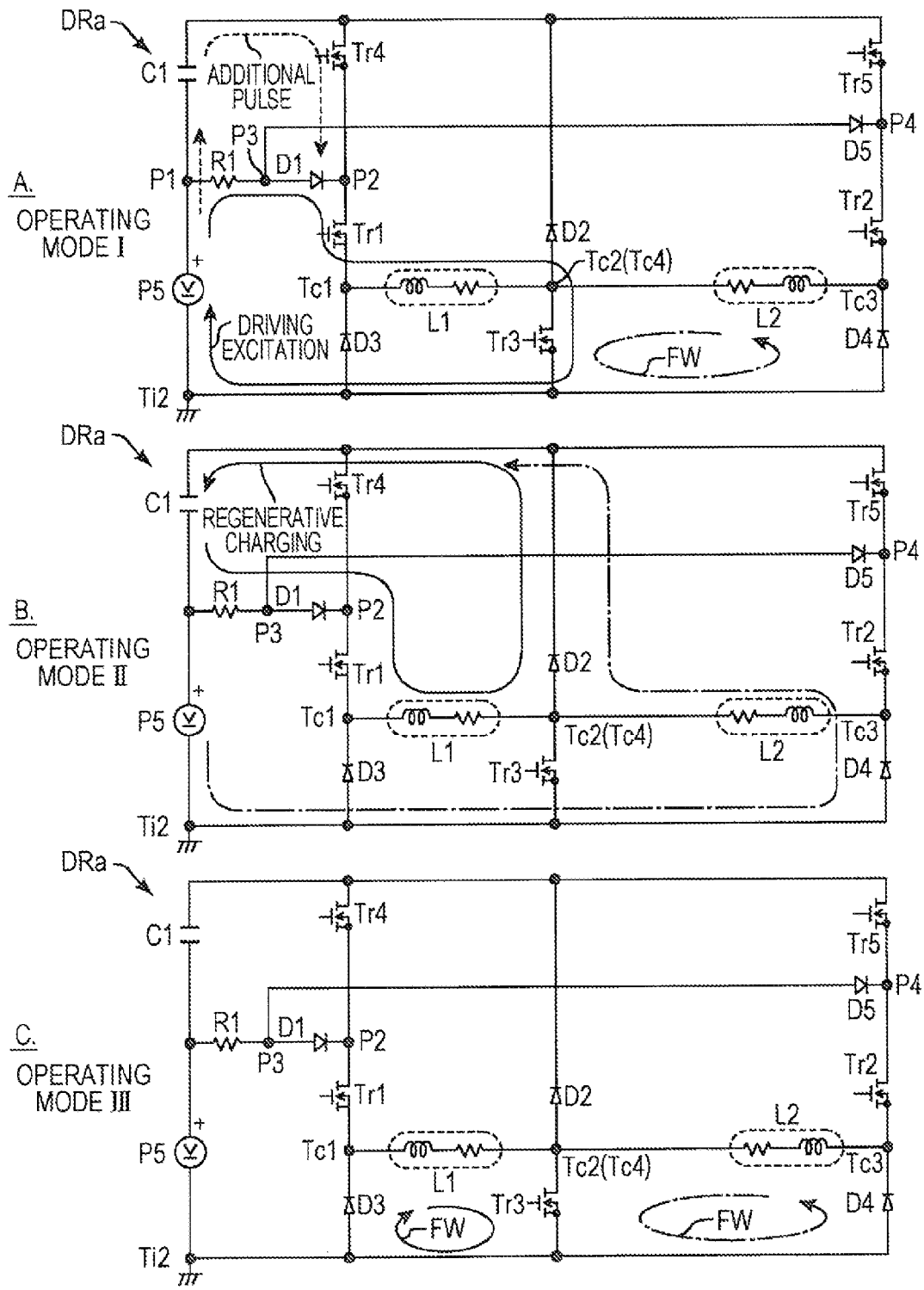
FIG. 7 is a diagram for describing operations (operating modes I through III) at the time of acceleration control at the motor drive device according to the first embodiment.
Figure 8:
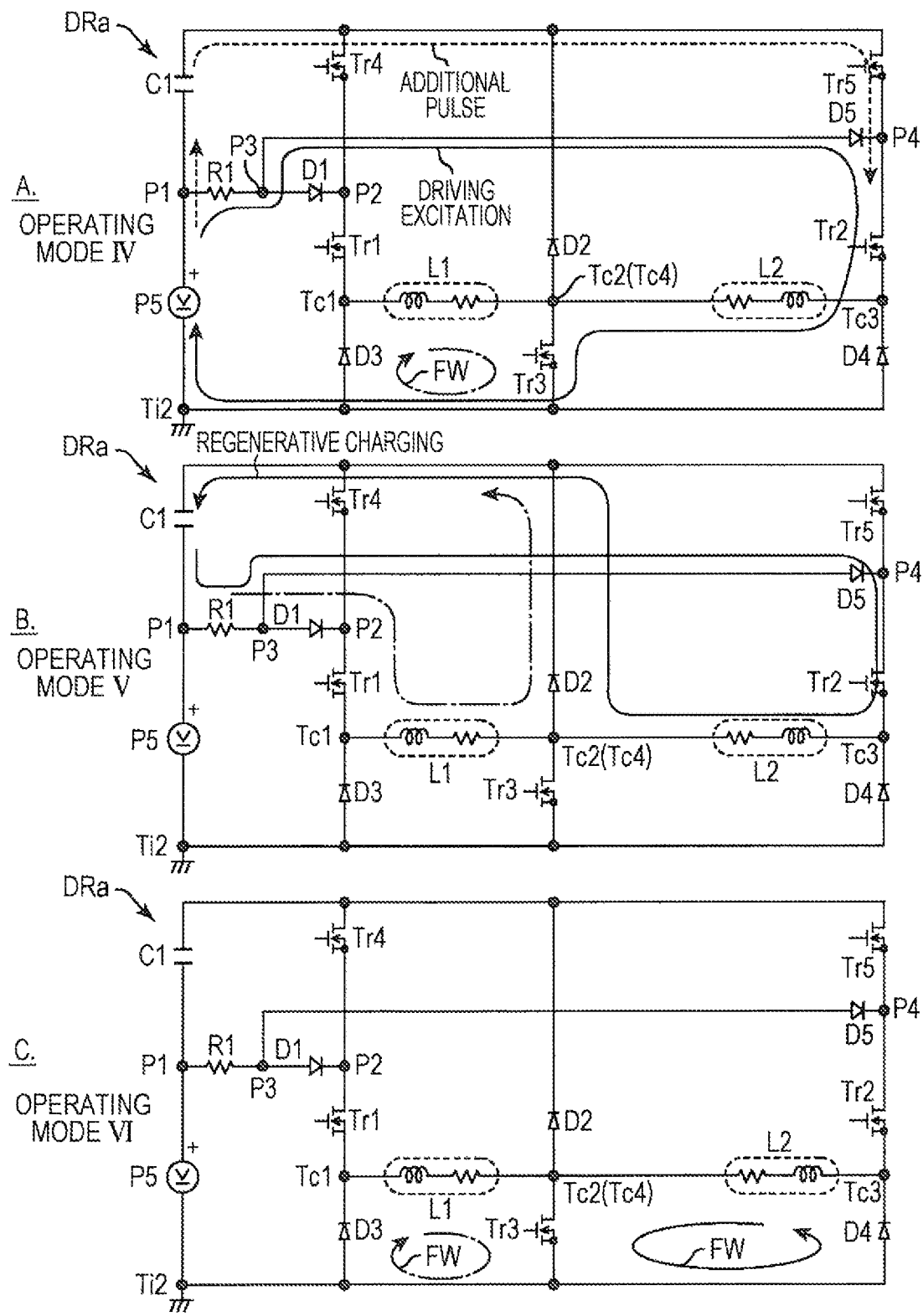
FIG. 8 is a diagram for describing operations (operating modes IV through VI) at the time of acceleration control at the motor drive device according to the first embodiment.
Figure 9:
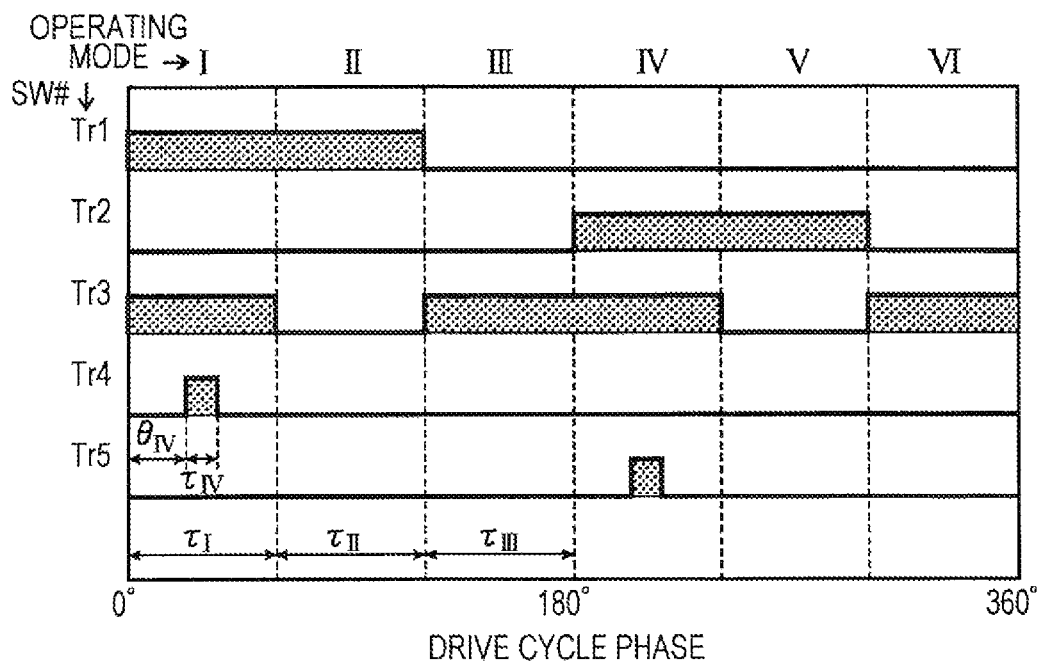
FIG. 9 is a time chart illustrating on/off timing of switching devices at the time of acceleration control in the motor drive device according to the first embodiment.
Figure 10:
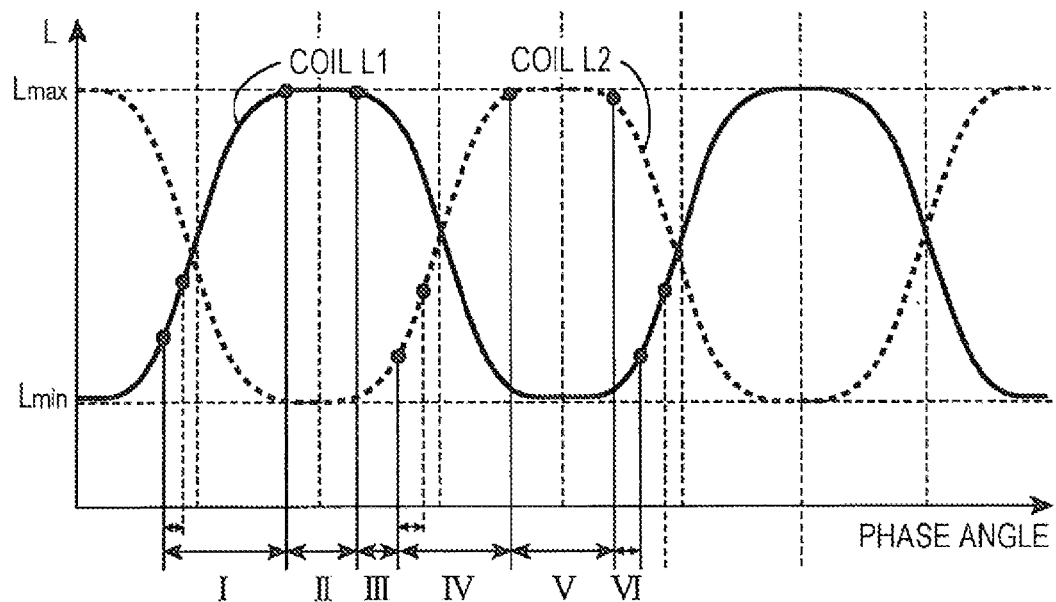
FIG. 10 is a diagram illustrating change in inductance at coils during the acceleration control.

Next, the operations of the motor drive device DRa according to the first embodiment will be described. FIG. 7 is a diagram for describing operations (operating modes I through III) at the time of acceleration control at the motor drive device according to the first embodiment. FIG. 7A illustrates a case of a first operating mode I, FIG. 7B illustrates a case of a second operating mode II, and FIG. 7C illustrates a case of a third operating mode III. FIG. 8 is a diagram for describing operations (operating modes IV through VI) at the time of acceleration control at the motor drive device according to the first embodiment. FIG. 8A illustrates a case of a fourth operating mode IV, FIG. 8B illustrates a case of a fifth operating mode V, and FIG. 8C illustrates a case of a sixth operating mode VI. FIG. 9 is a time chart illustrating on/off timing of switching devices at the time of acceleration control in the motor drive device according to the first embodiment. The on/off timing of the first switching element Tr1 through the fifth switching element Tr5 is illustrated in order from top tier to bottom tier in FIG. 9, and the horizontal axis represents the driving cycle phase. With regard to the driving cycle phase, the example illustrated in FIG. 9 is a schematic representation of a cycle where a switching pattern that changes as operating mode I→II→III→IV→V→VI is cyclically repeated. FIG. 10 is a diagram illustrating change in inductance at coils during the acceleration control. The horizontal axis in FIG. 10 is the phase angle, and the vertical axis is inductance. The roman numerals appended at the top tier in FIG. 9 and to the horizontal axis in FIG. 10 correspond to the first through sixth operating modes I through VI, respectively. This is the same in the later-described FIG. 13 and FIG. 14 as well.

Figure 11:
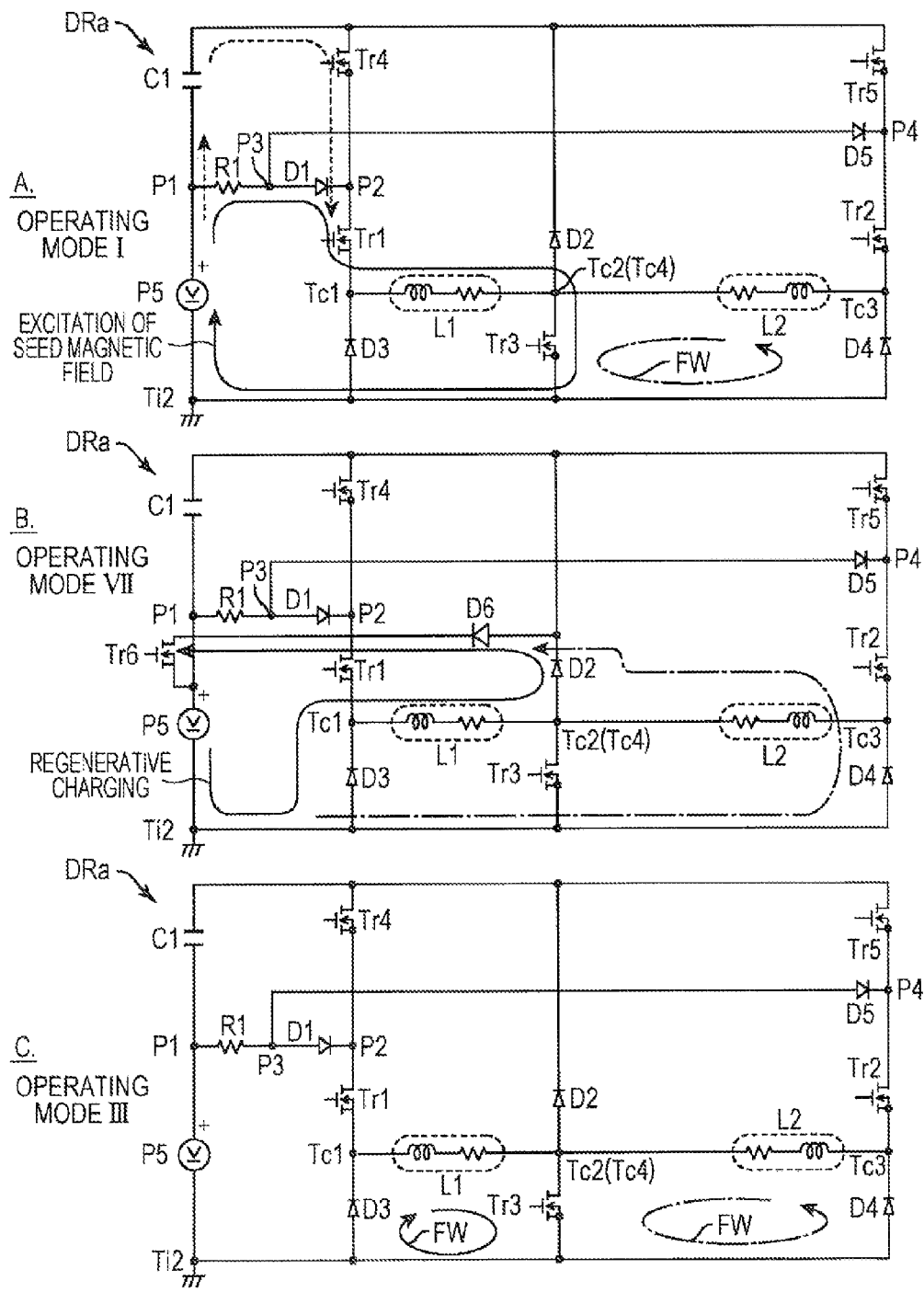
FIG. 11 is a diagram for describing operations (operating modes I, VII and III) at the time of deceleration control at the motor drive device according to the first embodiment.
Figure 12:
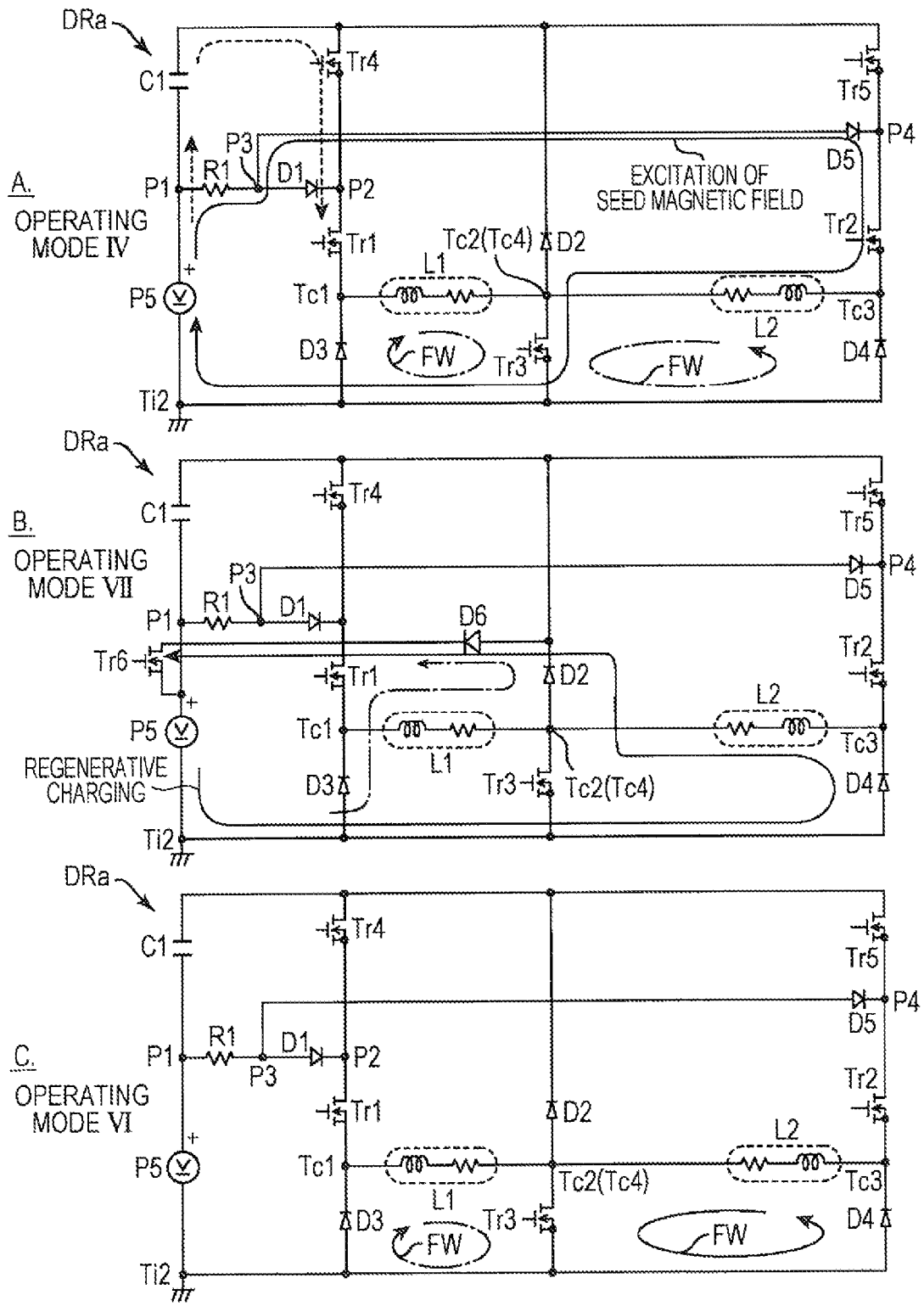
FIG. 12 is a diagram for describing operations (operating modes IV, VII, and VI) at the time of deceleration control at the motor drive device according to the first embodiment.
Figure 13:
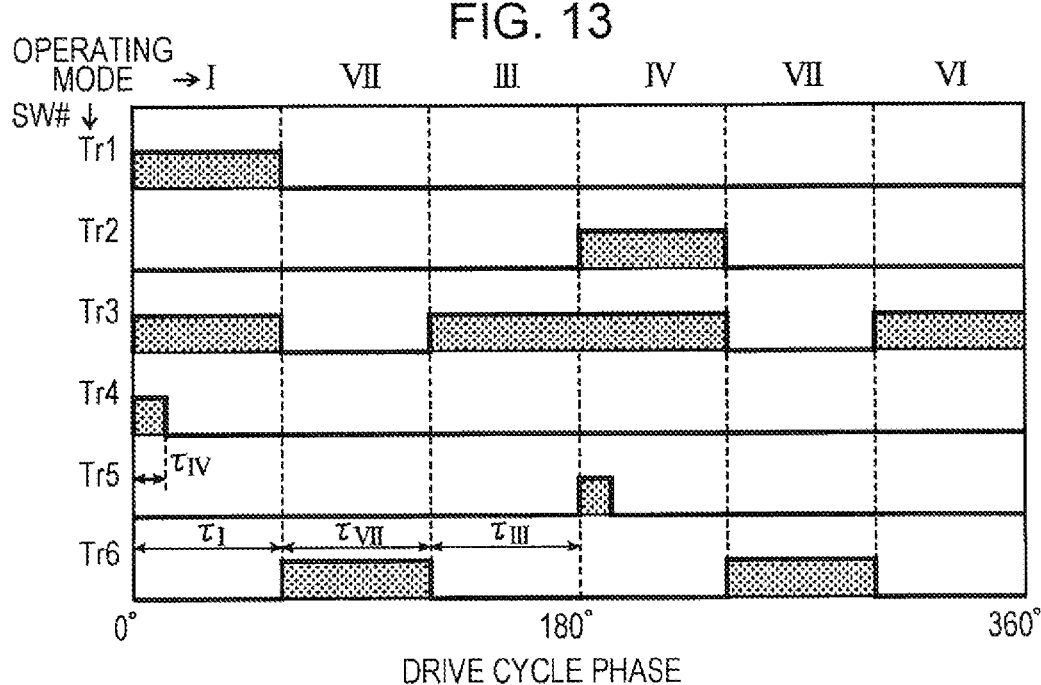
FIG. 13 is a time chart illustrating on/off timing of switching devices at the time of deceleration control in the motor drive device according to the first embodiment.
Figure 14:
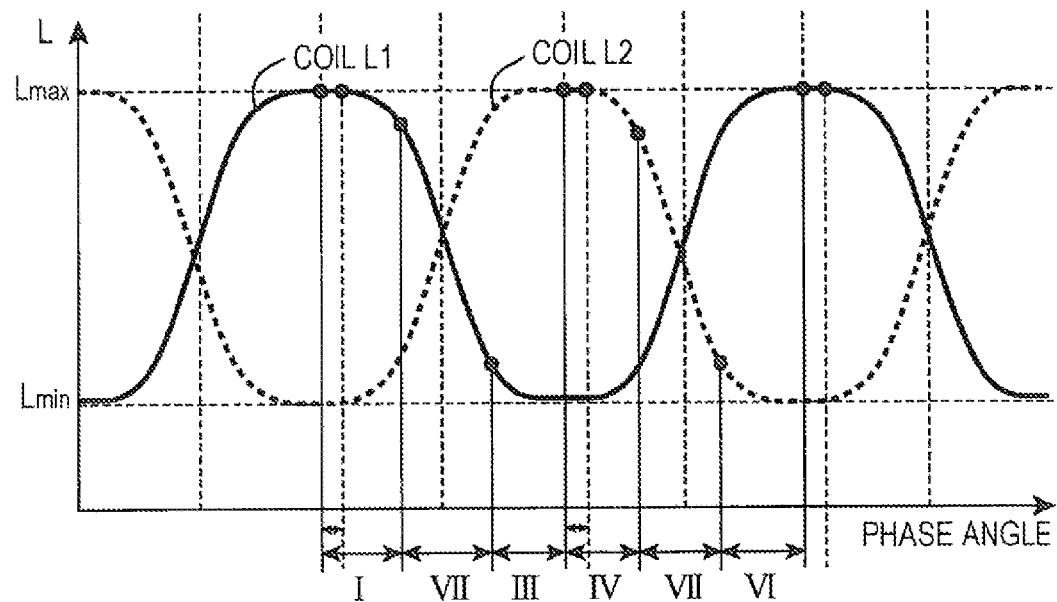
FIG. 14 is a diagram illustrating change in inductance at coils during the deceleration control.

FIG. 11 is a diagram for describing operations (operating modes I, VII and III) at the time of deceleration control at the motor drive device according to the first embodiment. FIG. 11A illustrates a case of the first operating mode I, FIG. 11B illustrates a case of the seventh operating mode VII, and FIG. 11C illustrates a case of the third operating mode III. FIG. 12 is a diagram for describing operations (operating modes IV, VII, and VI) at the time of deceleration control at the motor drive device according to the first embodiment. FIG. 12A illustrates a case of the fourth operating mode IV, FIG. 12B illustrates a case of the seventh operating mode VII, and FIG. 12C illustrates a case of the sixth operating mode VI. FIG. 13 is a time chart illustrating on/off timing of switching devices at the time of deceleration control in the motor drive device according to the first embodiment. The on/off timing of the first switching element Tr1 through the sixth switching element Tr6 is illustrated in order from top tier to bottom tier in FIG. 13, and the horizontal axis represents the driving cycle phase. FIG. 14 is a diagram illustrating change in inductance at coils during the deceleration control.

The motor drive device DRa controls the first through sixth switching elements Tr1 through Tr6 to be in one of the multiple driving modes I through VII, thereby driving the SM motor M to be driven, and alternatively perform acceleration control and deceleration control. During acceleration control, the motor drive device DRa cyclically repeats an operating pattern which changes in the order of first operating mode I, second operating mode II, third operating mode III, fourth operating mode IV, fifth operating mode V, and sixth operating mode VI. During deceleration control, the motor drive device DRa cyclically repeats an operating pattern which changes in the order of first operating mode I, seventh operating mode VII, third operating mode III, fourth operating mode IV, seventh operating mode VII, and sixth operating mode VI. Acceleration control of the motor drive device DRa will be described with reference to FIG. 7 through FIG. 10, and thereafter deceleration control of the motor drive device DRa will be described with reference to FIG. 11 through FIG. 14.

In acceleration control at the motor drive device DRa, first, the primary excitation coil L1 of the first phase is excited, and while the inductance at the primary excitation coil L1 of the first phase is increasing along with rotation of the rotor RT, the SE motor M is driven in the first operating mode I. More specifically, the motor drive device DRa starts driving the SR motor M in the first operating mode I with a predetermined No. 1 phase as a starting point, in a case where the inductance of the primary excitation coil L1 of the first phase is increasing along with rotation of the rotor RT. This No. 1 phase is preferably a phase where the rate of change of inductance at the primary excitation coil L1 of the first phase (rate of change of increase) along with rotations of the rotor RT is the greatest. In this first operating mode I, the first and third switching elements Tr1 and Tr3 are turned on, and the other second and fourth through sixth switching elements Tr2 and Tr4 through Tr6 are turned off, as illustrated in FIG. 9. Thus, excitation current flows from the power source PS to the primary excitation coil L1 of the first phase, via a path from the power source PS via the power source terminal Ti1, resistor element R1, first rectifying element D1, first switching element Tr1, connecting terminal Tc1, excitation coil L1 of the first phase, connecting terminal Tc2, third switching element Tr3, and power source terminal Ti2, and returning to the power source PS (example of path of first form on first path) as illustrated in FIG. 7A. In this first operating mode I, when the phase angle θ in the cyclic change of inductance of the primary excitation coil L1 of the first phase (hereinafter called "phase angle θ") reaches a predetermined angle θIV set beforehand, the fourth switching element Tr4 is turned on for a predetermined time τIV set beforehand. The fourth switching element Tr4 turning on discharges the electric charge stored in the charging and discharging element C1 (electric charge regeneration-charged primarily from the secondary excitation coil L2 of the second phase which will be described later, zero when starting). Current flows from the charging and discharging element C1 to the fourth transistor Tr4, first transistor Tr1, connecting terminal Tc1, primary excitation coil L1 of the first phase, connecting terminal Tc2, third switching element Tr3, power source terminal Ti2, power source PS, power source terminal Ti1, and back to the charging and discharging element C1 (example of path of fifth form on third path). Thus, current from the charging and discharging element C1 is applied from the charging and discharging element C1 to the primary excitation coil L1 of the first phase in addition to the current from the power source PS (additional current pulse). While description has been made above that the electric charge of the charging and discharging element C1 is used partway through the first operating mode I, the electric charge of the charging and discharging element C1 may be used at the same time as starting the first operating mode I, in order to increase the initial acceleration. Also, the secondary excitation coil L2 of the second phase is in a freewheeling state continuing from the sixth operating mode VI which will be described later, and there is reflux of a current from the secondary excitation coil L2 of the second phase to the connecting terminal Tc2, third switching element Tr3, fourth rectifying element D4, and connecting terminal Tc3, and back to the secondary excitation coil L2 of the second phase (example of path of eighth form on fourth path).

Thus, according to one example, the first operating mode I is primarily a first electricity supply mode, and in a case where the secondary excitation coil L2 of the second phase is in a freewheeling state continuing from the sixth operating mode VI, the first operating mode I also includes a second current circulation mode.

In a case where the phase angle θ reaches a predetermined angle set beforehand, e.g., an angle where the inductance of the primary excitation coil L1 reaches an angle where inductance exhibits the maximum value Lmax (angle where the inductance of the secondary excitation coil L2 exhibits the minimum value Lmin) as illustrated in FIG. 10, the motor drive device DRa drives the SR motor M in the second operating mode II. In the second operating mode II, the first switching element Tr1 is turned on and the other second through sixth switching elements Tr2 through Tr6 are turned off, as illustrated in FIG. 9. Accordingly, current generated by the electromotive force at the primary excitation coil L1 of the first phase flows to the charging and discharging element C1 over a path from the primary excitation coil L1 of the first phase to the connecting terminal Tc2, second rectifying element D2, charging and discharging element C1, resistor element R1, first rectifying element D1, first switching element Tr1, and connecting terminal Tc1 and returns to the primary excitation coil L1 of the first phase (example of path of third form on second path). The regenerative charging of the charging and discharging element C1 is performed. Note that in a case where there is residual energy in the secondary excitation coil L2 of the second phase in a freewheeling state, the current generated by electromotive force at the secondary excitation coil L2 of the second phase flows from the secondary excitation coil L2 of the second phase to the charging and discharging element C1 over the path from the secondary excitation coil L2 of the second phase through the connecting terminal Tc2, second rectifying element D2, charging and discharging element C1, power source terminal Ti1, power source PS, power source terminal Ti2, fourth rectifying element D4, and connecting terminal Tc3, and returns to the secondary excitation coil L2 of the second phase (example of path of fourth form on second path), thereby performing regenerative charging of the charging and discharging element C1.

Thus, according to one example, the second operating mode II is primarily a first regeneration mode, and in a case where there is energy remaining in the secondary excitation coil L2 of the second phase which is in a freewheeling state, the second operating mode II also includes a second regeneration mode.

In a case where the phase angle θ reaches a predetermined angle set beforehand, e.g., an angle where the inductance of the primary excitation coil L1 reaches an angle where the inductance of the primary excitation coil L1 begins to descend from the maximum value Lmax (angle where inductance in the secondary excitation coil L2 begins to ascend from the minimum value Lmin) along with rotations of the rotor RT, as illustrated in FIG. 10, the motor drive device DRa drives the SR motor M in the third operating mode III for an amount of time sufficient to avoid surging from occurring (e.g., a relatively short amount of time). In the third operating mode III, the third switching element Tr3 is turned on and the other first, second, and fourth through sixth switching elements Tr1, Tr2, and Tr4 through Tr6 are turned off, as illustrated in FIG. 9. Accordingly, the primary excitation coil L1 of the first phase is in a freewheeling state, and there is reflux of current over the path from the primary excitation coil L1 of the first phase through the connecting terminal Tc2, third switching element Tr3, third rectifying element D3, and connecting terminal Tc1, and returning to the primary excitation coil L1 of the first phase (example of path of seventh form on fourth path), as illustrated in FIG. 7C. On the other hand, the secondary excitation coil L2 of the second phase also is in a freewheeling state continuing from the later-described sixth operating mode VI through the above-described first and second operating modes I and II, and thus the current refluxes through the above-described path.

Thus, according to one example, the third operating mode III is primarily a first current circulation mode, also includes a second current circulation mode.

In a case where the phase angle θ reaches a predetermined angle set beforehand, as illustrated in FIG. 10, the motor drive device DRa drives the SR motor M in the fourth operating mode IV while the secondary excitation coil L2 of the second phase is being excited and inductance at the secondary excitation coil L2 of the second phase is increasing along with rotation of the rotor RT. That is to say, the fourth operating mode IV starts at a similar timing to the start timing of the first operating mode I. This is also the same for the timing to switch the following operating modes as well. The timing of switching from the third operating mode III to the fourth operating mode IV is preferably at a phase where the rate of change of inductance at the secondary excitation coil L2 of the second phase along with rotation of the rotor RT is the largest. The second and third switching elements Tr2 and Tr3 are each turned on, and the remaining first and fourth through sixth switching elements Tr1 and Tr4 through Tr6 are turned off. Accordingly, the excitation current from the power source PS flows over the path from the power source PS through the power source terminal Ti1, resistor element R1, fifth rectifying element D5, second switching element Tr2, connecting terminal Tc3, secondary excitation coil L2 of the second phase, connecting terminal Tc2, third switching element Tr3, and power source terminal Ti2, and returns to the power source PS (example of path of second form on first path). In the fourth operating mode IV, the when the phase angle θ reaches a predetermined angle θIV set beforehand in the temporal change of inductance of the secondary excitation coil L2, the fifth switching element Tr5 is turned on for a predetermined amount of time τIV set beforehand, in the same way as in the first operating mode I. The phase angle θ in temporal change of inductance of the secondary excitation coil L2 is the same as the phase angle θ in temporal change of inductance of the primary excitation coil L1, with the phase angle θ at the point of starting turning on the first and third switching elements Tr1 and Tr3 being zero. Due to this fifth switching element Tr5 going on, charge stored in the charging and discharging element C1 (that is, primarily charge regeneratively charged from the primary excitation coil L1 of the first phase), current flows over the path from the charging and discharging element C1 through the fifth transistor Tr5, second transistor Tr2, connecting terminal Tc3, secondary excitation coil L2 of the second phase, connecting terminal Tc2, third switching element Tr3, power source terminal Ti2, power source PS, power source terminal Ti1, and back to the charging and discharging element C1 (example of path of sixth form on third path), as excitation current. Thus, current from the charging and discharging element C1 is applied to the secondary excitation coil L2 of the second phase in addition to the current from the power source PS (additional current pulse). Note that the primary excitation coil L1 of the first phase is in a freewheeling state continuing from the third operating mode III, and there is reflux of a current from the primary excitation coil L1 of the first phase over the above-described path.

Thus, according to one example, the fourth operating mode IV is primarily a second electricity supply mode, and in a case where the primary excitation coil L1 of the first phase is in a freewheeling state continuing from the third operating mode III, the fourth operating mode IV also includes a first current circulation mode.

In a case where the phase angle θ reaches a predetermined angle set beforehand, e.g., an angle where the inductance of the secondary excitation coil L2 reaches an angle where inductance exhibits the maximum value Lmax (angle where inductance of the primary excitation coil L1 exhibits the minimum value Lmin) as illustrated in FIG. 10, the motor drive device DRa drives the SR motor M in the fifth operating mode V. In the fifth operating mode V, the second switching element Tr2 is turned on and the other first and third through sixth switching elements Tr1 and Tr3 through Tr6 are turned off, as illustrated in FIG. 9. Accordingly, current generated by the electromotive force at the secondary excitation coil L2 of the second phase flows from the secondary excitation coil L2 of the second phase to the charging and discharging element C1 over a path from the secondary excitation coil L2 of the second phase through the connecting terminal Tc2, second rectifying element D2, charging and discharging element C1, resistor element R1, fifth rectifying element D5, second switching element Tr2, and connecting terminal Tc3 and returns to the secondary excitation coil L2 of the second phase as illustrated in FIG. 8B (other example of path of fourth form on second path). Accordingly, regenerative charging of the charging and discharging element C1 is performed, as illustrated in FIG. 8B. Note that in a case where there is residual energy in the primary excitation coil L1 of the first phase in a freewheeling state, the current generated by electromotive force at the primary excitation coil L1 of the first phase flows from the primary excitation coil L1 of the first phase to the connecting terminal Tc2, second rectifying element D2, charging and discharging element C1, resistor element R1, first rectifying element D1, first switching element Tr1, and connecting terminal Tc1, and returns to the primary excitation coil L1 of the first phase, thereby flowing from the primary excitation coil L1 of the first phase to the charging and discharging element C1 and performing regenerative charging of the charging and discharging element C1.

Thus, according to one example, the fifth operating mode V is primarily a second regeneration mode, and in a case where there is residual energy in the primary excitation coil L1 of the first phase in a freewheeling state, the fifth operating mode V also includes the first regeneration mode.

In a case where the phase angle θ reaches a predetermined angle set beforehand, e.g., an angle where the inductance of the secondary excitation coil L2 of the second phase begins to descend from the maximum value Lmax (angle where the inductance of the primary excitation coil L1 of the first phase begins to ascend from the minimum value Lmin along with rotations of the rotor RT), as illustrated in FIG. 10, the motor drive device DRa drives the SR motor M in the sixth operating mode VI for an amount of time sufficient to avoid surging from occurring (e.g., a relatively short amount of time). In the sixth operating mode VI, the third switching element Tr3 is turned on and the other first, second, and fourth through sixth switching elements Tr1, Tr2, and Tr4 through Tr6 are turned off, as illustrated in FIG. 9. Accordingly, the secondary excitation coil L2 of the second phase is in a freewheeling state, and there is reflux of current over the path from the secondary excitation coil L2 of the second phase through the connecting terminal Tc2, third switching element Tr3, fourth rectifying element D4, and connecting terminal Tc3, and returning to the secondary excitation coil L2 of the second phase (example of path of eighth form on fourth path), as illustrated in FIG. 8C. On the other hand, the primary excitation coil L1 of the first phase also is in a freewheeling state continuing from the third operating mode III through the above-described fourth and fifth operating modes IV and V, and thus the current refluxes through the above-described path from the 21st excitation coil L1 of the first phase.

Thus, according to one example, the sixth operating mode VI is primarily a first current circulation mode, also includes a second current circulation mode.

Upon executing the sixth operating mode VI, the motor drive device DRa returns to the first operating mode I, and repeats the above-described first through sixth operating modes I through VI while performing acceleration control, synchronously with the inductance cycle of the primary excitation coil L1 of the first phase.

Thus, in a case of acceleration control, the motor drive device DRa according to the present embodiment excites the excitation coil L (L1, L2) by applying current from the power source PS in a case where the inductance of the excitation coil L is increasing along with rotation of the rotor RT, thereby accelerating the SR motor M. At the time of the excitation current for this acceleration flowing, regenerative electric power stored at the charging and discharging element C1 is discharged at a predetermined timing, and accordingly current from the charging and discharging element C1 is applied to the excitation coil L in addition to the current from the power source PS (first operating mode I, fourth operating mode IV). In a case where the inductance of the excitation coil L (L1, L2) is decreasing from the maximum value Lmax along with rotation of the rotor RT, the motor drive device DRa regenerates energy of the excitation coil L to the charging and discharging element C1 so as to be stored at the charging and discharging element C1 (second operating mode II, fifth operating mode V), and thereafter a freewheeling state is achieved at a predetermined timing (third operating mode III, sixth operating mode VI).

Since the SR motor M to be driven is an anti-symmetric two phase motor, while the primary excitation coil L1 of the first phase is being controlled in the first through third operating modes, the secondary excitation coil L2 of the second phase is primarily in a freewheeling state. On the other hand, while the secondary excitation coil L2 of the second phase is being controlled in the fourth through sixth operating modes, the primary excitation coil L1 of the first phase is primarily in a freewheeling state. The primary excitation coil L1 of the first phase and the secondary excitation coil L2 of the second phase are thus independently subjected to acceleration control, and the regenerative electric power regenerated at one excitation coil L can be used at the other excitation coil L, so power supplied from the power source PS can be efficiently used.

The above-described motor drive device DRa can independently supply electric power from the charging and discharging element C1 to the primary and secondary excitation coils L1 and L2 when accelerating, so voltage higher than the voltage of the power source PS can be applied to the primary and secondary excitation coils L1 and L2. Accordingly, the motor drive device DRa and perform efficient acceleration control.

In order to independently supply electric power from the power source terminals Ti1 and Ti2 to each of the primary and secondary excitation coils L1 and L2 via the connecting terminals Tc1 through Tc4 in the motor drive device DRa, the above-described paths are formed using the third switching element Tr3 in common to return the currents, which have gone through the excitation coils L1 and L2 in the first and fourth operating modes I and IV, to the low-voltage side of the power source PS via the power source terminal Ti2. Accordingly, the number of switching elements in the motor drive device DRa according to the present embodiment can be reduced.

In order to perform independent regeneration of residual energy remaining at the primary and secondary excitation coils L1 and L2 from the primary and secondary excitation coils L1 and L2 to the charging and discharging element C1 via the connecting terminals Tc1 through Tc4 in the motor drive device DRa, the above-described paths are formed using the second rectifying element D2 in common to guide the currents from back locomotive force at the primary and secondary excitation coils L1 and L2 in the second and fifth operating modes II and V, to the high-potential side of the charging and discharging element C1. Accordingly, the number of rectifying elements in the motor drive device DRa according to the present embodiment can be reduced. Note that a switching element having a low on resistance may be used to substitute for the second rectifying element D2.

In order to place the primary and secondary excitation coils L1 and L2 each in a freewheeling state, in the motor drive device DRa, the above-described paths are formed using the third and fourth rectifying elements D3 and D4 to return the currents from locomotive force at the primary and secondary excitation coils L1 and L2 back to the primary and secondary excitation coils L1 and L2 in the third and sixth operating modes III and VI. Accordingly, energy can be temporarily held in the primary and secondary excitation coils L1 and L2 in the motor drive device DRa according to the present embodiment, and the primary and secondary excitation coils L1 and L2 are not in a released state even if the timing for turning the switching elements on and off at the time of switching the operating modes is off from the planned timing set beforehand, so occurrence of surging can be avoided. Note that switching elements having a low on resistance may be used to substitute for the third and fourth rectifying elements D3 and D4.

With a predetermined No. 1 phase as a starting point in a case where the inductance of the primary excitation coil L1 is increasing, the above-described motor drive device DRa repeats, synchronously with the inductance cycle of the primary excitation coil L1, the first operating mode (first electricity supply mode) I, the second operating mode (first regeneration mode) II, fourth operating mode (second electricity supply mode) IV, and fifth operating mode (second regeneration mode) V, in this order, whereby acceleration control of the anti-symmetrical two-phase motor M to be driven can be performed. The motor drive device DRa regenerates the residual energy remaining in the primary excitation coil L1 by the second operating mode II and then supplies to the secondary excitation coil L2, so the effect of impeding acceleration by the primary excitation coil L1 of the first phase can be reduced. The motor drive device DRa also regenerates the residual energy remaining in the secondary excitation coil L2 by the fifth operating mode V and then supplies to the primary excitation coil L1, so the effect of impeding acceleration by the secondary excitation coil L2 of the second phase can be reduced. Consequently, the average torque can be increased by the motor drive device DRa according to the present embodiment.

After the second operating mode (first regeneration mode) II ends, the above-described motor drive device DRa performs the fourth operating mode (second electricity supply mode) IV after having executed the third operating mode (first current circulation mode) III, so occurrence of surging by the switching elements Tr in a case of transitioning from the second operating mode II to the fourth operating mode IV can be avoided. After the fifth operating mode (second regeneration mode) V ends, the motor drive device DRa performs the first operating mode (first electricity supply mode) I after having executed the sixth operating mode (second current circulation mode) VI, so occurrence of surging by the switching elements Tr in a case of transitioning from the fifth operating mode V to the first operating mode I can be avoided.

In deceleration control at the motor drive device DRa, first, before starting or during decrease of the inductance at the primary excitation coil L1 of the first phase along with rotation of the rotor RT, the SE motor M is driven in the first operating mode I, as illustrated in FIG. 14. More specifically, the motor drive device DRa starts driving the SR motor M in the first operating mode I with a predetermined No. 2 phase as a starting point, before the inductance of the primary excitation coil L1 of the first phase begins to decrease along with rotation of the rotor RT, or immediately after decrease begins. For example, the motor drive device DRa drives the SR motor M in the first operating mode I at the timing where the inductance descends from the maximum value Lmax. This No. 2 phase is preferably a phase where the rate of change of inductance at the primary excitation coil L1 of the first phase of the rotor RT (rate of change of decrease) is the greatest. In this first operating mode I, the first and third switching elements Tr1 and Tr3 are turned on, and the other second and fourth through sixth switching elements Tr2 and Tr4 through Tr6 are turned off, as illustrated in FIG. 13. Thus, current flows in the same way as with the first operating mode I of the acceleration control, as illustrated in FIG. 11A, but current is supplied to the primary excitation coil L1 while the inductance of the primary excitation coil L1 of the first phase is decreasing along with rotation of the rotor ET, so torque acts on the rotor RT in the opposite direction from the rotational direction, and the SR motor M decelerates. In order to increase the initial deceleration in this deceleration control, the fourth switching element Tr4 is turned on for a predetermined time τIV set beforehand, at the timing of starting the first operating mode I. Accordingly, the charging and discharging element C1 is charged by the power source PS over a path from the power source PS through the power source terminal Ti1, charging and discharging element C1, fourth switching element Tr4, first transistor Tr1, connecting terminal Tc1, primary excitation coil L1 of the first phase, connecting terminal Tc2 and third switching element Tr3, and returning to the power source PS. The charge stored in the charging and discharging element C1 is discharged, and the current flows in the same way as with the first operating mode I for acceleration control. Thus, current from the charging and discharging element C1 is applied to the primary excitation coil L1 of the first phase in addition to the current from the power source PS, furthering deceleration. While description has been made above that the electric charge of the charging and discharging element C1 is used at the same time as starting the first operating mode I, the electric charge of the charging and discharging element C1 may be used partway through the first operating mode I. Also, the secondary excitation coil L2 of the second phase is in a freewheeling state continuing from the sixth operating mode VI which will be described later, and there is reflux of a current from the secondary excitation coil L2 of the second phase over the above-described path.

In a case where the phase angle θ reaches a predetermined angle set beforehand as illustrated in FIG. 14, the motor drive device DRa drives the SR motor M in the seventh operating mode VII. In this seventh operating mode VII the sixth switching element Tr6 is turned on, and the remaining first through fifth switching elements Tr1 through Tr5 are turned off as illustrated in FIG. 13. Accordingly, current generated by the electromotive force at the primary excitation coil L1 of the first phase flows to the power source PS over a path from the primary excitation coil L1 of the first phase through the connecting terminal Tc2, second rectifying element D2, sixth rectifying element D6, sixth switching element Tr6, power source terminal Ti1, power source PS, power source terminal Ti2, third rectifying element D3, and connecting terminal Tc1, and returns to the primary excitation coil L1 of the first phase (example of path of ninth form on fifth path). Thus, regenerative charging of the power source PS is performed. Note that in a case where there is residual energy in the secondary excitation coil L2 of the second phase in a freewheeling state, the current generated by electromotive force at the secondary excitation coil L2 of the second phase flows from the secondary excitation coil L2 of the second phase to the power source PS over a path from the secondary excitation coil L2 of the second phase through the connecting terminal Tc2, sixth rectifying element D6, sixth switching element Tr6, power source terminal Ti1, power source PS, power source terminal Ti2, fourth rectifying element D4, and connecting terminal Tc3, and returns to the secondary excitation coil L2 of the second phase (example of path of tenth form on fifth path), thereby performing regenerative charging of the power source PS.

The seventh operating mode VII is primarily a third regeneration mode in one example, and in a case where the secondary excitation coil L2 of the second phase is in a freewheeling state, the seventh operating mode VII also includes a fourth regeneration mode.

In a case where the phase angle θ reaches a predetermined angle set beforehand, as illustrated in FIG. 14, the motor drive device DRa drives the SR motor M in the third operating mode III for an amount of time sufficient to avoid surging from occurring (e.g., a relatively short amount of time). In the third operating mode III, the third switching element Tr3 is turned on and the other first, second, and fourth through sixth switching elements Tr1, Tr2, and Tr4 through Tr6 are turned off, as illustrated in FIG. 13. Accordingly, the current flows in the same way as with the first operating mode I in acceleration control, and the primary excitation coil L1 of the first phase is in a freewheeling state as illustrated in FIG. 11C. On the other hand, the secondary excitation coil L2 of the second phase also is in a freewheeling state in the same way.

In a case where an angle is reached where the inductance of the primary excitation coil L1 of the first phase begins to ascend from the minimum value Lmin along with the rotation of the rotor RT as illustrated in FIG. 14, i.e., at an angle where the inductance of the secondary excitation coil L2 of the second phase begins to descend from the maximum value Lmax along with the rotation of the rotor RT, the motor drive device DRa drives the SR motor M in the fourth operating mode IV. That is to say, the fourth operating mode IV is started at a similar timing to starting the first operating mode I. In the fourth operating mode IV, the second and third switching elements Tr2 and Tr3 are each turned on, and the remaining first and fourth through sixth switching elements Tr1 and Tr4 through Tr6 are turned off as illustrated in FIG. 13. Accordingly, the current flows in the same way as with the fourth operating mode IV in acceleration control, as illustrated in FIG. 12A, but current is supplied to the secondary excitation coil L2 of the second phase while the inductance of the secondary excitation coil L2 of the second phase is decreasing along with rotation of the rotor ET, so torque acts on the rotor RT in the opposite direction from the rotational direction, and the SR motor M decelerates. In this deceleration control, the fifth switching element Tr5 is turned on for a predetermined time τIV set beforehand, at the timing of starting the fourth operating mode IV. Accordingly, the charging and discharging element C1 is charged by the power source PS over a path from the power source PS through the power source terminal Ti1, charging and discharging element C1, fifth transistor Tr5, second transistor Tr2, connecting terminal Tc3, secondary excitation coil L2 of the second phase, connecting terminal Tc2, and third switching element Tr3, and returning to the power source PS. The charge stored in the charging and discharging element C1 is discharged, and a current flows in the same way as in the fourth operating mode IV in acceleration control. Thus, current from the charging and discharging element C1 is applied to the secondary excitation coil L2 of the second phase in addition to the current from the power source PS, furthering deceleration. Also, the primary excitation coil L1 of the first phase is in a freewheeling state continuing from the third operating mode III, and there is reflux of a current over the above-described path.

In a case where the phase angle θ reaches a predetermined angle set beforehand as illustrated in FIG. 14, the motor drive device DRa drives the SR motor M in the seventh operating mode VII. In this seventh operating mode VII, the sixth switching element Tr6 is turned on, and the remaining first through fifth switching elements Tr1 through Tr5 are turned off as illustrated in FIG. 13. Accordingly, current generated by the electromotive force at the secondary excitation coil L2 of the second phase flows from the secondary excitation coil L2 of the second phase to the power source PS over a path from the secondary excitation coil L2 of the second phase through the connecting terminal Tc2, second rectifying element D2, sixth rectifying element D6, sixth switching element Tr6, power source terminal Ti1, power source PS, power source terminal Ti2, fourth rectifying element D4, and connecting terminal Tc3, and returns to the secondary excitation coil L2 of the second phase, as illustrated in FIG. 12B. Thus, regenerative charging of the power source PS is performed. Note that in a case where there is residual energy in the primary excitation coil L1 of the first phase in a freewheeling state, the current generated by electromotive force at the primary excitation coil L1 of the first phase flows from the primary excitation coil L1 of the first phase to the power source PS over a path from the primary excitation coil L1 of the first phase to the connecting terminal Tc2, second rectifying element D2, sixth rectifying element D6, sixth switching element Tr6, power source terminal Ti1, power source PS, power source terminal Ti2, third rectifying element D3, and connecting terminal Tc1, and returns to the primary excitation coil L1 of the first phase, thereby performing regenerative charging of the power source PS.

The seventh operating mode VII is primarily a fourth regeneration mode in one example, and in a case where energy is remaining in the primary excitation coil L1 of the first phase in a freewheeling state, the seventh operating mode VII also includes the third regeneration mode.

In a case where the phase angle θ reaches a predetermined angle set beforehand, as illustrated in FIG. 14, the motor drive device DRa drives the SR motor M in the sixth operating mode VI for an amount of time sufficient to avoid surging from occurring (e.g., a relatively short amount of time). In the sixth operating mode VI, the third switching element Tr3 is turned on and the other first, second, and fourth through sixth switching elements Tr1, Tr2, and Tr4 through Tr6 are turned off, as illustrated in FIG. 13. Accordingly, the current flows in the same way as with the sixth operating mode VI in acceleration control, and the secondary excitation coil L2 of the second phase is in a freewheeling state, as illustrated in FIG. 12C. On the other hand, the primary excitation coil L1 of the first phase also is in a freewheeling state maintained from the third operating mode III via the fourth and seventh operating modes IV and VII.

Upon executing the sixth operating mode VI, the motor drive device DRa returns to the first operating mode I, and repeats the above-described first, seventh, third, fourth, seventh, and sixth operating modes I, VII, III, IV, VII, and VI while performing deceleration control, synchronously with the inductance cycle of the primary excitation coil L1 of the first phase.

Thus, in a case of deceleration control, the motor drive device DRa according to the present embodiment excites the excitation coil L (L1, L2) by applying current from the power source PS in a case where the inductance of the excitation coil L is decreasing along with rotation of the rotor RT, thereby decelerating the SR motor M. At the time of the excitation current for this deceleration flowing, regenerative electric power stored at the charging and discharging element C1 is discharged at a predetermined timing, and accordingly current from the charging and discharging element C1 is applied to the excitation coil L in addition to the current from the power source PS (first operating mode I, fourth operating mode IV). In a case where the inductance of the excitation coil L (L1, L2) is decreasing along with rotation of the rotor RT, the motor drive device DRa regenerates energy of the excitation coil L to power source PS so as to be stored at the power source PS (seventh operating mode VII, seventh operating mode VII), and thereafter a freewheeling state is achieved at a predetermined timing (third operating mode III, sixth operating mode VI).

Since the SR motor M to be driven is an anti-symmetric two phase motor, while the primary excitation coil L1 of the first phase is being controlled in the first, seventh, and third operating modes I, VII, and III, the secondary excitation coil L2 of the second phase is in a freewheeling state. On the other hand, while the secondary excitation coil L2 of the second phase is being controlled in the fourth, seventh, and sixth operating modes IV, VII, and VI, the primary excitation coil L1 of the first phase is in a freewheeling state. The primary excitation coil L1 of the first phase and the secondary excitation coil L2 of the second phase are thus independently subjected to deceleration control, and the regenerative electric power regenerated at one excitation coil L can be used at the other excitation coil L, so power supplied from the power source PS can be efficiently used.

The above-described motor drive device DRa can independently supply electric power from the charging and discharging element C1 to the primary and secondary excitation coils L1 and L2 when decelerating, so voltage higher than the voltage of the power source PS can be applied to the primary and secondary excitation coils L1 and L2. Accordingly, the motor drive device DRa and perform efficient deceleration control.

In order to independently perform regeneration of residual energy remaining in the primary and secondary excitation coils L1 and L2, from each the primary and secondary excitation coils L1 and L2 to the power source PS via the connecting terminals Tc1 through Tc4 in the motor drive device DRa, the above-described paths are formed using the sixth rectifying element D6 and sixth switching element Tr6 in common in the seventh operating mode. Accordingly, the number of rectifying elements in the motor drive device DRa according to the present embodiment can be reduced.

With a predetermined No. 2 phase as a starting point in a case where before inductance of the primary excitation coil L1 begins to decrease or immediately after decrease begins, the above-described motor drive device DRa repeats, synchronously with the inductance cycle of the primary excitation coil L1, the first operating mode (first electricity supply mode) I, the seventh operating mode (third regeneration mode) VII, the fourth operating mode (second electricity supply mode) IV, and the seventh operating mode (fourth regeneration mode) VII, in this order, whereby deceleration control of the anti-symmetrical two-phase motor M to be driven can be performed. The motor drive device DRa regenerates the residual energy remaining in the primary excitation coil L1 of the first phase by the first-time seventh operating mode VII and then supplies to the secondary excitation coil L2 of the second phase at the first time of performing the seventh operating mode (third regeneration mode) VII, so the effect of impeding deceleration by the primary excitation coil L1 of the first phase can be reduced. The motor drive device DRa also regenerates the residual energy remaining in the secondary excitation coil L2 of the second-time phase by the second seventh operating mode VII and then supplies to the primary excitation coil L1 of the first phase at the second time of performing the seventh operating mode (fourth regeneration mode) VII, so the effect of impeding deceleration by the secondary excitation coil L2 of the second phase can be reduced.

After the first time of the seventh operating mode (third regeneration mode) VII ends, the above-described motor drive device DRa performs the fourth operating mode (second electricity supply mode) IV after having executed the third operating mode (first current circulation mode) III, so occurrence of surging by the switching elements Tr in a case of transitioning from the seventh operating mode VII to the fourth operating mode IV can be avoided. After the second time of the seventh operating mode (fourth regeneration mode) VII ends, the motor drive device DRa performs the first operating mode (first electricity supply mode) I after having executed the sixth operating mode (second current circulation mode) VI, so occurrence of surging by the switching elements Tr in a case of transitioning from the second-time seventh operating mode VII to the first operating mode I can be avoided.

In order to perform independent regeneration of residual energy remaining at the primary and secondary excitation coils L1 and L2 from the primary and secondary excitation coils L1 and L2 to the power source PS via the connecting terminals Tc1 through Tc4 in the motor drive device DRa, the above-described paths are formed using the sixth rectifying element D6 and sixth switching element Tr6 in common to guide the currents from back locomotive force at the primary and secondary excitation coils L1 and L2 in each seventh operating mode VII, to the high-potential side of the power source PS via the connecting terminal Ti1. Accordingly, the number of rectifying devices and switching elements in the motor drive device DRa according to the present embodiment can be reduced.

While description has been made in the Background Art regarding a Bridge Converter type shared switch converter, and a Capacitive converter type voltage boosting converter belonging to a different system from this, the motor drive device DRa according to the present embodiment has the motor to be driven specialized as an anti-symmetrical two-phase motor, and accordingly can be said to be a device where a shared switch converter has incorporated therein factors of a voltage boosting converter which is a different system from this.

Next, embodiments and comparative examples will be described to describe the advantages of the motor drive device according to the present embodiment.

Embodiments and Comparative Examples

Figure 15:
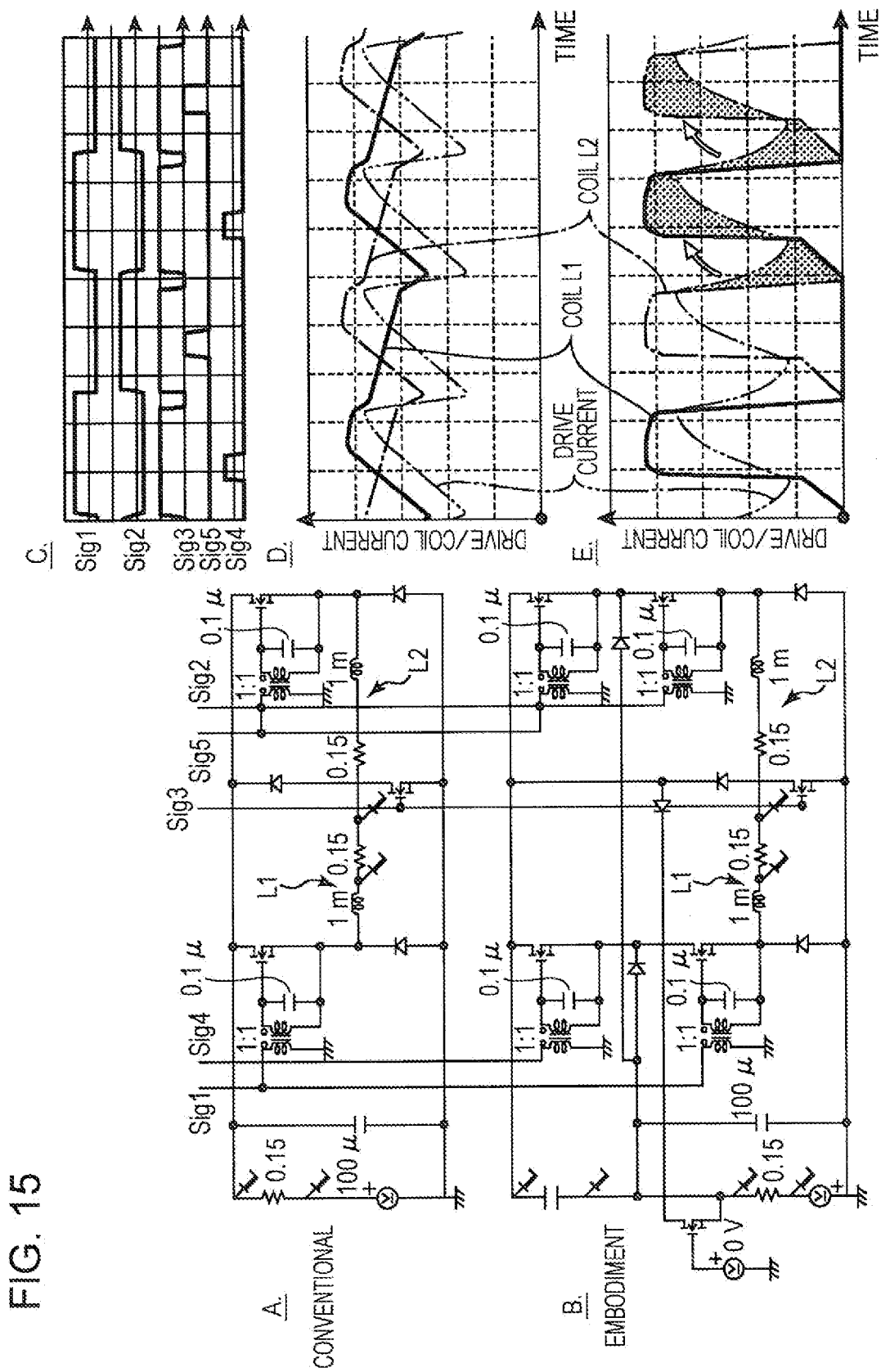
FIG. 15 is a diagram for describing comparison result (simulated) between a conventional motor drive device and a motor drive device according to an embodiment.
Figure 16:
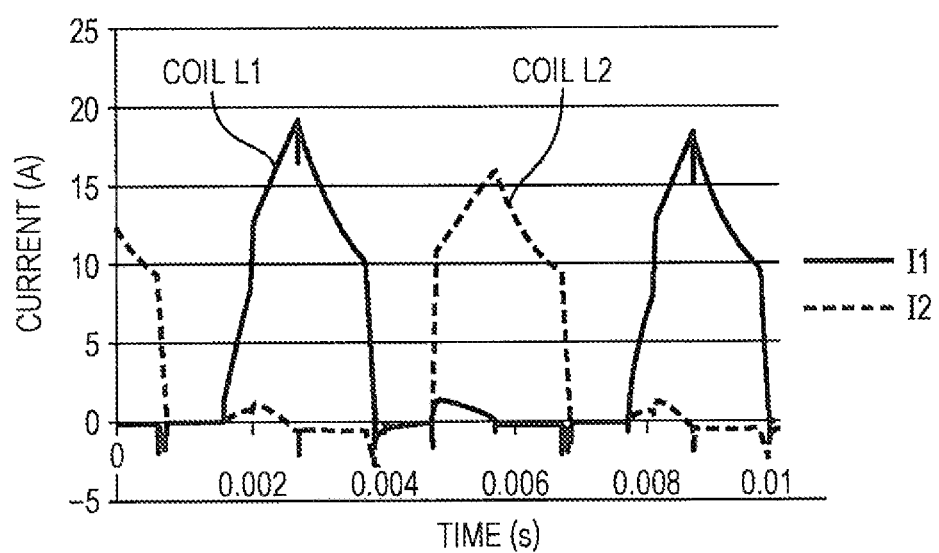
FIG. 16 is a diagram illustrating actual measurement results of excitation current in a motor drive device according to an embodiment.

FIG. 15 is a diagram for describing comparison results (simulation) between a convention motor drive device and a motor drive device according to an embodiment. FIG. 15A is a circuit diagram of a conventional motor drive device, FIG. 15B is a circuit diagram of a motor drive device according to an embodiment, and FIG. 15C is a time chart of control signals Sig1 through Sig5 output to transistors Tr1 through Tr5 and Tr11 through Tr13. FIG. 15D illustrates excitation current in a case of driving an anti-symmetrical two phase motor M using a conventional motor drive device (two-dot dashed line), coil current at the primary excitation coil L1 (solid line), and coil current at the secondary excitation coil L2 (one-dot dashed line). FIG. 15E illustrates excitation current in a case of driving an anti-symmetrical two phase motor M using a motor drive device according to an embodiment (two-dot dashed line), coil current at the primary excitation coil L1 (solid line), and coil current at the secondary excitation coil L2 (one-dot dashed line). The horizontal axes in FIG. 15D and FIG. 15E are time (rotational angle), and the vertical axes are current value. FIG. 16 is a diagram illustrating actual measurement results of excitation current in a motor drive device according to an embodiment. The horizontal axis in FIG. 16 is time (rotational angle) in increments of seconds (s), and the vertical axis is current in increments of amperes (A).

Figure 23:
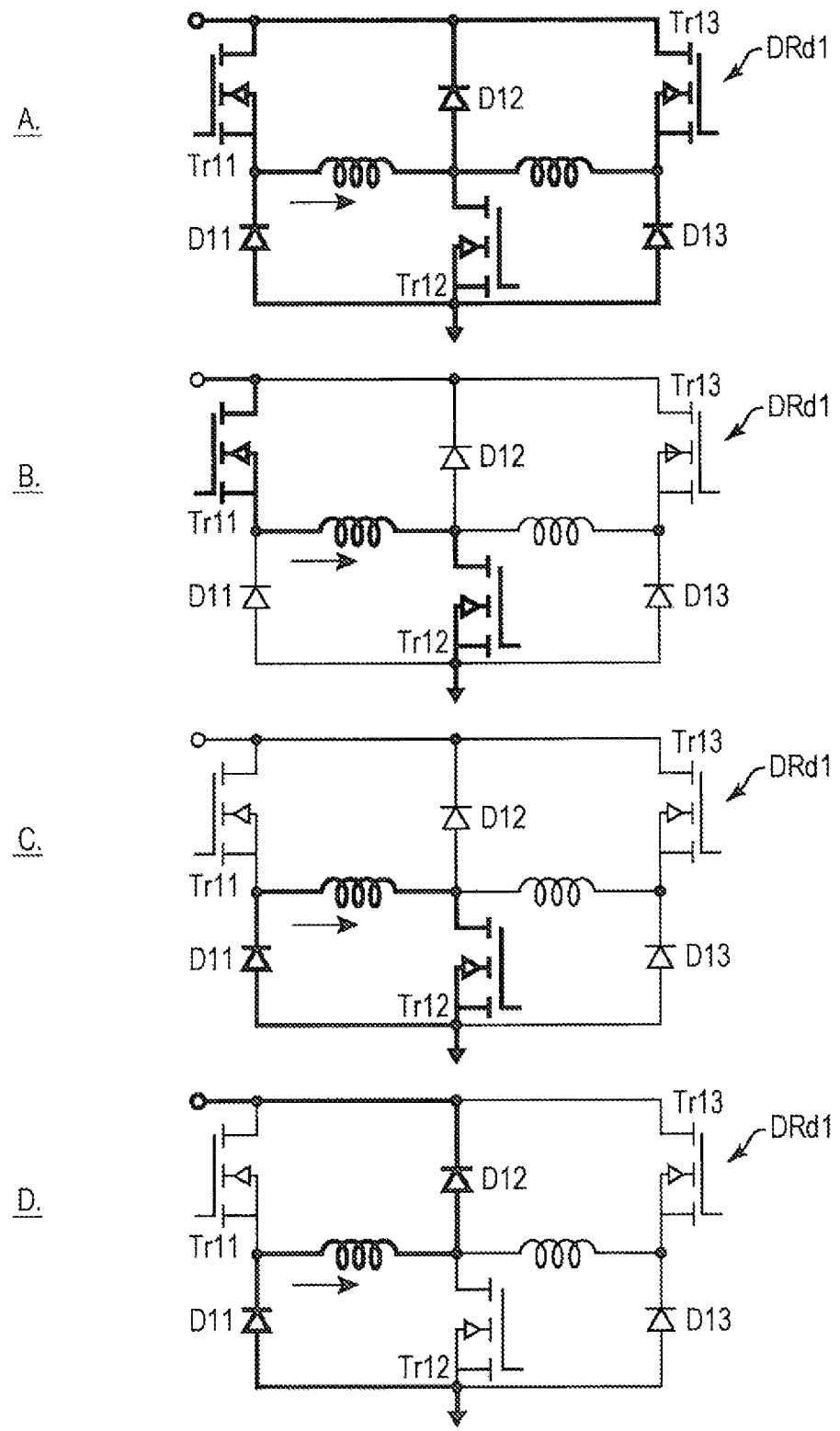
FIG. 23 is a diagram illustrating the configuration and operations of the SR motor drive device disclosed in NPL 1.
Figure 24:
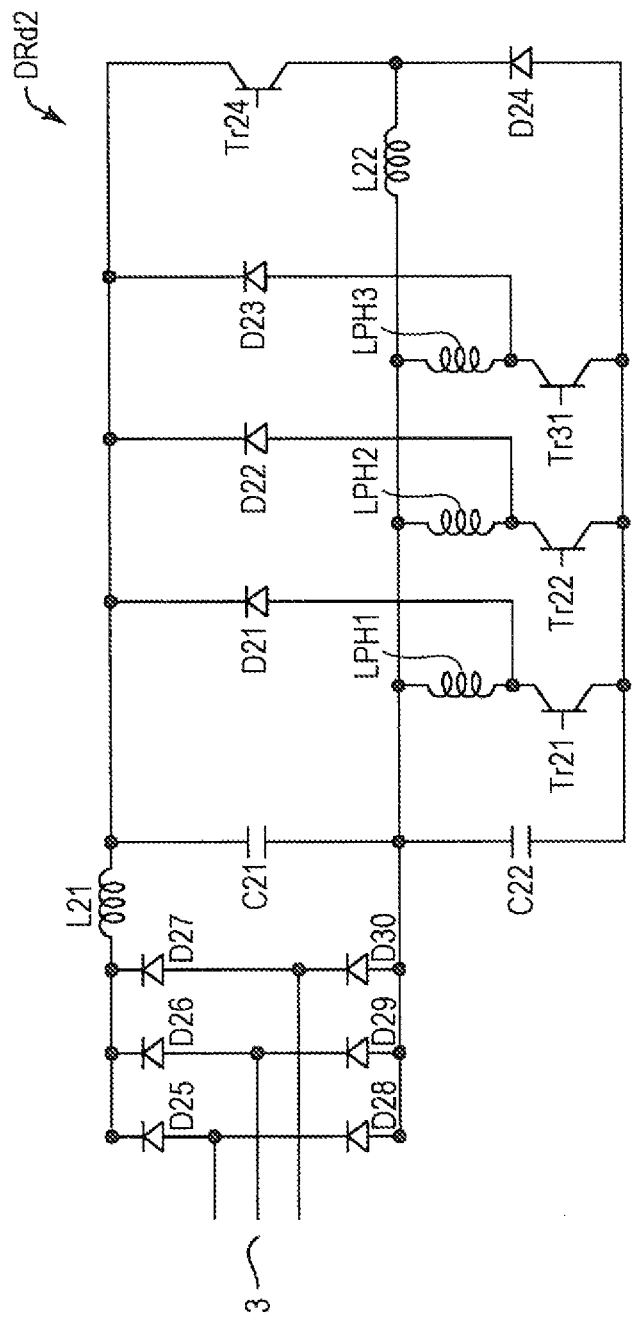
FIG. 24 is a diagram illustrating the configuration of the SR motor drive device disclosed in NPL 2.

The conventional motor drive device is a circuit described by way of FIG. 23 in the Background Art, as illustrated in FIG. 15A. This conventional motor drive device is connected to a power source circuit where a 1000 µF capacitor is connected in parallel to a serial connection of a DC power source V and a 0.15Ω shunt resistor for current measurement.

The motor drive device according to an embodiment is the above-described circuit described by way of FIG. 6, as illustrated in FIG. 15B. The motor drive device according to an embodiment is connected to a power source circuit in the same way as the case of the conventional motor drive device.

First through third control signals Sig1 through Sig3 to turn the first through third transistors Tr11 through Tr13 of the conventional motor drive device on and off are supplied to the transistors Tr11 through Tr13 via a pulse transformer having a winding ratio of 1:1, so as to reach the control terminals of the transistors Tr11 through Tr13 each of which have different potential levels, at the timing illustrated in FIG. 15C. First through fifth control signals Sig1 through Sig5 to turn the first through fifth transistors Tr1 through Tr5 of the motor drive device according to an embodiment on and off are supplied to the transistors Tr1 through Tr5 via a pulse transformer having a winding ratio of 1:1, so as to reach the control terminals of the transistors Tr1 through Tr5 each of which have different potential levels, at the timing illustrated in FIG. 15C. The first through third control signals Sig1 through Sig3 are used in common at both motor drive devices. FIG. 15C illustrates the control signal Sig1 of the first transistor Tr1, the control signal Sig2 of the second transistor Tr2, the control signal Sig1 of the third transistor Tr3, the control signal Sig5 of the fifth transistor Tr5, and the control signal Sig4 of the fourth transistor Tr4, in order from the top to the bottom. In this experiment, acceleration control is being performed, so a 0 V DC power source is connected to the control terminal of the sixth transistor Tr6 of the motor drive device according to the embodiment, voltage of 0 V is constantly applied, and the sixth transistor Tr6 is off.

Excitation current is measured at both ends of the resistor element connected serially to the power source V. The primary and secondary excitation coils L1 and L2 are each serial connections of 0.15Ω internal resistance and 1 mH. The coil current of the primary excitation coil L1 is measured at both ends of the internal resistance thereof, and the coil current of the secondary excitation coil L2 is measured at both ends of the internal resistance thereof.

The measurement results thereof are illustrated in FIG. 15D and FIG. 15E. The measurement results illustrated in FIG. 15D and FIG. 15E are results of measurement at the above locations using a known so-called circuit simulator. It can be seen from FIG. 15D that in the case of the conventional motor drive device, the coil currents of the primary and secondary excitation coils L1 and L2 do not reach 0 while driving, but continue to flow. Accordingly, in the case of the conventional motor drive device, when one excitation coil L1 (L2) is being excited for acceleration, the energy remaining in the other excitation coil L2 (L1) in a freewheeling state acts to cancel out the acceleration, so torque decreases. Also, such energy remaining in the excitation coils L1 and L2 is consumed in the circuit as Joule heat, and accordingly is wasted without contributing to the torque of the motor.

On the other hand, it can be seen from FIG. 15E that in the case of the motor drive device according to the embodiment, the coil currents of the primary and secondary excitation coils L1 and L2 are pulse currents where, while one coil current is flowing, the other coil current is 0. Accordingly, in the case of the motor drive device according to the embodiment, when one excitation coil L1 (L2) is being excited for acceleration, there is no cancellation of the acceleration thereof by the energy remaining in the other excitation coil L2 (L1), and not torque decrease occurs. Further, the energy remaining at the excitation coils L1 and L2 is regenerated, so the excitation current flowing while the coil current of one excitation coil L1 (L2) goes to 0 and the other excitation coil L2 (L1) starts to rise is used in excitation of the other excitation coil L2 (L1) through regeneration and discharge thereof at the charging and discharging element C1. Accordingly, energy remaining at the one excitation coil L1 (L2) is efficiently used at the other excitation coil L2 (L1), and there is little waste. Accordingly, electric power efficiency is improved in the motor drive device according to the present embodiment as compared with the conventional arrangement.

The above-described facts are also indicated in FIG. 16 illustrating actual measurement results. The simulation in FIG. 15 was made assuming the inductance of the excitation coils L1 and L2 to be constant at 1 mH as described above, and the excitation currents of the excitation coils L1 and L2 were simulated by switching at an appropriate timing, but in an actual device, the inductance of the excitation coils L1 and L2 changes as illustrated in FIG. 10. The difference in waveforms of the excitation currents illustrated in FIG. 15 and waveforms of the excitation currents illustrated in FIG. 16 is due to this difference. It can be seen from FIG. 16 that the rising and falling of the excitation current is steeper due to the additional current pulse in the first operating mode I and the additional current pulse in the fourth operating mode IV. Thus, electric power efficiency is improved.

(Motor Drive Device According to Second Embodiment)

Figure 17:
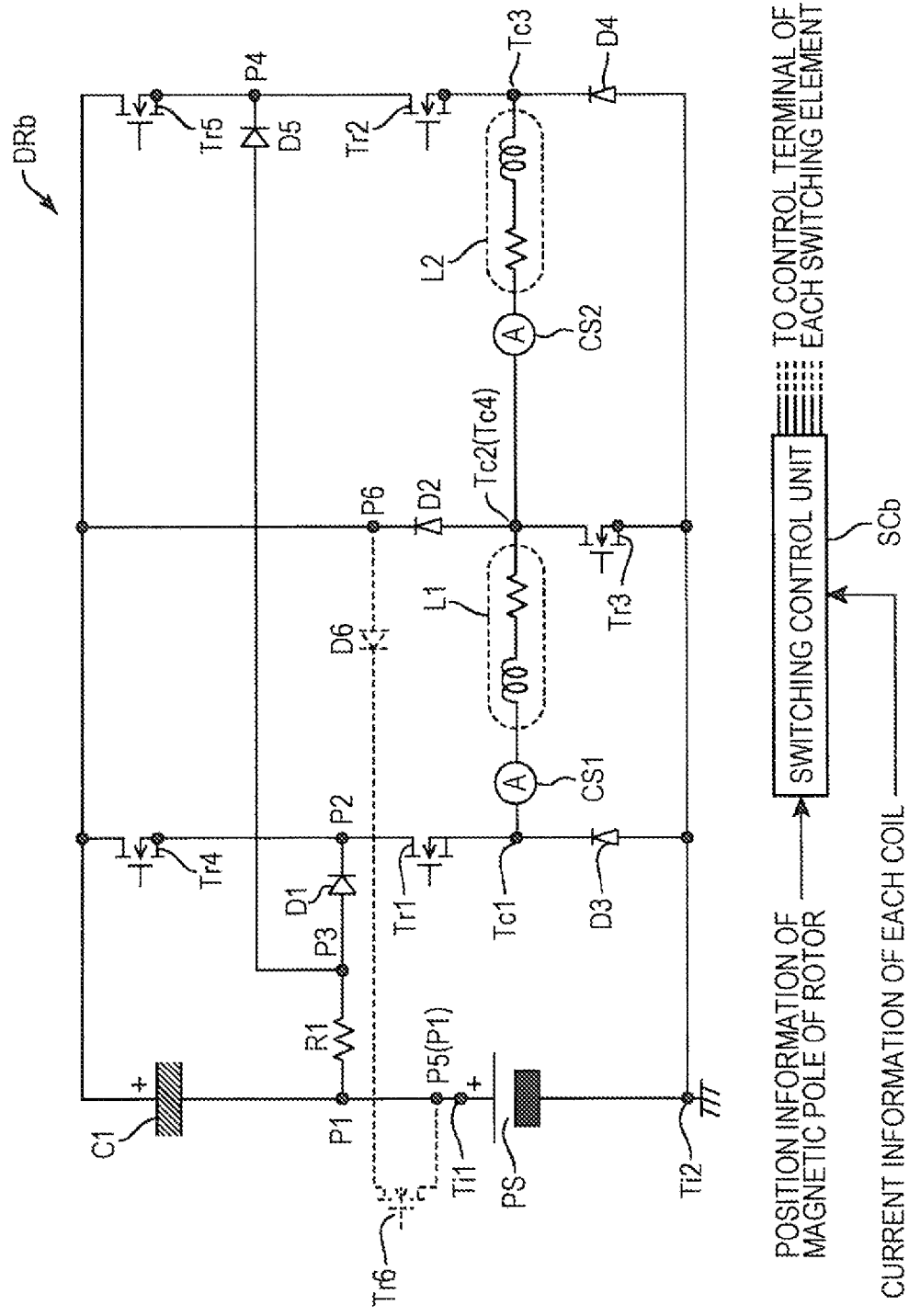
FIG. 17 is a circuit diagram illustrating the configuration of a motor drive device according to a second embodiment.

Next, a motor drive device according to a second embodiment, which drives the above-described anti-symmetrical two phase SR motor M, will be described. First, the configuration of a motor drive device DRb according to the second embodiment will be described. FIG. 17 is a circuit diagram illustrating the configuration of the motor drive device according to the second embodiment.

In a case of actually using a motor, not only acceleration control and deceleration control but also control so as to output a desired torque is desired. The motor drive device DRa according to the first embodiment performs acceleration control and deceleration control, but the motor drive device DRb according to the second embodiment performs current control to control the excitation current flowing to the anti-symmetrical two phase SR motor M, so as to output desired torque.

This motor drive device DRb according to the second embodiment includes, for example, a pair of power source terminals Ti1 and Ti2, a pair of connecting terminals Tc1 and Tc2, a pair of connecting terminal Tc3 and Tc4, a charging and discharging element C1, rectifying elements D1 through D6, switching elements Tr1 through Tr6, a shunt resistor element R1, a first current detecting unit CS1, a second current detecting unit CS2, and a switching control unit SCb, as illustrated in FIG. 17. That is to say, the motor drive device DRb according to the second embodiment has the first current detecting unit CS1 and second current detecting unit CS2 to control current, as compared to the motor drive device DRa. Accordingly, the pair of power source terminals Ti1 and Ti2, pair of connecting terminals Tc1 and Tc2, pair of connecting terminal Tc3 and Tc4, charging and discharging element C1, rectifying elements D1 through D6, switching elements Tr1 through Tr6, and shunt resistor element R1 in the motor drive device DRb according to the second embodiment, are the same as the pair of power source terminals Ti1 and Ti2, pair of connecting terminals Tc1 and Tc2, pair of connecting terminal Tc3 and Tc4, charging and discharging element C1, rectifying elements D1 through D6, switching elements Tr1 through Tr6, and shunt resistor element R1 in the motor drive device DRa according to the first embodiment, so description thereof will be omitted.

The first current detecting unit CS1 is a circuit to detect a first excitation current flowing at the primary excitation coil L1 of the first phase in the anti-symmetrical two phase SR motor M, and is connected between the connecting terminal Tc1 and the primary excitation coil L1. The first current detecting unit CS1 is a resistor element having a relatively small known resistance value, for example, and the first excitation current is detected by measuring the inter-terminal voltage. The first current detecting unit CS1 outputs the detection result thereof to the switching control unit SCb as current information of the primary excitation coil L1.

The second current detecting unit CS2 is a circuit to detect a second excitation current flowing at the secondary excitation coil L2 of the second phase in the anti-symmetrical two phase SR motor M, and is connected between the connecting terminal Tc4 (Tc2) and the secondary excitation coil L2. The second current detecting unit CS2 is a resistor element having a relatively small known resistance value, for example, and the second excitation current is detected by measuring the inter-terminal voltage. The second current detecting unit CS2 outputs the detection result thereof to the switching control unit SCb as current information of the secondary excitation coil L2.

In the same way as with the switching control unit SCa, the switching control unit SCb is a circuit which is connected to each control terminal of the switching elements Tr1 through Tr6, and outputs the control signal Sig to the switching elements Tr1 through Tr6 in order to control the turning on and off of each switching element Tr1 through Tr6. The switching control unit SCb controls on and off of each of the switching elements Tr1 through Tr6 to from the predetermined paths for the current in accordance with the positions of the rotor-side magnetic poles 24 and 2012 as to the stator-side magnetic poles 12 and 1012 in the SR motor M, so as to drive the SR motor M (Ma, Mb) under current control. Position information relating to the position of the rotor-side magnetic poles 24 and 2012 in the SR motor M is input to the switching control unit SCb, from a magnetic pole position detecting unit such as a rotary encoder or the like for example, omitted from illustration, that detects the position of the rotor-side magnetic poles 24 or 2012 in the SR motor M. The switching control unit SCb is input with current information relating to each of the excitation currents for the primary and secondary excitation coils L1 and L2, from the first and second current detecting units CS1 and CS2, as described above.

The rectifying elements D1 through D6, switching elements Tr1 through Tr6, and resistor element R1 described above are a switch unit forming a predetermined path for current by switching the switching elements Tr1 through Tr6 on and off. This switch unit and the switching control unit SCb are an example of the drive control unit.

Figure 18:
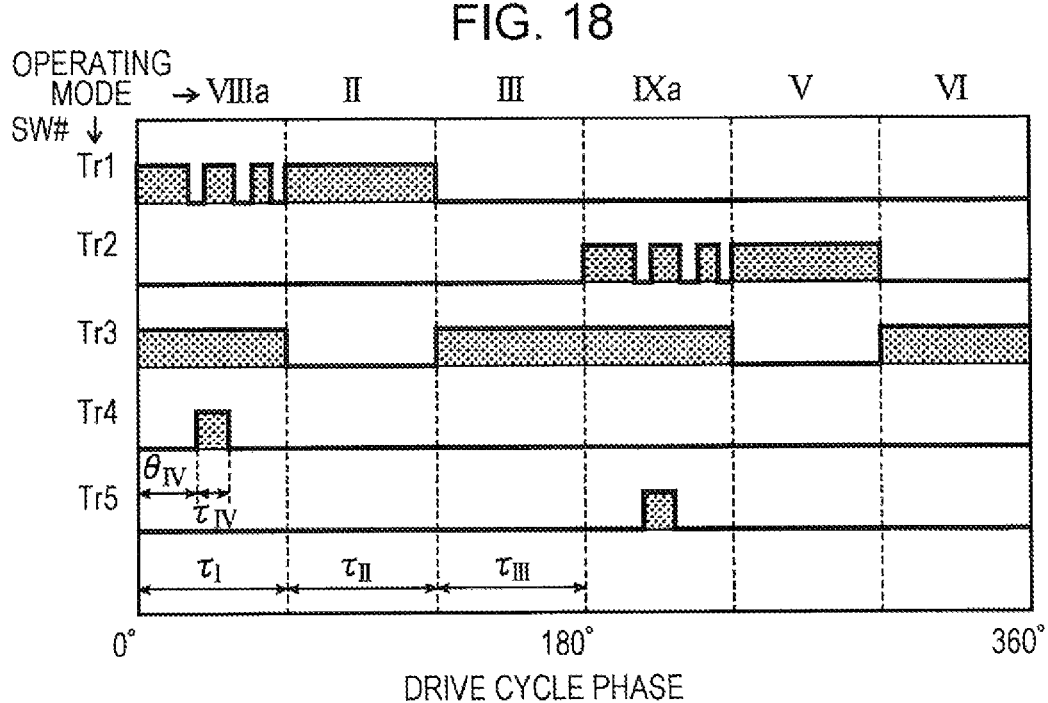
FIG. 18 is a time chart illustrating on/off timing of a first form at switching devices at the time of torque control in the motor drive device according to the second embodiment.
Figure 19:
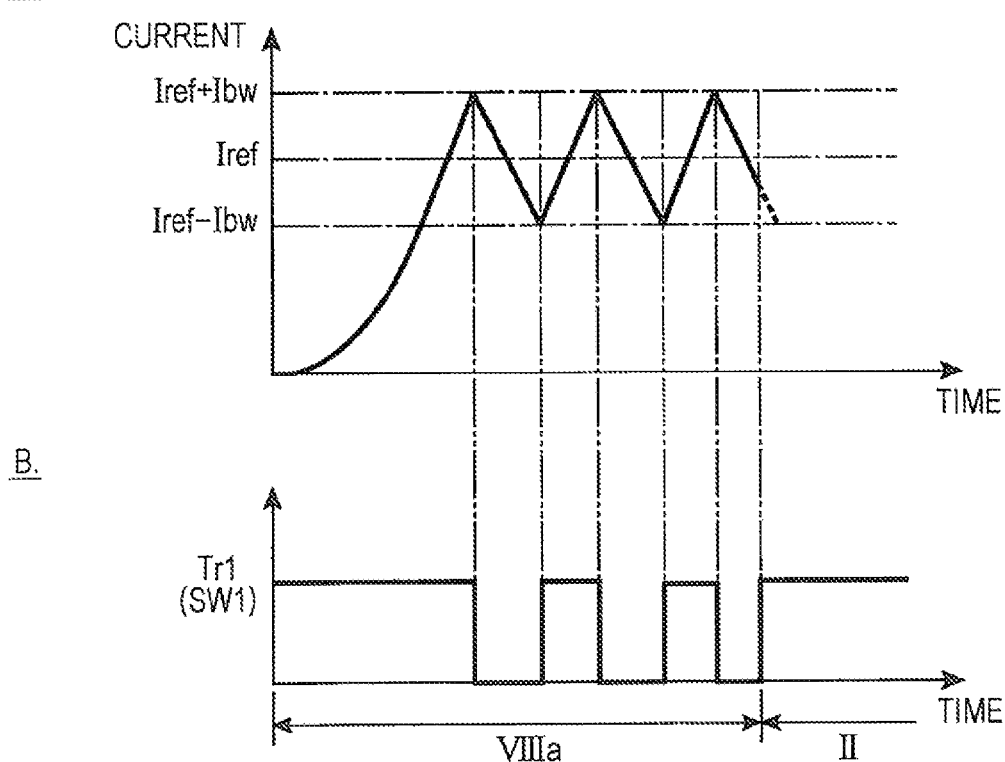
FIG. 19 is a diagram illustrating on/off timing of the first form at switching devices at the time of torque control in the motor drive device according to the second embodiment.

Next, the operations of the motor drive device DRb according to the second embodiment will be described. FIG. 18 is a time chart illustrating on/off timing of a first form at the switching elements at the time of torque control in the motor drive device according to the second embodiment. The on/off timing of the first switching element Tr1 through the fifth switching element Tr5 is illustrated in order from top tier to bottom tier in FIG. 18, and the horizontal axis represents the driving cycle phase. With regard to the driving cycle phase, the example illustrated in FIG. 18 is a schematic representation of a cycle where a switching pattern that changes as operating mode VIIIa→II→III→IXa→V→VI is cyclically repeated. FIG. 19 is a diagram illustrating on/off timing in a first form at the switching elements when performing torque control at the motor drive device according to the second embodiment. FIG. 19A illustrates excitation current as to passage of time, and FIG. 19B illustrates the on/off timing of the first switching element Tr1. The horizontal axis in FIG. 19A is time, and the vertical axis is excitation current.

The motor drive device DRb does to one of the states of the multiple operating modes VIIIa, II, III, IXa, V, and VI, by controlling the on/off of each of the first through sixth switching elements Tr1 through Tr6, thereby driving the SM motor M to be drive, and current control is performed to obtain the desired output torque. More specifically, the motor drive device DRb cyclically repeats an operating patter which changes in the order of an eighth-a operating mode VIIIa, second operating mode II, third operating mode III, ninth-a operating mode IXa, fifth operating mode V, and sixth operating mode VI. The second operating mode II, third operating mode III, fifth operating mode V, and sixth operating mode VI in the motor drive device DRb according to the second embodiment are each the same as the second operating mode II, third operating mode III, fifth operating mode V, and sixth operating mode VI in the motor drive device DRa according to the first embodiment, so description thereof will be omitted.

The eighth-a operating mode VIIIa in the current control is executed while the primary excitation coil L1 of the first phase is being excited and the inductance of the primary excitation coil L1 of the first phase is increasing along with rotation of the rotor RT. More specifically, the motor drive device DRb starts driving the SR motor M in the eighth-a operating mode VIIIa with a predetermined No. 1 phase as a starting point, in a case where the inductance of the excitation coil L1 of the first phase is increasing along with rotation of the rotor RT. This No. 1 phase is preferably a phase where the rate of change of inductance at the primary excitation coil L1 of the first phase (rate of change of increase) along with rotations of the rotor RT is the greatest. In this eighth-a operating mode VIIIa, the first and third switching elements Tr1 and Tr3 are turned on, and the other second and fourth through sixth switching elements Tr2 and Tr4 through Tr6 are turned off in the same way as with the above-described first operating mode, as illustrated in FIG. 18. Thus, excitation current flows from the power source PS to the primary excitation coil L1 of the first phase, via a path from the power source PS via the power source terminal Ti1, resistor element R1, first rectifying element D1, first switching element Tr1, connecting terminal Tc1, excitation coil L1 of the first phase, connecting terminal Tc2, third switching element Tr3, and power source terminal Ti2, and returning to the power source PS (example of path of first form on first path), as illustrated in FIG. 7A.

Now, the eighth-a operating mode VIIIa differs from the above-described first operating mode I with regard to the following point, and the motor drive device DRb supplies electricity to the primary excitation coil L1 of the first phase so that the first excitation current I1 at the primary excitation coil L1 of the first phase is a predetermined current value Iref set beforehand. This predetermined current value Iref is decided according to the desired output torque, and for example is set to the switching control unit SCb beforehand by rewriting the current value Iref in a software manner from a setting dipswitch for performing settings that is omitted from illustration, or an input device that is omitted from illustration, or the like. More specifically, of the multiple switching elements Tr1 through TR6 which are turned on and off to form the above-described path of the first form, further turning of and off the first and third switching elements Tr1 and Tr3 on the first conducting path of the first excitation current I1 flowing from the power source terminals Ti1 and Ti2 to the primary excitation coil L1 of the first phase via the connecting terminal Tc1 and Tc2, thereby applying the first excitation current I1 in pulses by the path of the first form to the primary excitation coil L1 of the first phase so as to be the predetermined current value Iref. In the example illustrated in FIG. 18, the first switching element Tr1 is further turned on and off by the switching control unit SCb.

More specifically, when forming the path of the first form, the first excitation current I1 flowing at the primary excitation coil L1 of the first phase increases over time, as illustrated in FIG. 19A. This first excitation current I1 is monitored by the first current detecting unit CS1. When the first excitation current I1 reaches a current value obtained by adding a hysteresis bandwidth Ibw to the predetermined current value Iref (Iref+Ibw), based on the detection results input from the first current detecting unit CS1, the switching control unit SCb outputs a control signal to the first switching element Tr1 at that timing, as illustrated in FIG. 19B, to turn the first switching element Tr1 off. When the first switching element Tr1 is turned off, the first excitation current I1 flowing at the primary excitation coil L1 of the first phase decreases over time, as illustrated in FIG. 19A. Upon the first excitation current reaching a current value obtained by subtracting the hysteresis bandwidth Ibw from the predetermined current value Iref (Iref−Ibw), based on the detection results input from the first current detecting unit CS1, the switching control unit SCb outputs a control signal to the first switching element Tr1 at that timing, as illustrated in FIG. 19B, to turn the first switching element Tr1 on. When the first switching element Tr1 is turned on, the first excitation current I1 flowing at the primary excitation coil L1 of the first phase increases over time again, as illustrated in FIG. 19A. When the first excitation current I1 reaches a current value obtained by adding the hysteresis bandwidth Ibw to the predetermined current value Iref (Iref+Ibw), based on the detection results input from the first current detecting unit CS1, the switching control unit SCb outputs a control signal to the first switching element Tr1 in the same way as described above at that timing, as illustrated in FIG. 19B, to turn the first switching element Tr1 off. When the first switching element Tr1 is turned off, the first excitation current I1 flowing at the primary excitation coil L1 of the first phase decreases over time again, as illustrated in FIG. 19A. Upon the first excitation current reaching a current value obtained by subtracting the hysteresis bandwidth Ibw from the predetermined current value Iref (Iref−Ibw), based on the detection results input from the first current detecting unit CS1, the switching control unit SCb outputs a control signal to the first switching element Tr1 at that timing, in the same way as described above as illustrated in FIG. 19B, to turn the first switching element Tr1 on. The switching control unit SCb repeats on/off of the first switching element Tr1 until the timing to start the second operating mode II. The timing at which the second operating mode II is started is a timing at which the phase angle θ reaches a predetermined angle set beforehand, e.g., an angle where the inductance of the primary excitation coil L1 of the first phase exhibits the maximum value Lmax (angle where the inductance of the secondary excitation coil L2 exhibits the minimum value Lmin). Controlling the on/off of the first switching element Tr1 in this way by the switching control unit SCb keeps the first excitation current I1 flowing at the primary excitation coil L1 of the first phase within a range centered on the predetermined current value Iref±the hysteresis bandwidth Ibw (Iref−Ibw≤first excitation current I1≤Iref+Ibw). The hysteresis bandwidth Ibw represents the precision of current control in a case of controlling the first excitation current I1 so as to be the predetermined current value Iref, and is set as appropriate according to the performance of the circuit parts making up the motor drive device DRb and so forth. The hysteresis bandwidth Ibw is preferably a smaller value in order to execute current control with higher precision, whereby the desired output torque is obtained in a more stable manner, which is desirable. One example of this eighth-a operating mode VIIIa is primarily the third electricity supply mode.

The switching control unit SCb then preferably turns the third switching element Tr3 on and the remaining first, second, and fourth through sixth switching elements Tr1, Tr2, and Tr4 through Tr6 off in a first off period where the first switching element Tr1 on the first conducting path of the first excitation current I1 goes off, thereby further forming the above-described fourth path. Thus, the primary excitation coil L1 of the first phase is in a freewheeling state, and there is reflux of current on a path from the primary excitation coil L1 of the first phase through the connecting terminal Tc2, third switching element Tr3, third rectifying element D3, and connecting terminal Tc1, returning to the primary excitation coil L1 of the first phase (example of path of seventh form on fourth path). According to this configuration, the eighth-a operating mode VIIIa is the third electricity supply mode including the first current circulation mode, as one example. According to such a motor drive device DRb, the primary excitation coil L1 of the first phase is put in a freewheeling state by the fourth path, so energy can be temporarily held in the primary excitation coil L1 of the first phase, so occurrence of surging can be avoided even if the timing for turning the switching elements on and of at the time of switching the operating modes is off from the planned timing set beforehand. On the other hand, the secondary excitation coil L2 of the second phase also is in a freewheeling state continuing from the sixth operating mode VI through the above-described eighth and second operating modes VIIIa and II, and there is reflux of current through the above-described path.

The switching control unit SCb also preferably turns the first switching element Tr1 on and the remaining second through sixth switching elements Tr2 through Tr6 off in a first on period where the first switching element Tr1 on the first conducting path of the first excitation current I1 goes on, thereby further forming the above-described second path. The current generated by electromotive force of the primary excitation coil L1 of the first phase flows from the primary excitation coil L1 of the first phase to the charging and discharging element C1, over a path from the primary excitation coil L1 of the first phase through the connecting terminal Tc2, second rectifying element D2, charging and discharging element C1, resistor element R1, first rectifying element D1, first switching element Tr1, and connecting terminal Tc1, returning to the primary excitation coil L1 of the first phase (example of path of third form on second path). This performs regenerative charging of the charging and discharging element C1. According to this configuration, the eighth-a operating mode VIIIa is the third electricity supply mode including the first regeneration mode, as one example. According to such a motor drive device DRb, regeneration can be performed from the primary excitation coil L1 of the first phase in an independent matter by the second path, and thus electric power efficiency can be improved. Note that in a case where there is energy remaining in the secondary excitation coil L2 of the second phase in a freewheeling state, the current generated by electromotive force of the secondary excitation coil L2 of the second phase flows from the secondary excitation coil L2 of the second phase to the charging and discharging element C1, over a path from the secondary excitation coil L2 of the second phase through the connecting terminal Tc2, second rectifying element D2, charging and discharging element C1, power source terminal Ti1, power source PS, power source terminal Ti2, fourth rectifying element D4, and connecting terminal Tc3, returning to the secondary excitation coil L2 of the second phase (example of path of fourth form on second path), thus performing regenerative charging of the charging and discharging element C1.

In the eighth-a operating mode VIIIa, when the phase angle $\theta$ in the cyclic change of inductance of the primary excitation coil L1 of the first phase reaches a predetermined angle $\theta$IV set beforehand, the fourth switching element Tr4 is turned on for a predetermined amount of time $\tau$IV set beforehand, in the same way as in the first operating mode I described above. This fourth switching element Tr4 turning on discharges the charge stored in the charging and discharging element C1 (the charge primarily from regenerative charging from the secondary excitation coil L2 of the second phase, zero at the time of starting, which will be described later), and current flows from the charging and discharging element C1, over the path from the charging and discharging element C1 through the fourth transistor Tr4, first transistor Tr1, connecting terminal Tc1, primary excitation coil L1 of the first phase connecting terminal Tc2, third switching element Tr3, power source terminal Ti2, power source PS, and power source terminal Ti1, and returns to the charging and discharging element C1 (example of path of fifth form on third path), as an excitation current. Thus, current from the charging and discharging element C1 is applied to the primary excitation coil L1 of the first phase in addition to the current from the power source PS. While description has been made above that the electric charge of the charging and discharging element C1 is used partway through the first operating mode I, the electric charge of the charging and discharging element C1 may be used at the same time as starting the first operating mode I, in order to increase the initial acceleration. Also, the secondary excitation coil L2 of the second phase is in a freewheeling state continuing from the sixth operating mode VI, and there is reflux of a current from the secondary excitation coil L2 of the second phase through the connecting terminal Tc2, third switching element Tr3, fourth rectifying element D4, and connecting terminal Tc3, and back to the secondary excitation coil L2 of the second phase.

In a case where the phase angle $\theta$ reaches a predetermined angle set beforehand, the motor drive device DRb drives the SR motor M in the ninth-a operating mode IXa while the secondary excitation coil L2 of the second phase is being excited and inductance at the secondary excitation coil L2 of the second phase is increasing along with rotation of the rotor RT. That is to say, the ninth-a operating mode IXa starts at a similar timing to the start timing of the eighth-a operating mode VIIIa. This is also the same for the timing to switch the following operating modes as well. The timing of switching from the third operating mode III to the ninth-a operating mode IXa is preferably at a phase where the rate of change of inductance at the secondary excitation coil L2 of the second phase along with rotation of the rotor RT is the largest. The second and third switching elements Tr2 and Tr3 are each turned on and the remaining first and fourth through sixth switching elements Tr1 and Tr4 through Tr6 are turned off in the ninth-a operating mode IXa, in the same way as with the fourth operating mode IV as illustrated in FIG. 18. Accordingly, the excitation current from the power source PS flows from the power source PS to the secondary excitation coil L2 of the second phase over the path from the power source PS through the power source terminal Ti1, resistor element R1, fifth rectifying element D5, second switching element Tr2, connecting terminal Tc3, secondary excitation coil L2 of the second phase, connecting terminal Tc2, third switching element Tr3, and power source terminal Ti2, and returns to the power source PS (example of path of second form on first path), as illustrated in FIG. 8A.

Now, the ninth-a operating mode IXa differs from the above-described fourth operating mode IV with regard to the following point, and the motor drive device DRb supplies electricity to the secondary excitation coil L2 of the second phase so that the second excitation current I2 at the secondary excitation coil L2 of the second phase is the predetermined current value Iref set beforehand (fourth electricity supply mode). More specifically, of the multiple switching elements Tr1 through Tr6 which are turned on and off to form the above-described path of the second form, further turning on and off the second and third switching elements Tr2 and Tr3 on the second conducting path of the second excitation current I2 flowing from the power source terminals Ti1 and Ti2 to the secondary excitation coil L2 of the second phase via the connecting terminal Tc1 and Tc2, applies the second excitation current I2 in pulses by the path of the second form to the secondary excitation coil L2 of the second phase so as to be the predetermined current value Iref set beforehand. In the example illustrated in FIG. 18, the second switching element Tr2 is further turned on and off by the switching control unit SCb.

More specifically, when forming the path of the second form, the first excitation current I2 flowing at the secondary excitation coil L2 of the second phase increases over time. This second excitation current I2 is monitored by the second current detecting unit CS2. When the second excitation current I2 reaches a current value obtained by adding the hysteresis bandwidth Ibw to the predetermined current value Iref (Iref+Ibw), based on the detection results input from the second current detecting unit CS2, the switching control unit SCb outputs a control signal to the second switching element Tr2 to turn the second switching element Tr2 off. When the second switching element Tr2 is turned off, the second excitation current I2 flowing at the secondary excitation coil L2 of the second phase decreases over time. Upon the second excitation current I2 reaching a current value obtained by subtracting the hysteresis bandwidth Ibw from the predetermined current value Iref (Iref−Ibw), based on the detection results input from the second current detecting unit CS2, the switching control unit SCb outputs a control signal to the second switching element Tr2, to turn the second switching element Tr2 on. When the second switching element Tr2 is turned on, the second excitation current I2 flowing at the secondary excitation coil L2 of the second phase increases over time again. When the second excitation current I2 reaches a current value obtained by adding the hysteresis bandwidth Ibw to the predetermined current value Iref (Iref+Ibw), based on the detection results input from the second current detecting unit CS2, the switching control unit SCb outputs a control signal to the second switching element Tr2 in the same way as described above, to turn the second switching element Tr2 off. When the second switching element Tr2 is turned off, the second excitation current I2 flowing at the secondary excitation coil L2 of the second phase decreases over time again. Upon the second excitation current reaching a current value obtained by subtracting the hysteresis bandwidth Ibw from the predetermined current value Iref (Iref−Ibw), based on the detection results input from the second current detecting unit CS1, the switching control unit SCb outputs a control signal to the second switching element Tr2 in the same way as described above, to turn the second switching element Tr2 on. The switching control unit SCb repeats the on/off of the second switching element Tr2 until the timing to start the fifth operating mode V. The timing at which the fifth operating mode V is started is a timing at which the phase angle θ reaches a predetermined angle set beforehand, e.g., an angle where the inductance of the secondary excitation coil L2 of the second phase exhibits the maximum value Lmax (angle where the inductance of the primary excitation coil L1 exhibits the minimum value Lmin). Controlling the on/off of the second switching element Tr2 in this way by the switching control unit SCb keeps the second excitation current I2 flowing at the secondary excitation coil L2 of the second phase within a range centered on the predetermined current value Iref±the hysteresis bandwidth Ibw (Iref−Ibw≤second excitation current I2≤Iref+Ibw). One example of this ninth-a operating mode IXa is primarily the fourth electricity supply mode.

The switching control unit SCb then preferably turns the third switching element Tr3 on and the remaining first, second, and fourth through sixth switching elements Tr1, Tr2, and Tr4 through Tr6 off in a first off period where the second switching element Tr2 on the second conducting path of the second excitation current I2 goes off, thereby further forming the above-described fourth path. Thus, the secondary excitation coil L2 of the second phase is in a freewheeling state, and there is reflux of current on a path from the secondary excitation coil L2 of the second phase through the connecting terminal Tc2, third switching element Tr3, fourth rectifying element D4, and connecting terminal Tc3, returning to the secondary excitation coil L2 of the second phase (example of path of eighth form on fourth path). According to this configuration, the ninth-a operating mode IXa is the fourth electricity supply mode including the second current circulation mode, as one example. According to such a motor drive device DRb, the secondary excitation coil L2 of the second phase is put in a freewheeling state by the fourth path, so energy can be temporarily held in the secondary excitation coil L2 of the second phase, so occurrence of surging can be avoided even if the timing for turning the switching elements on and off at the time of switching the operating modes is off from the planned timing set beforehand. On the other hand, the primary excitation coil L1 of the first phase also is in a freewheeling state continuing from the third operating mode III through the above-described ninth-a and fifth operating modes IXa and V, and there is reflux of current from the primary excitation coil L1 of the first phase through the above-described path.

The switching control unit SCb also preferably turns the second switching element Tr2 on and the remaining first and through third sixth switching elements Tr1 and Tr3 through Tr6 off in a first on period where the second switching element Tr2 on the second conducting path of the second excitation current I2 goes on, thereby further forming the above-described second path. The current generated by electromotive force of the secondary excitation coil L2 of the second phase flows from the secondary excitation coil L2 of the second phase to the charging and discharging element C1, over a path from the secondary excitation coil L2 of the second phase through the connecting terminal Tc2, second rectifying element D2, charging and discharging element C1, resistor element R1, fifth rectifying element D5, second switching element Tr2, and connecting terminal Tc3, returning to the secondary excitation coil L2 of the second phase (other example of path of fourth form on second path). This performs regenerative charging of the charging and discharging element C1. According to this configuration, the ninth-a operating mode IXa is the fourth electricity supply mode including the second regeneration mode, as one example. According to such a motor drive device DRb, regeneration can be performed from the secondary excitation coil L2 of the second phase in an independent matter by the second path, and thus electric power efficiency can be improved. Note that in a case where there is energy remaining in the primary excitation coil L1 of the first phase in a freewheeling state, the current generated by electromotive force of the primary excitation coil L1 of the first phase flows from the primary excitation coil L1 of the first phase to the charging and discharging element C1, over a path from the primary excitation coil L1 of the first phase through the connecting terminal Tc2, second rectifying element D2, charging and discharging element C1, resistor element R1, first rectifying element D1, first switching element Tr1, and connecting terminal Tc1, returning to the primary excitation coil L1 of the first phase, thus performing regenerative charging of the charging and discharging element C1.

In the ninth-a operating mode IXa, when the phase angle θ in the temporal change of inductance of the excitation coil L2 reaches a predetermined angle θIV set beforehand, the fifth switching element Tr5 is turned on for a predetermined amount of time τIV set beforehand, in the same way as in the fourth operating mode IV described above. The phase angle θ in temporal change of inductance of the secondary excitation coil L2 is the same as the phase angle θ in temporal change of inductance of the primary excitation coil L1, with the phase angle θ at the point of starting turning on the first and third switching elements Tr1 and Tr3 being zero. This fifth switching element Tr5 turning on discharges the charge stored in the charging and discharging element C1 (the charge primarily from regenerative charging from the primary excitation coil L1 of the first phase), and current flows over the path from the charging and discharging element C1 through the fifth transistor Tr5, second transistor Tr2, connecting terminal Tc3, secondary excitation coil L2 of the second phase, connecting terminal Tc2, third switching element Tr3, power source terminal Ti2, power source PS, and power source terminal Ti1, and returns to the charging and discharging element C1 (example of path of sixth form on third path), as an excitation current. Thus, current from the charging and discharging element C1 is applied to the secondary excitation coil L2 of the second phase in addition to the current from the power source PS. Also, the primary excitation coil L1 of the first phase is in a freewheeling state continuing from the third operating mode III, and there is reflux of a current from the primary excitation coil L1 of the first phase over the above-described path.

With a predetermined No. 1 phase as a starting point in a case where the inductance of the primary excitation coil L1 of the first phase is increasing along with rotation of the rotor RT, in the case of current control the motor drive device DRb according to the present embodiment thus repeats, synchronously with the inductance cycle of the primary excitation coil L1 of the first phase, the eighth-a operating mode (third electricity supply mode) VIIIa, the second operating mode (first regeneration mode) II, ninth-a operating mode (fourth electricity supply mode) IXa, and fifth operating mode (second regeneration mode), in this order, whereby current control of the anti-symmetrical two-phase motor M to be driven can be performed, and the anti-symmetrical two phase motor M can be driven at the desired output torque. The motor drive device DRb according to the present embodiment regenerates the residual energy remaining in the primary excitation coil L1 of the first phase by the second operating mode (first regeneration mode) II and then supplies to the secondary excitation coil L2 of the second phase, so the effect of impeding acceleration by the primary excitation coil L1 of the first phase can be reduced. The motor drive device DRb also regenerates the residual energy remaining in the excitation coil L2 of the second phase by the fifth operating mode (second regeneration mode) V and then supplies to the primary excitation coil L1 of the first phase, so the effect of impeding acceleration by the secondary excitation coil L2 of the second phase can be reduced. Consequently, the average torque can be increased by the motor drive device DRb according to the present embodiment.

In the above-described motor drive device DRb, the first excitation current I1 is applied in pulses so as to be the predetermined current value Iref, by further turning on and off the first switching element Tr1 on the first conducting path of the first excitation current IL and the second excitation current I2 is applied in pulses so as to be the predetermined current value Iref, by further turning on and off the second switching element Tr2 on the second conducting path of the second excitation current I2, so the number of elements for current control of the first and second excitation currents I1 and I2 can be reduced.

Figure 20:
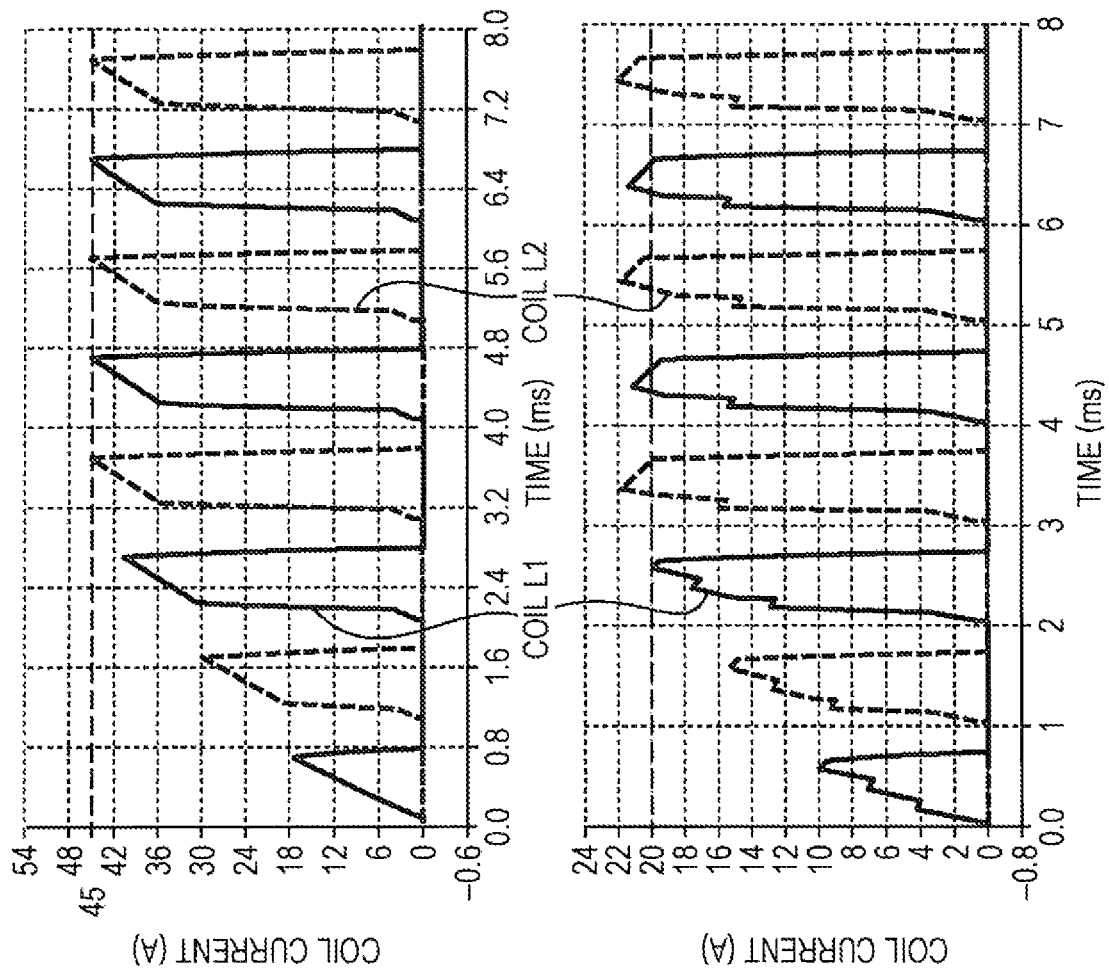
FIG. 20 is a diagram for describing excitation currents at each motor drive device according to the first and second embodiments.

An example of excitation current controlled by the motor drive devices DRa and DRb in the above-described first and second embodiments will be described. FIG. 20 is a diagram for describing the excitation currents in the motor drive devices according to the first and second embodiments. FIG. 20A illustrates a case of the motor drive device according to the first embodiment (acceleration control), and FIG. 20B illustrates a case of the motor drive device according to the second embodiment (current control). The horizontal axes in FIG. 20A and FIG. 20B represent time, and the vertical axes thereof represent excitation current. In the case of acceleration control, the first and second excitation currents flowing at the primary and secondary excitation coils L1 and L2 increase gradually over time after the SR motor M starts, and reach approximately 45 A, as illustrated in FIG. 20A. On the other hand, in the case of current control, the first and second excitation currents flowing at the primary and secondary excitation coils L1 and L2 increase gradually over time after the SR motor M starts, as illustrated in FIG. 20B, but once approximately 20 A is reached, they are controlled constant at approximately 20 A.

Figure 21:
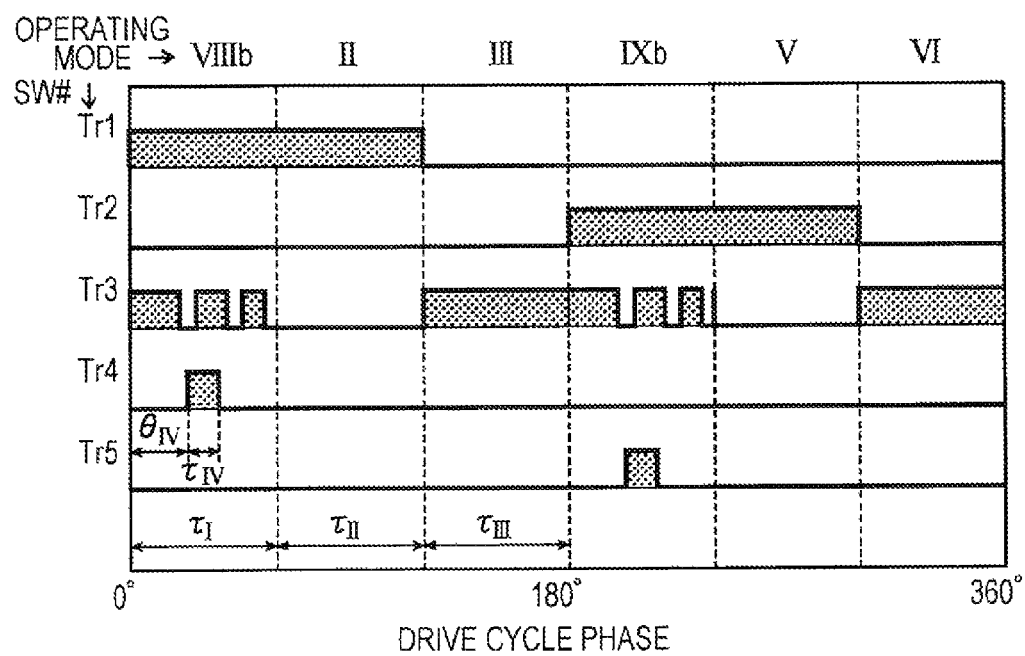
FIG. 21 is a time chart illustrating on/off timing of a second form at switching devices at the time of torque control in the motor drive device according to the second embodiment.

In the above description, in the eighth-a operating mode VIIIa the first switching element Tr1 is turned on and off to generate the pulse-form first excitation current I1, and in the ninth-a operating mode IXa the second switching element Tr2 is turned on and off to generate the pulse-form second excitation current I2, but an arrangement may be made as illustrated in FIG. 21 where the third switching element Tr3 is turned on and off by the switching control unit SCb to generate the pulse-form first and second excitation currents I1 and I2. That is to say, a configuration may be made where the switching control unit SCb executes an eighth-b operating mode VIIIb where the third switching element Tr3 is turned on and off to generate the pulse-form first excitation current I1, instead of the eighth-a operating mode VIIIa, and executes a ninth-b operating mode IXb where the third switching element Tr3 is turned on and off to generate the pulse-form second excitation current I2, instead of the ninth-a operating mode IXa. FIG. 21 is a time chart illustrating on/off timing of a second form at switching devices at the time of torque control in the motor drive device according to the second embodiment. FIG. 21 illustrates the on/off timing of the first switching element Tr1 through the fifth switching element Tr5 in order from top to bottom, and the horizontal axis is the driving cycle phase. Regarding the driving cycle phase, the example illustrated in FIG. 21 is a schematic representation of a cycle where a switching pattern that changes as operating mode VIIIb→II→III→IXb→V→VI is cyclically repeated. Of course, the switching control unit SCb may execute an eighth-c operating mode VIIIc where the first and third switching elements Tr1 and Tr3 are turned on and off synchronously with each other to generate the pulse-form first excitation current IL instead of the eighth-a operating mode VIIIa, and execute a ninth-c operating mode IXc where the second and third switching elements Tr2 and Tr3 are turned on and off synchronously with each other to generate the pulse-form second excitation current I2, instead of the ninth-a operating mode IXa.

Also, while description has been made above separately for the motor drive device DRa according to the first embodiment which performs acceleration control and deceleration control, and the motor drive device DRb according to the second embodiment which performs current control, the motor drive device DRa according to the first embodiment may be configured to perform the current control of the motor drive device DRb according to the second embodiment and execute current control as with the motor drive device DRb according to the second embodiment, and conversely, the motor drive device DRb according to the second embodiment may be configured to perform the acceleration control and deceleration control of the motor drive device DRa according to the first embodiment, and execute the acceleration control and deceleration control of the motor drive device DRa according to the first embodiment, as a matter of course. That is to say, the switching control units SCa and SCb controls tuning on and off each of the switching elements Tr1 through Tr6 so as to form the predetermined paths for the current, in accordance with the positions of the rotor-side magnetic poles 24 and 2012 as to the stator-side magnetic poles 12 and 1012 in the SR motor M, so that the SR motor M (Ma, Mb) is driven in any of acceleration control, deceleration control, and current control.

(Motor Drive Device According to Third Embodiment)

Next, a motor drive device according to a third embodiment to device the above-described anti-symmetrical two phase motor M will be described.

The above-described motor drive devices DRa and DRb according to the first and second embodiments have a single charging and discharging element C1 as the charging and discharging unit to perform charging and discharging. When the SR motor M rotates at a relatively high speed, a relatively great back electromotive force is generated at the primary excitation coil L1 and secondary excitation coil L2, and accordingly the charging and discharging unit needs a relatively large capacity to handle this. Accordingly, an arrangement may be made where the single charging and discharging element C1 in the motor drive devices DRa and DRb according to the first and second embodiments is made to be large in capacity, so such large back electromotive force is handled with a single large-scale charging and discharging element C1, but the motor drive device DRc according to the third embodiment has multiple charging and discharging elements C and handles the large back electromotive force with the multiple charging and discharging elements C.

In actual operation of the SR motor M, the revolutions will change from relatively slow rotation to relatively fast rotation. In a case where a charging and discharging element C is configured using a capacitor, the capacitor voltage is obtained by dividing the charge by the capacitance thereof. Accordingly, when the SR motor M rotates at relatively slow rotations, relatively small back electromotive force is generated at the primary excitation coil L1 and the secondary excitation coil L2, so the capacitor voltage is a relatively small value. As a result, the current is slow in rising in a case of supplying electricity from the capacitor to the primary excitation coil L1 or the secondary excitation coil L2.

However, the motor drive device DRc according to the third embodiment has multiple charging and discharging elements C, so the number of charging and discharging elements C used for charging and discharging can be changed based on the revolutions of the SR motor M, and thus the rising of the current can be sped up even in cases where the revolutions are relatively low and the back electromotive force is small.

This motor drive device DRc according to the third embodiment may be an arrangement where the single charging and discharging element C1 in the motor drive device DRa according to the first embodiment illustrated in FIG. 1 is made to be multiple, but an arrangement where will be described where the single charging and discharging element C1 in the motor drive device DRb according to the second embodiment illustrated in FIG. 17 is made to be multiple.

Figure 22:
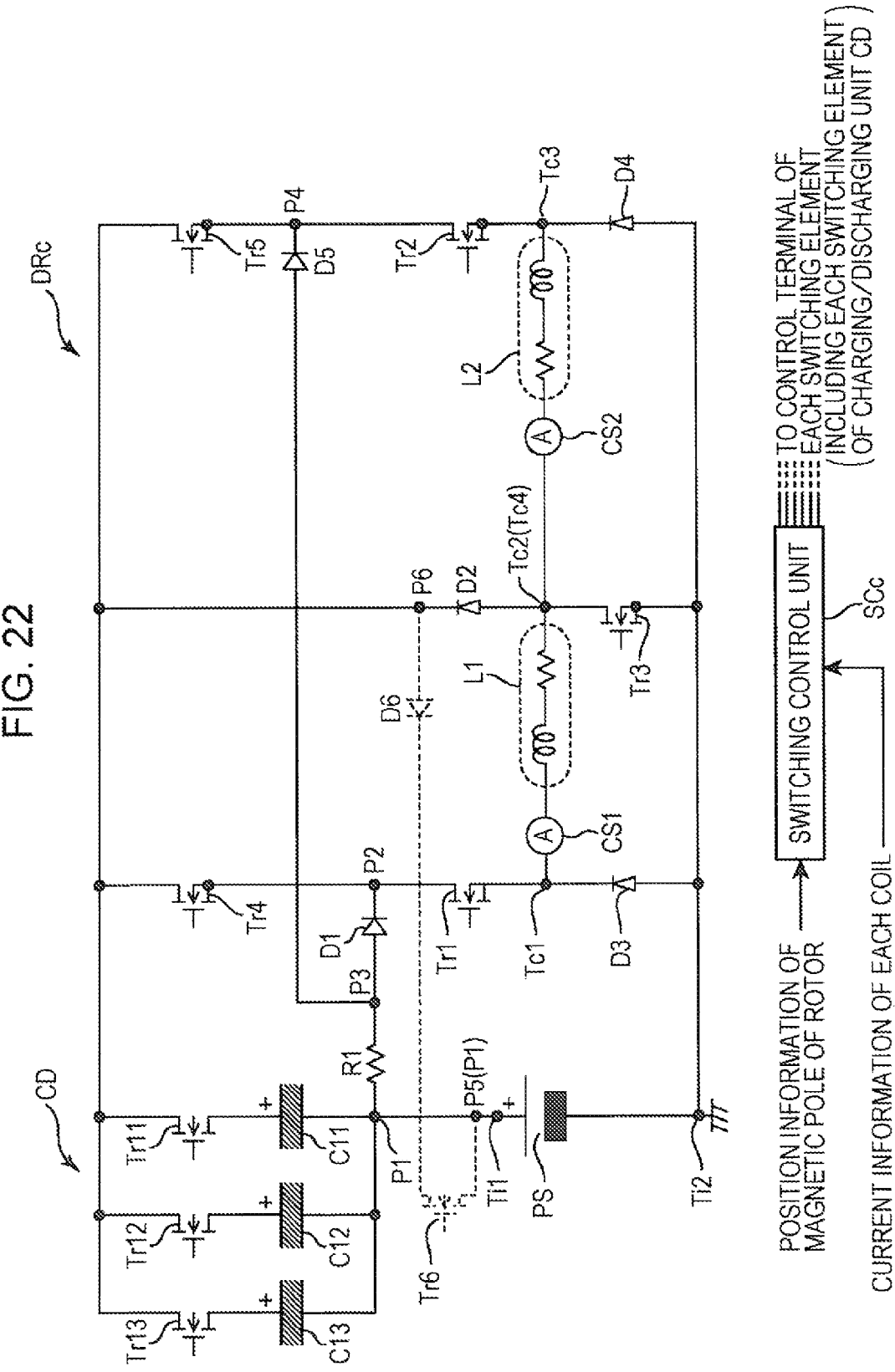
FIG. 22 is a circuit diagram illustrating the configuration of a motor drive device according to a third embodiment.

FIG. 22 is a circuit diagram illustrating the configuration of the motor drive device according to the third embodiment. This motor drive device DRc according to the third embodiment includes, for example, a pair of power source terminals Ti1 and Ti2, a pair of connecting terminals Tc1 and Tc2, a pair of connecting terminal Tc3 and Tc4, a charging and discharging unit CD including multiple charging and discharging elements C, rectifying elements D1 through D6, switching elements Tr1 through Tr6, a shunt resistor element R1, a first current detecting unit CS1, a second current detecting unit CS2, and a switching control unit SCc, as illustrated in FIG. 22. That is to say, the motor drive device DRc according to the third embodiment has, as compared to the motor drive device DRb according to the second embodiment, the charging and discharging unit CD including multiple charging and discharging elements C instead of the single charging and discharging element C1. Accordingly, the pair of power source terminals Ti1 and Ti2, pair of connecting terminals Tc1 and Tc2, pair of connecting terminal Tc3 and Tc4, rectifying elements D1 through D6, switching elements Tr1 through Tr6, shunt resistor element R1, and first current detecting unit CS1 and second current detecting unit CS2, in the motor drive device DRc according to the third embodiment, are the same as the pair of power source terminals Ti1 and Ti2, pair of connecting terminals Tc1 and Tc2, pair of connecting terminal Tc3 and Tc4, rectifying elements D1 through D6, switching elements Tr1 through Tr6, shunt resistor element R1, and first current detecting unit CS1 and second current detecting unit CS2, in the motor drive device DRb according to the second embodiment, so description thereof will be omitted.

The charging and discharging unit CD includes multiple serial circuits where a charging and discharging element C and a switching element Tr are connected in series, and the multiple serial circuits are connected in parallel. In the example illustrated in FIG. 22, the charging and discharging unit CD includes three charging and discharging elements C11 through C13, and three switching elements Tr11 through Tr13 connected to the three charging and discharging elements C11 through C13 in series. Note that the charging and discharging elements C are not restricted to three, and any number may be used. These charging and discharging elements C11 through C13 are capacitors such as electric double-layer capacitors and electrolytic capacitors or the like, for example.

A switching control unit SCc is, in the same way as with the switching control unit SCb, connected to the control terminals of the switching elements Tr1 through Tr6, serves as a circuit to output control signals Sig to the switching elements Tr1 through Tr6 to control on and off of the switching elements Tr1 through Tr6, and operates in the same way as the switching control unit SCb. In the third embodiment, the switching control unit SCc is connected to the control terminals of the switching elements Tr11 through Tr13 at the charging and discharging unit CD, and serves as a circuit to output control signals Sig to the switching elements Tr11 through Tr13 to control on and off of the switching elements Tr11 through Tr13.

The SR motor M may be provided with a revolutions detecting unit that detects revolutions of the SR motor M, and the switching control unit SCc receiving input of revolutions information relating to the revolutions of the SR motor M from the revolutions detecting unit, but in the present embodiment, the switching control unit SCc obtains the revolutions of the SR motor M based on the position information input from a magnetic pole position detecting unit omitted from illustration, such as a rotary encoder or the like for example, that detects the position of the rotor-side magnetic poles 24 and 2012 of the SR motor M as described above. More specifically, the switching control unit SCc measures the number of position information indicating the same position per unit time (e.g., 1 minute), for example, thereby calculating the revolutions (rpm) of the SR motor M. Also, the switching control unit SCc measures the time interval (time for the rotor to make one rotation) between position information indicating the same position, for example, thereby calculating the revolutions of the SR motor M.

The switching control unit SCc then turns on and off the switching elements Tr11 through Tr13 in each of the multiple serial circuits based on the revolutions of the SR motor M. More specifically, in the present embodiment a predetermined first revolutions value Rth1, and a second revolutions value Rth2 which is a larger value than the first revolutions value Rth1, are set beforehand (Rth1<Rth2), for example. The switching control unit SCc compares the revolutions of the SR motor M with the revolutions values Rth1 and Rth2, and as a result of the comparison, if the revolutions of the SR motor M are 0 or more but smaller than the first revolutions value Rth1, one switching element (e.g., the switching element Tr11) is turned on while the remaining switching elements (the switching elements Tr12 and Tr13 in the above example) are turned off. As a result of the comparison, if the revolutions of the SR motor M are the first revolutions value Rth1 or more but smaller than the second revolutions value Rth2, two switching elements (e.g., the switching elements Tr11 and Tr12) are turned on while the remaining switching element (the switching element Tr13 in the above example) is turned off. As a result of the comparison, if the revolutions of the SR motor M are the second revolutions value Rth2 or higher, all three switching elements Tr11 through Tr13 are turned on.

Next, the operations of the motor drive device DRc according to the third embodiment will be described. The motor drive device DRc controls the on and off of the switching elements Tr11 through Tr13 at the charging and discharging unit CD, to change the number of charging and discharging elements C11 through C13 used for charging and discharging at the charging and discharging unit CD based on the revolutions of the SR motor M. More specifically, upon driving control of the SR motor M being started by the motor drive device DRc, position information relating to the position of the rotor-side magnetic poles 24 and 2012 of the SR motor M is input to the switching control unit SCc. The switching control unit SCc calculates the revolutions of the SR motor M from this position information, and compares the calculated revolutions with each of the first and second revolution threshold Rth1 and Rth2.

As a result of the comparison, if the revolutions of the SR motor M are 0 or more but smaller than the first revolutions value Rth1 (case of low speed), the switching control unit SCc turns one switching element Tr11 on while the remaining switching elements Tr12 and Tr13 are turned off. Thus, in a case where the SR motor M rotates at low speed, the charging and discharging element C11 used for charging and discharging is one. Accordingly, even in cases where only small back electromotive force is generated due to the low speed, a sufficient charge is changed at the charging and discharging element C11. Accordingly, the voltage at the charging and discharging element C11 is high, and the current rises relatively fast in a case of supplying electricity from the charging and discharging unit CD to the primary excitation coil L1 or secondary excitation coil L2.

As a result of the comparison, if the revolutions of the SR motor M are the first revolutions value Rth1 or higher but smaller than the second revolutions value Rth2 (case of medium speed), the switching control unit SCc turns two switching elements Tr11 and Tr12 on while the remaining switching element Tr13 is turned off. Thus, in a case where the SR motor M rotates at medium speed, the charging and discharging elements C11 and C12 used for charging and discharging are two. Accordingly, even in cases where back electromotive force exceeding the capacity of the one charging and discharging element C11 is generated due to the medium speed, generally all of the back electromotive force can be charged by the two charging and discharging elements C11 and C12, sufficient charge is charged at the charging and discharging elements C11 and C12. Accordingly, the voltage at the charging and discharging elements C11 and C12 is high, and the current rises relatively fast in a case of supplying electricity from the charging and discharging unit CD to the primary excitation coil L1 or secondary excitation coil L2.

As a result of the comparison, if the revolutions of the SR motor M are the second revolutions value Rth2 or higher (case of high speed), the switching control unit SCc turns all three switching elements Tr11 through Tr13 on. Thus, in a case where the SR motor M rotates at high speed, the charging and discharging elements C11 through Tr13 used for charging and discharging are three. Accordingly, even in cases where back electromotive force exceeding the capacity of the two charging and discharging elements C11 and C12 is generated due to the high speed, generally all of the back electromotive force can be charged by the charging and discharging elements C11 through Tr13, and sufficient charge is charged at the charging and discharging elements C11 through Tr13. Accordingly, the voltage at the charging and discharging elements C11 through Tr13 is high, and the current rises relatively fast in a case of supplying electricity from the charging and discharging unit CD to the primary excitation coil L1 or secondary excitation coil L2.

Thus, due having the charging and discharging unit CD the motor drive device DRc according to the third embodiment has the multiple charging and discharging elements C11 through C13, and accordingly can change the number of charging and discharging elements C used for charging and discharging at the charging and discharging unit CD by turning the switching elements Tr11 through Tr13 on and off, based on the revolutions of the SR motor M. Accordingly, this motor drive device DRc can charge and discharge residual energy of a relatively large capacity due to back electromotive force generated at the primary and secondary excitation coils L1 and L2, and even in a case where the revolutions are relatively small and the back electromotive force is small, the rising of the current can be sped up in a case of supplying electricity from the charging and discharging unit CD to the primary and secondary excitation coils L1 and L2. Thus, the motor drive device DRc according to the third embodiment can appropriately respond to low revolutions through high revolutions of the SR motor M with regard to the charging and discharging unit CD.

The present Specification discloses technologies of various forms as described above, primary technologies of which are summarized below.

A motor drive device according to one form includes: a power source terminal for connecting to a power source; a charging and discharging unit that performs charging and discharging, connected in series with the power source terminal; connecting terminals to be connected to each of primary and secondary excitation coils of an anti-symmetric two phase motor, in which difference between phases of cyclic change of inductance as to a rotational angle, due to the primary excitation coil of a first phase and the secondary excitation coil of a second phase, is 180 degrees; and a drive control unit that has a plurality of switching elements, and that forms a first path for independently supplying power to each of the primary and secondary excitation coils from the power source terminal via the connecting terminals, by turning the plurality of switching elements on and off, and further forms a second path for independent regeneration of each residual energy remaining in the primary and secondary excitation coils from the respective primary and secondary excitation coils into the charging and discharging unit via the connecting terminals by turning these switching elements on and off.

This motor drive device enables electricity to be independently supplied to the primary and secondary excitation coils by the first path, and independently regenerated from the primary and secondary excitation coils by the second path. Accordingly, the motor drive device enables electric energy remaining in one of the excitation coils to be regenerated, and the regenerated electric energy to be used in the other excitation coil, thereby improving electric power efficiency.

According to another form, in the above-described motor drive device, the drive control unit further forms a third path for independently supplying electricity to each of the primary and secondary excitation coils from the charging and discharging unit via the connecting terminals, by turning the plurality of switching elements on and off while excitation is being performed on the first path, to raise the excitation voltage.

In this motor drive device, electricity can further be independently supplied to each of the primary and secondary excitation coils from the charging and discharging unit by the third path, while performing excitation on the first path, so a voltage higher than the voltage of the power source can be applied to the primary and secondary excitation coils. Accordingly, efficient acceleration control of the motor drive device can be performed, and effecting deceleration control can be performed.

According to another form, in the above-described motor drive devices, the drive control unit forms the first path using a common switching element out of the plurality of switching elements, for independently supplying electricity to each of the primary and secondary excitation coils from the power source terminal via the connecting terminals.

In this motor drive device, a switching element is used in common (shared), so the number of switching elements can be reduced.

According to another form, in the above-described motor drive devices, the drive control unit further includes a common rectifying element to form the second path, for independently regenerating residual energy, remaining at the primary and secondary excitation coils, from each of the primary and secondary excitation coils to the charging and discharging unit via the connecting terminals.

In this motor drive device, a rectifying element is used in common, so the number of rectifying elements can be reduced.

According to another form, in the above-described motor drive devices, the drive control unit further forms a fourth path for putting the primary and secondary excitation coils in a freewheeling state by turning the plurality of switching elements on and off, and further includes an individual rectifying element to form the fourth path, in order to put the primary and secondary excitation coils in a freewheeling state.

In this motor drive device, the primary and secondary excitation coils are put in a freewheeling state by the fourth path, so energy can be temporarily held in the primary and secondary excitation coils, so occurrence of surging can be avoided even if the timing for turning the switching elements on and of at the time of switching the operating modes is off from the planned timing set beforehand.

According to another form, the above-described motor drive devices further include the power source, that is connected to the power source terminal and is a secondary battery that is charged and discharged. The drive control unit further forms a fifth path for independently regenerating residual energy remaining at the primary and secondary excitation coils, from each of the primary and secondary excitation coils to the power source via the connecting terminals, by turning the plurality of switching elements on and off, and further includes a common rectifying element and switching element to form the fifth path, for independently regenerating residual energy remaining at the primary and secondary excitation coils, from each of the primary and secondary excitation coils to the power source via the connecting terminals.

In this motor drive device, the primary and secondary excitation coils can independently perform regeneration to the secondary battery which is the power source by the fifth path. Accordingly, the motor drive device can regenerate electric energy remaining in one of the excitation coils, and the regenerated electric energy can be used in the other excitation coil, thereby improving electric power efficiency. This motor drive device uses rectifying elements and switching elements in common, so the number of rectifying elements and switching elements can be reduced.

According to another form, in the above-described motor drive devices, the first path includes a path of a first form for supplying electricity from the power source terminal to the primary excitation coil via the connecting terminals, and a path of a second form differing from the path of the first form, for supplying electricity from the power source terminal to the secondary excitation coil via the connecting terminals. The second path includes a path of a third form for regenerating residual energy remaining at the primary excitation coil from the primary excitation coil to the charging and discharging unit via the connecting terminals, and a path of a fourth form different from the path of the third form, for regenerating residual energy remaining at the second excitation coil from the secondary excitation coil to the charging and discharging unit via the connecting terminals. With a predetermined No. 1 phase as a starting point in a case where inductance of the primary excitation coil is increasing, the drive control unit repeats, synchronously with the inductance cycle of the primary excitation coil, a first electricity supply mode where electricity is supplied to the primary excitation coil by the path of the first form, a first regeneration mode where residual energy remaining at the primary excitation coil is regenerated by the path of the third form, a second electricity supply mode where electricity is supplied to the secondary excitation coil by the path of the second form, and a second regeneration mode where residual energy remaining at the second excitation coil is regenerated by the path of the fourth form, in this order.

In this motor drive device, with a predetermined No. 1 phase as a starting point in a case where inductance of the primary excitation coil is increasing, a first electricity supply mode, a first regeneration mode, a second electricity supply mode, and a second regeneration mode, are repeated synchronously with the inductance cycle of the primary excitation coil, in this order, so acceleration control of the anti-symmetrical two phase motor to be driven can be performed. The motor drive device regenerates the residual energy remaining in the primary excitation coil by the first regeneration mode and then supplies to the secondary excitation coil, so the effect of impeding acceleration by the primary excitation coil can be reduced. The motor drive device regenerates the residual energy remaining in the secondary excitation coil by the second regeneration mode and then supplies to the primary excitation coil, so the effect of impeding acceleration by the secondary excitation coil can be reduced. Consequently, the average torque of the motor drive device can be increased.

According to another form, in the above-described motor drive devices, the third path includes a path of a fifth form for supplying electricity from the charging and discharging unit to the primary excitation coil via the connecting terminals, and a path of a sixth form differing from the path of the fifth form, for supplying electricity from the charging and discharging unit to the secondary excitation coil via the connecting terminals. The drive control unit supplies electricity to the primary excitation coil by the path of the fifth form while executing the first electricity supply mode, and supplies electricity to the secondary excitation coil by the path of the sixth form while executing the second electricity supply mode.

In this motor drive device, electricity can be independently supplied from the charging and discharging unit to the primary excitation coil by the path of the fifth form while executing the first electricity supply mode, and electricity can be independently supplied from the charging and discharging unit to the secondary excitation coil by the path of the second form while executing the second electricity supply mode, so voltage higher than the voltage of the power source can be applied to the primary and secondary excitation coils. Accordingly, efficient acceleration control of the motor drive device can be performed.

According to another form, in the above-described motor drive devices, the fourth path includes a path of a seventh form for putting the primary excitation coil in a freewheeling state, and a path of an eighth form differing from the path of the seventh form, for putting the secondary excitation coil in a freewheeling state. After executing of the first regeneration mode ends, the drive control unit executes a first current circulating mode where the primary and secondary excitation coils are put in a freewheeling state by the seventh and eight paths, and after executing of the second regeneration mode ends, executes a second current circulating mode where the primary and secondary excitation coils are put in a freewheeling state by the seventh and eight paths.

In this motor drive device, after the first regeneration mode ends, the second electricity supply mode can be executed after having executed the first current circulation mode, so occurrence of surging by the switching elements can be avoided when transitioning from the first regeneration mode to the second electricity supply mode. In this motor drive device, after the second regeneration mode ends, the first electricity supply mode can be executed after having executed the second current circulation mode, so occurrence of surging by the switching elements can be avoided when transitioning from the second regeneration mode to the first electricity supply mode.

According to another form, in the above-described motor drive devices, the first path includes a path of a first form for supplying electricity from the power source terminal to the primary excitation coil via the connecting terminals, and a path of a second form differing from the path of the first form, for supplying electricity from the power source terminal to the secondary excitation coil via the connecting terminals. The fifth path includes a path of a ninth form for regenerating residual energy remaining at the primary excitation coil from the primary excitation coil to the power source via the connecting terminals, and a path of a tenth form different from the path of the ninth form, for regenerating residual energy remaining at the second excitation coil from the secondary excitation coil to the power source via the connecting terminals. With a predetermined No. 2 phase as a starting point before inductance of the primary excitation coil begins to decrease or immediately after decrease begins, the drive control unit repeats, synchronously with the inductance cycle of the primary excitation coil, a first electricity supply mode where electricity is supplied to the primary excitation coil by the path of the first form, a third regeneration mode where residual energy remaining at the primary excitation coil is regenerated by the path of the ninth form, a second electricity supply mode where electricity is supplied to the secondary excitation coil by the path of the second form, and a fourth regeneration mode where residual energy remaining at the second excitation coil is regenerated by the path of the tenth form, in this order.

In this motor drive device, with a predetermined No. 2 phase as a starting point before inductance of the primary excitation coil begins to decrease or immediately after decrease begins, a first electricity supply, a third regeneration mode, a second electricity supply mode, and a fourth regeneration mode, are repeated synchronously with the inductance cycle of the primary excitation coil, in this order, so deceleration control of the anti-symmetrical two phase motor to be driven can be performed. The motor drive device regenerates the residual energy remaining in the primary excitation coil by the third regeneration mode and then supplies to the secondary excitation coil, so the effect of impeding deceleration by the primary excitation coil can be reduced. The motor drive device regenerates the residual energy remaining in the secondary excitation coil by the fourth regeneration mode and then supplies to the primary excitation coil, so the effect of impeding deceleration by the secondary excitation coil can be reduced.

According to another form, in the above-described motor drive devices, the fourth path includes a path of a seventh form for putting the primary excitation coil in a freewheeling state, and a path of an eighth form differing from the path of the seventh form, for putting the secondary excitation coil in a freewheeling state. After executing of the third regeneration mode ends, the drive control unit executes a first current circulating mode where the primary and secondary excitation coils are put in a freewheeling state by the seventh and eight paths, and after executing of the fourth regeneration mode ends, executes a second current circulating mode where the primary and secondary excitation coils are put in a freewheeling state by the seventh and eight paths.

In this motor drive device, after the third regeneration mode ends, the second electricity supply mode can be executed after having executed the first current circulation mode, so occurrence of surging by the switching elements can be avoided when transitioning from the third regeneration mode to the second electricity supply mode. In this motor drive device, after the fourth regeneration mode ends, the second electricity supply mode can be executed after having executed the second current circulation mode, so occurrence of surging by the switching elements can be avoided when transitioning from the fourth regeneration mode to the first electricity supply mode.

According to another form, in the above-described motor drive devices, the first path includes a path of a first form for supplying electricity from the power source terminal to the primary excitation coil via the connecting terminals, and a path of a second form differing from the path of the first form, for supplying electricity from the power source terminal to the secondary excitation coil via the connecting terminals. The second path includes a path of a third form for regenerating residual energy remaining at the primary excitation coil from the primary excitation coil to the charging and discharging unit via the connecting terminals, and a path of a fourth form different from the path of the third form, for regenerating residual energy remaining at the second excitation coil from the secondary excitation coil to the charging and discharging unit via the connecting terminals. With a predetermined No. 1 phase as a starting point in a case where inductance of the primary excitation coil is increasing, the drive control unit repeats, synchronously with the inductance cycle of the primary excitation coil, a third electricity supply mode where electricity is supplied to the primary excitation coil by the path of the first form so as to be a predetermined current value set beforehand, a first regeneration mode where residual energy remaining at the primary excitation coil is regenerated by the path of the third form, a fourth electricity supply mode where electricity is supplied to the secondary excitation coil by the path of the second form so as to be a predetermined current value set beforehand, and a second regeneration mode where residual energy remaining at the second excitation coil is regenerated by the path of the fourth form, in this order.

In this motor drive device, with a predetermined No. 1 phase as a starting point in a case where inductance of the primary excitation coil is increasing, a third electricity supply mode, a first regeneration mode, a fourth electricity supply mode, and a second regeneration mode, are repeated synchronously with the inductance cycle of the primary excitation coil, in this order, so the anti-symmetrical two phase motor can be driven at a desired output torque. The motor drive device regenerates the residual energy remaining in the primary excitation coil by the first regeneration mode and then supplies to the secondary excitation coil, so the effect of impeding acceleration by the primary excitation coil can be reduced. The motor drive device regenerates the residual energy remaining in the secondary excitation coil by the second regeneration mode and then supplies to the primary excitation coil, so the effect of impeding acceleration by the secondary excitation coil can be reduced. Consequently, the average torque of the motor drive device can be increased.

According to another form, in the above-described motor drive devices, in the third electricity supply mode, the drive control unit further turns on and off, out of the plurality of switching elements which have been turned on and off to form the path of the first form, a switching element on a first conducting path of a first excitation current flowing from the power source terminal to the primary excitation coil via the connecting terminals, thereby applying the first excitation current in pulses by the path of the first form to the primary excitation coil so as to be a predetermined current value set beforehand, and in the fourth electricity supply mode, further turns on and off, out of the plurality of switching elements which have been turned on and off to form the path of the second form, a switching element on a second conducting path of a second excitation current flowing from the power source terminal to the secondary excitation coil via the connecting terminals, thereby applying the second excitation current in pulses by the path of the second form to the secondary excitation coil so as to be a predetermined current value set beforehand.

In this motor drive device, the first excitation current is applied in pulses so as to be the predetermined current value, by further turning on and off the switching element on the first conducting path of the first excitation current, and the second excitation current is applied in pulses so as to be the predetermined current value, by further turning on and off the switching element on the second conducting path of the second excitation current, so the number of elements for current control of the first and second excitation currents can be reduced.

According to another form, in the above-described motor drive devices, in the third electricity supply mode, the drive control unit further forms the fourth path during a first off period in which the switching element on the first conducting path of the first excitation current is turned off, and in the fourth electricity supply mode, further forms the fourth path during a second off period in which the switching element on the second conducting path of the second excitation current is turned off.

In this motor drive device, the primary and secondary excitation coils are put in a freewheeling state by the fourth path, so energy can be temporarily held in the primary and secondary excitation coils, so occurrence of surging can be avoided even if the timing for turning the switching elements on and of at the time of switching the operating modes is off from the planned timing set beforehand.

According to another form, in the above-described motor drive devices, in the third electricity supply mode, the drive control unit further forms the second path during a first on period in which the switching element on the first conducting path of the first excitation current is turned on, and in the fourth electricity supply mode, further forms the second path during a second on period in which the switching element on the second conducting path of the second excitation current is turned on.

In this motor drive device, regeneration can be performed independently from the primary and secondary excitation coils by the second path, and electric power efficiency can be improved.

According to another form, in the above-described motor drive devices, the charging and discharging unit includes a plurality of serial circuits where a charging and discharging element and switching element are connected in series. The plurality of serial circuits are connected in parallel, and the drive control unit further turns on and off the switching elements in the plurality of serial circuits, based on the revolutions of the anti-symmetrical two-phase motor.

In this motor drive device, the number of charging and discharging elements used for the charging and discharging can be changed by turning on and off the switching elements in the plurality of serial circuits based on the revolutions of the anti-symmetrical two-phase motor. Accordingly, the motor drive device can charge and discharge the relatively large-capacity residual energies due to back electromotive force generated at the primary and secondary excitation coils. Even in cases where the revolutions are relatively low and the back electromotive force is small, the rising of the current can be sped up in a case of independently supplying electricity from the charging and discharging unit to the primary and secondary excitation coils.

A motor drive system according to another form includes: an anti-symmetric two phase motor, in which difference between phases of cyclic change of inductances as to a rotational angle, due to primary and secondary excitation coils of first and second phases, is 180 degrees; and a motor drive device to drive the anti-symmetric two phase motor. The motor drive device is one of the above-described motor drive devices, where the primary and secondary excitation coils of the anti-symmetric two phase motor have been connected to the connecting terminals.

In this motor drive system, any one of the motor drive devices is used, enabling regeneration of electric energy remaining in one excitation coil and usage of this generated electric energy in the other excitation coil, so electric power efficiency can be improved.

This application is based on Japanese Patent Application No. 2012-258509 filed Nov. 27, 2012, and Japanese Patent Application No. 2013-207068 filed Oct. 2, 2013, the contents of which are hereby incorporated by reference.

While appropriate and sufficient description of the present invention has been made above by way of embodiments with reference to drawings, to express the present invention, one skill in the art will recognize that modifications and/or modifications of the above-described embodiments can be readily made. Accordingly, modified forms or improved forms carried out by one skilled in the art are to be interpreted as being encompassed by the scope of the Claims, unless the modified forms or improved forms depart from the scope of the Claims laid forth in the Claims.

INDUSTRIAL APPLICABILITY

According to the present invention, a motor drive device for driving a motor, and a motor drive system having the motor drive device, are provided.

The invention claimed is:
1. A motor drive device comprising:
a power source terminal for connecting to a power source;
a charging and discharging unit that performs charging and discharging, connected in series with the power source terminal;
connecting terminals to be connected to each of primary and secondary excitation coils of an anti-symmetric two phase motor; and
a drive control unit that has a plurality of switching elements, and that forms a first path for independently supplying power to each of the primary and secondary excitation coils from the power source terminal via the connecting terminals, by turning the plurality of switching elements on and off, and further forms a second path for independent regeneration of each residual energy remaining in the primary and secondary excitation coils from the respective primary and secondary excitation coils into the charging and discharging unit via the connecting terminals by turning these switching elements on and off, wherein the primary and secondary excitation coils have a phase period corresponding to cyclic change of inductance due to rotation of a rotor of the anti-symmetric two phase motor,
the phase period of the primary excitation coil is shifted in phase from the phase period of the secondary excitation coil by 180 degrees,
the first path includes a path of a first form for supplying electricity from the power source terminal to the primary excitation coil via the connecting terminals, and a path of a second form differing from the path of the first form, for supplying electricity from the power source terminal to the secondary excitation coil via the connecting terminals,
the second path includes a path of a third form for regenerating residual energy remaining at the primary excitation coil from the primary excitation coil to the charging and discharging unit via the connecting terminals, and a path of a fourth form different from the path of the third form, for regenerating residual energy remaining at the second excitation coil from the secondary excitation coil to the charging and discharging unit via the connecting terminals, and
with a predetermined number 1 phase as a starting point in a case where inductance of the primary excitation coil is increasing, the drive control unit repeats, synchronously with the inductance cycle of the primary excitation coil, a first electricity supply mode where electricity is supplied to the primary excitation coil by the path of the first form, a first regeneration mode where residual energy remaining at the primary excitation coil is regenerated by the path of the third form, a second electricity supply mode where electricity is supplied to the secondary excitation coil by the path of the second form, and a second regeneration mode where residual energy remaining at the second excitation coil is regenerated by the path of the fourth form, in this order.

2. The motor drive device according to claim 1, wherein the drive control unit further forms a third path for independently supplying electricity to each of the primary and secondary excitation coils from the charging and discharging unit via the connecting terminals, by turning the plurality of switching elements on and off while excitation is being performed on the first path, to raise the excitation voltage.

3. The motor drive device according to claim 1, wherein the drive control unit forms the first path using a common switching element out of the plurality of switching elements, for independently supplying electricity to each of the primary and secondary excitation coils from the power source terminal via the connecting terminals.

4. The motor drive device according to claim 1, wherein the drive control unit further includes a common rectifying element to form the second path, for independently regenerating residual energy, remaining at the primary and secondary excitation coils, from each of the primary and secondary excitation coils to the charging and discharging unit via the connecting terminals.

5. The motor drive device according to claim 1, wherein the drive control unit further forms a fourth path for putting the primary and secondary excitation coils in a freewheeling state by turning the plurality of switching elements on and off, and further includes an individual rectifying element to form the fourth path, in order to put the primary and secondary excitation coils in a freewheeling state.

6. The motor drive device according to claim 1, further comprising:
the power source, that is connected to the power source terminal and is a secondary battery that is charged and discharged;
wherein the drive control unit further forms a fifth path for independently regenerating residual energy remaining at the primary and secondary excitation coils, from each of the primary and secondary excitation coils to the power source via the connecting terminals, by turning the plurality of switching elements on and off, and further includes a common rectifying element and switching element to form the fifth path, for independently regenerating residual energy remaining at the primary and secondary excitation coils, from each of the primary and secondary excitation coils to the power source via the connecting terminals.

7. The motor drive device according to claim 1,
wherein the first path includes a path of a first form for supplying electricity from the power source terminal to the primary excitation coil via the connecting terminals, and a path of a second form differing from the path of the first form, for supplying electricity from the power source terminal to the secondary excitation coil via the connecting terminals,
wherein the fifth path includes a path of a ninth form for regenerating residual energy remaining at the primary excitation coil from the primary excitation coil to the power source via the connecting terminals, and a path of a tenth form different from the path of the ninth form, for regenerating residual energy remaining at the second excitation coil from the secondary excitation coil to the power source via the connecting terminals,
and wherein, with a predetermined number 2 phase as a starting point before inductance of the primary excitation coil begins to decrease or immediately after decrease begins, the drive control unit repeats, synchronously with the inductance cycle of the primary excitation coil, a first electricity supply mode where electricity is supplied to the primary excitation coil by the path of the first form, a third regeneration mode where residual energy remaining at the primary excitation coil is regenerated by the path of the ninth form, a second electricity supply mode where electricity is supplied to the secondary excitation coil by the path of the second form, and a fourth regeneration mode where residual energy remaining at the second excitation coil is regenerated by the path of the tenth form, in this order.

8. The motor drive device according to claim 1,
wherein the first path includes a path of a first form for supplying electricity from the power source terminal to the primary excitation coil via the connecting terminals, and a path of a second form differing from the path of the first form, for supplying electricity from the power source terminal to the secondary excitation coil via the connecting terminals,
wherein the second path includes a path of a third form for regenerating residual energy remaining at the primary excitation coil from the primary excitation coil to the charging and discharging unit via the connecting terminals, and a path of a fourth form different from the path of the third form, for regenerating residual energy remaining at the second excitation coil from the secondary excitation coil to the charging and discharging unit via the connecting terminals,
and wherein, with a predetermined number 1 phase as a starting point in a case where inductance of the primary excitation coil is increasing, the drive control unit repeats, synchronously with the inductance cycle of the primary excitation coil, a third electricity supply mode where electricity is supplied to the primary excitation coil by the path of the first form so as to be a predetermined current value set beforehand, a first regeneration mode where residual energy remaining at the primary excitation coil is regenerated by the path of the third form, a fourth electricity supply mode where electricity is supplied to the secondary excitation coil by the path of the second form so as to be a predetermined current value set beforehand, and a second regeneration mode where residual energy remaining at the second excitation coil is regenerated by the path of the fourth form, in this order.

9. The motor drive device according to claim 1,
wherein the charging and discharging unit includes a plurality of serial circuits where a charging and discharging element and switching element are connected in series,
wherein the plurality of serial circuits are connected in parallel,
and wherein the drive control unit further turns on and off the switching elements in the plurality of serial circuits, based on the revolutions of the anti-symmetrical two-phase motor.

10. The motor drive device according to claim 2,
wherein the third path includes a path of a fifth form for supplying electricity from the charging and discharging unit to the primary excitation coil via the connecting terminals, and a path of a sixth form differing from the path of the fifth form, for supplying electricity from the charging and discharging unit to the secondary excitation coil via the connecting terminals,
and wherein the drive control unit supplies electricity to the primary excitation coil by the path of the fifth form while executing the first electricity supply mode, and supplies electricity to the secondary excitation coil by the path of the sixth form while executing the second electricity supply mode.

11. The motor drive device according to claim 5,
wherein the fourth path includes a path of a seventh form for putting the primary excitation coil in a freewheeling state, and a path of an eighth form differing from the path of the seventh form, for putting the secondary excitation coil in a freewheeling state,
and wherein, after executing of the first regeneration mode ends, the drive control unit executes a first current circulating mode where the primary and secondary excitation coils are put in a freewheeling state by the seventh and eight paths, and after executing of the second regeneration mode ends, executes a second current circulating mode where the primary and secondary excitation coils are put in a freewheeling state by the seventh and eight paths.

12. The motor drive device according to claim 7,
wherein the fourth path includes a path of a seventh form for putting the primary excitation coil in a freewheeling state, and a path of an eighth form differing from the path of the seventh form, for putting the secondary excitation coil in a freewheeling state,
and wherein, after executing of the third regeneration mode ends, the drive control unit executes a first current circulating mode where the primary and secondary excitation coils are put in a freewheeling state by the seventh and eight paths, and after executing of the fourth regeneration mode ends, executes a second current circulating mode where the primary and secondary excitation coils are put in a freewheeling state by the seventh and eight paths.

13. The motor drive device according to claim 8, wherein, in the third electricity supply mode, the drive control unit further turns on and off, out of the plurality of switching elements which have been turned on and off to form the path of the first form, a switching element on a first conducting path of a first excitation current flowing from the power source terminal to the primary excitation coil via the connecting terminals, thereby applying the first excitation current in pulses by the path of the first form to the primary excitation coil so as to be a predetermined current value set beforehand, and in the fourth electricity supply mode, further turns on and off, out of the plurality of switching elements which have been turned on and off to form the path of the second form, a switching element on a second conducting path of a second excitation current flowing from the power source terminal to the secondary excitation coil via the connecting terminals, thereby applying the second excitation current in pulses by the path of the second form to the secondary excitation coil so as to be a predetermined current value set beforehand.

14. The motor drive device according to claim 13, wherein, in the third electricity supply mode, the drive control unit further forms the fourth path during a first off period in which the switching element on the first conducting path of the first excitation current is turned off, and in the fourth electricity supply mode, further forms the fourth path during a second off period in which the switching element on the second conducting path of the second excitation current is turned off.

15. The motor drive device according to claim 13, wherein, in the third electricity supply mode, the drive control unit further forms the second path during a first on period in which the switching element on the first conducting path of the first excitation current is turned on, and in the fourth electricity supply mode, further forms the second path during a second on period in which the switching element on the second conducting path of the second excitation current is turned on.

16. A motor drive system comprising:
an anti-symmetric two phase motor; and
a motor drive device to drive the anti-symmetric two phase motor, the motor drive device comprising:
  a power source terminal for connecting to a power source,
  a charging and discharging unit that performs charging and discharging, connected in series with the power source terminal,
  connecting terminals to be connected to each of primary and secondary excitation coils of the anti-symmetric two phase motor, and
  a drive control unit that has a plurality of switching elements, and that forms a first path for independently supplying power to each of the primary and secondary excitation coils from the power source terminal via the connecting terminals, by turning the plurality of switching elements on and off, and further forms a second path for independent regeneration of each residual energy remaining in the primary and secondary excitation coils from the respective primary and secondary excitation coils into the charging and discharging unit via the connecting terminals by turning these switching elements on and off, wherein the primary and secondary excitation coils of the anti-symmetric two phase motor have been connected to the connecting terminals, the primary and secondary excitation coils have a phase period corresponding to cyclic change of inductance due to rotation of a rotor of the anti-symmetric two phase motor, the phase period of the primary excitation coil is shifted in phase from the phase period of the secondary excitation coil by 180 degrees, the primary and secondary excitation coils are ring-shaped coils that are axially aligned with the rotor of the anti-symmetric two phase motor, the first path includes a path of a first form for supplying electricity from the power source terminal to the primary excitation coil via the connecting terminals, and a path of a second form differing from the path of the first form, for supplying electricity from the power source terminal to the secondary excitation coil via the connecting terminals, the second path includes a path of a third form for regenerating residual energy remaining at the primary excitation coil from the primary excitation coil to the charging and discharging unit via the connecting terminals, and a path of a fourth form different from the path of the third form, for regenerating residual energy remaining at the second excitation coil from the secondary excitation coil to the charging and discharging unit via the connecting terminals, and with a predetermined number 1 phase as a starting point in a case where inductance of the primary excitation coil is increasing, the drive control unit repeats, synchronously with the inductance cycle of the primary excitation coil, a first electricity supply mode where electricity is supplied to the primary excitation coil by the path of the first form, a first regeneration mode where residual energy remaining at the primary excitation coil is regenerated by the path of the third form, a second electricity supply mode where electricity is supplied to the secondary excitation coil by the path of the second form, and a second regeneration mode where residual energy remaining at the second excitation coil is regenerated by the path of the fourth form, in this order.

* * * * *